United States Patent
Kim et al.

(10) Patent No.: US 11,166,258 B2
(45) Date of Patent: **\*Nov. 2, 2021**

(54) METHOD AND APPARATUS FOR INACTIVE MODE OPERATION IN WIRELESS COMMUNICATION SYSTEM

(71) Applicant: Samsung Electronics Co., Ltd., Suwon-si (KR)

(72) Inventors: Soenghun Kim, Suwon-si (KR); Sangbum Kim, Suwon-si (KR); Jaehyuk Jang, Suwon-si (KR); Donggun Kim, Seoul (KR); Seungri Jin, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/062,932

(22) Filed: Oct. 5, 2020

(65) Prior Publication Data

US 2021/0022109 A1    Jan. 21, 2021

Related U.S. Application Data

(63) Continuation of application No. 16/823,928, filed on Mar. 19, 2020, now Pat. No. 10,798,676, which is a (Continued)

(30) Foreign Application Priority Data

Feb. 10, 2017 (KR) .................. 10-2017-0018920
Feb. 14, 2017 (KR) .................. 10-2017-0020021

(51) Int. Cl.
*H04W 68/00* (2009.01)
*H04W 76/19* (2018.01)
(Continued)

(52) U.S. Cl.
CPC ......... *H04W 68/005* (2013.01); *H04W 76/10* (2018.02); *H04W 76/19* (2018.02); *H04W 76/27* (2018.02)

(58) Field of Classification Search
CPC ... H04W 68/005; H04W 76/27; H04W 76/19; H04W 76/10; H04W 68/00;
(Continued)

(56) References Cited

U.S. PATENT DOCUMENTS 10,314,005 B2 *  6/2019  Kim ..................... H04W 76/27
10,638,448 B2 *  4/2020  Kim ..................... H04W 68/005
(Continued)

FOREIGN PATENT DOCUMENTS

CN    103314633 A    9/2013
CN    109792689 A    5/2019
(Continued)

OTHER PUBLICATIONS

Ericsson, "Further considerations on RAN and CN paging in Inactive", 3GPP Draft, R2-1702815, Mar. 25, 2017, vol. RAN WG2, No. 20170403-20170407, Spokane.
(Continued)

*Primary Examiner* — Nimesh Patel
(74) *Attorney, Agent, or Firm* — Jefferson IP Law, LLP

(57) ABSTRACT

The disclosure relates to a communication method and system for converging a $5^{th}$-generation (5G) communication system for supporting higher data rates beyond a $4^{th}$-generation (4G) system with a technology for Internet of things (IoT). The disclosure may be applied to intelligent services based on the 5G communication technology and the IoT-related technology, such as smart home, smart building, smart city, smart car, connected car, health care, digital education, smart retail, security and safety services. A method is provided for a terminal to transmit uplink data
(Continued)

without a transmission resource previously allocated by a base station in a next generation mobile communication system. A method by a terminal includes while the terminal is in an inactive mode, receiving a paging message from a base station, identifying a paging identifier included in the paging message, if the paging identifier corresponds to a core network (CN) paging identifier, transmitting a first radio resource control (RRC) message, and if the paging identifier corresponds to a radio access network (RAN) paging identifier, transmitting a second RRC message.

20 Claims, 45 Drawing Sheets

Related U.S. Application Data continuation of application No. 16/690,807, filed on Nov. 21, 2019, now Pat. No. 10,638,448, which is a continuation of application No. 16/428,004, filed on May 31, 2019, now Pat. No. 10,645,669, which is a continuation of application No. 15/893,041, filed on Feb. 9, 2018, now Pat. No. 10,314,005.

(51) Int. Cl.
  *H04W 76/27* (2018.01)
  *H04W 76/10* (2018.01)

(58) Field of Classification Search
  CPC . H04W 84/045; H04W 4/02; H04W 52/0206; H04W 52/0209; H04W 88/08; H04W 92/02; H04W 80/04; H04W 92/04; H04W 16/16; H04W 36/08; H04W 36/36; H04W 72/042; H04W 12/00514; H04W 12/00516; H04W 36/0066; H04W 36/14; H04W 36/32; H04W 48/18; H04W 88/16; H04W 8/005; H04W 68/02; H04W 8/26; H04W 4/70; H04W 64/00; H04W 24/04; H04W 60/04; H04W 68/12; H04W 36/0005; H04W 36/0061; H04W 72/12; H04W 74/02; H04W 8/08; H04W 8/24; H04W 84/042; H04W 8/02; H04W 28/02; H04W 40/24; H04W 84/12; H04W 88/06; H04W 28/0215; H04W 36/0022; H04W 28/0226; H04W 28/0236; H04W 72/005; H04W 8/06; H04W 8/18; H04W 76/28; H04W 76/30; H04W 48/20; H04W 72/04; H04W 72/0406; H04W 28/06; H04W 28/18; H04W 24/02; H04W 80/00; H04W 8/205; Y02D 70/00; Y02D 70/1222; Y02D 70/1224; Y02D 70/1242; Y02D 70/1262; Y02D 70/142; Y02D 70/21; Y02D 70/10; Y02D 70/12; Y02D 70/126; Y02D 70/23; Y02D 70/24; Y02D 70/1226; Y02D 70/1264; Y02D 70/20; Y02D 70/144; Y02D 70/146; Y02D 70/22; H04L 29/12301; H04L 61/2076; H04L 65/1016; H04L 12/66; H04L 2012/5607; H04L 41/0806; H04L 41/12; H04L 41/5041; H04L 43/0811; H04L 51/20; H04L 67/24; H04L 65/103; H04L 65/104; H04L 65/1069; H04L 5/0007; H04L 65/1006; H04L 47/2475; H04L 47/10; H04L 47/12; H04L 65/1073; H04L 65/1089; H04L 65/80; H04L 5/001; H04L 5/0053; H04L 5/0091; H04L 5/0023; H04L 67/12; H04L 29/12009; H04L 29/12207; H04L 29/12839; H04L 61/20; H04L 41/00; H04L 12/185; H04L 12/189; H04L 1/1861; H04L 1/1887; H04L 2012/5623; H04M 11/022; H04M 15/66; H04M 3/16; H04M 3/2254; H04B 7/022; H04B 7/024; H04B 7/0452; H04B 7/0617; H04B 7/0626; H04B 7/0695
  See application file for complete search history.

(56) References Cited

U.S. PATENT DOCUMENTS

| | | | |
|---|---|---|---|
| 10,645,669 B2* | 5/2020 | Kim | H04W 76/10 |
| 10,798,676 B2* | 10/2020 | Kim | H04W 68/005 |
| 2010/0165927 A1 | 1/2010 | Kim et al. | |
| 2012/0120843 A1 | 5/2012 | Anderson et al. | |
| 2013/0029588 A1 | 1/2013 | Bienas et al. | |
| 2013/0260810 A1 | 10/2013 | Rayavarapu | |
| 2014/0024378 A1 | 1/2014 | Khude et al. | |
| 2014/0243038 A1 | 8/2014 | Schmidt et al. | |
| 2014/0256365 A1 | 9/2014 | Schmidt et al. | |
| 2016/0029426 A1 | 1/2016 | Bangolae et al. | |
| 2016/0057730 A1 | 2/2016 | Truelove et al. | |
| 2016/0242036 A1 | 8/2016 | Van Phan et al. | |
| 2016/0345119 A1 | 11/2016 | Futaki | |
| 2017/0156047 A1 | 6/2017 | Mecklin | |
| 2017/0290072 A1 | 10/2017 | Chen | |
| 2017/0325282 A1 | 11/2017 | Hong et al. | |
| 2017/0374644 A1 | 12/2017 | Ryu et al. | |
| 2018/0206093 A1 | 7/2018 | Jain et al. | |
| 2018/0213452 A1 | 7/2018 | Kim et al. | |
| 2018/0227807 A1 | 8/2018 | Youn et al. | |
| 2019/0166576 A1 | 5/2019 | Kim et al. | |

FOREIGN PATENT DOCUMENTS

| | | |
|---|---|---|
| EP | 3481140 A1 | 5/2019 |
| KR | 10-2016-0002327 A | 1/2016 |
| WO | 2016/099138 A1 | 6/2016 |
| WO | 2017/006265 A1 | 1/2017 |

OTHER PUBLICATIONS

LG Electronics, "CN-initialed paging for a UE in RRC_INACTIVE", 3GPP Draft, R2-1707145, Jun. 16, 2017, vol. RAN WG2, No. 20170627-20170629, Qingdao, China.
Ericsson, "Further considerations on RAN and CN paging in Inactive", 3GPP Draft, R2-1700893, Feb. 4, 2017, vol. RAN WG2, No. 20170213-20170217, Athens, Greece.
LG Electronics, "Paging response to CN paging in RRC Inactive", 3GPP Draft, R2-1701824, Feb. 4, 2017, vol. RAN WG2, No. 20170213-20170217, Athens, Greece.
Ericsson, "Paging in Light connection", 3GPP Draft, R2-168493, Nov. 13, 2016, vol. RAN WG2, No. 20161114-20161118, Reno, U.S.
Intel Corporation, "RAN-initialed paging and DRX cycle", 3GPP Draft, R2-168435, Nov. 13, 2016, vol. RAN WG2, No. 20161114-20161118, Reno, U.S.
Intel Corporation: "RAN-based paging area for light connection", 3GPP Draft R2-166689_RAN_PAGING_AREA_INTEL, 3rd Generation Partnership Project (3GPP), Mobile Competence Centre; 650; XP051151167; Oct. 9, 2016.
Extended European Search Report dated Mar. 13, 2020, issued in European Application No. 20150540.1-1212.
Ericsson "UE reachability management in Inactive mode", SA WG2 Meeting #117, S2-166227, Kaohsiung City, Taiwan, Oct. 17-26, 2016.
Chinese Office Action dated Apr. 21, 2021, issued in Chinese Application No. 201880011178.2.
ITRI, R2-168081 "Discussion on the lightly connected UE's behavior" 3GPP tsg_ran/WG2_RL2, Reno, USA, Nov. 14-18, 2016.

(56) References Cited

OTHER PUBLICATIONS

Catt, R3-162169 "Discussion on UE mobility in lightly connected mode" 3GPP tsg_ran/WG3_lu, Antipolis, France, Oct. 10-14, 2016.
Chinese Office Action dated Sep. 15, 2021, issued in Chinese Application No. 201880011178.2.

* cited by examiner

FIG. 1D
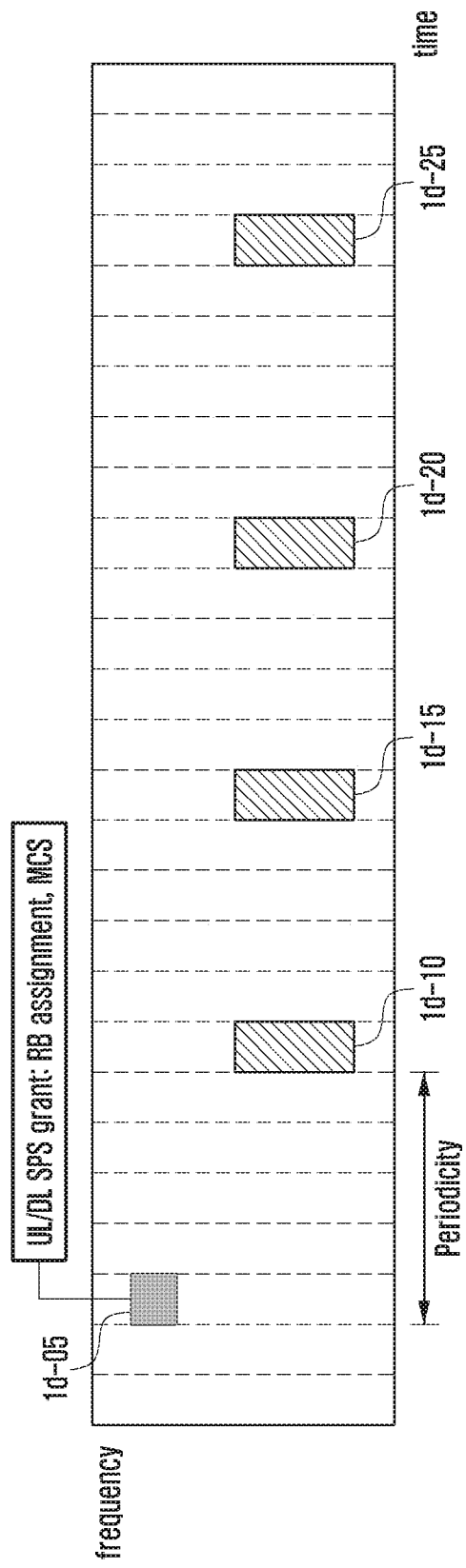
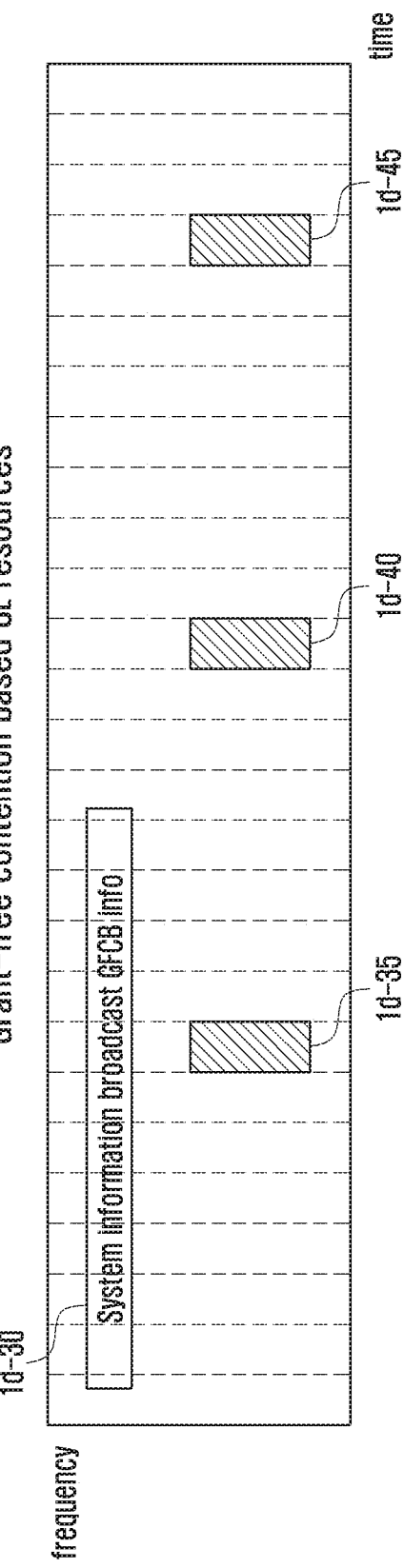

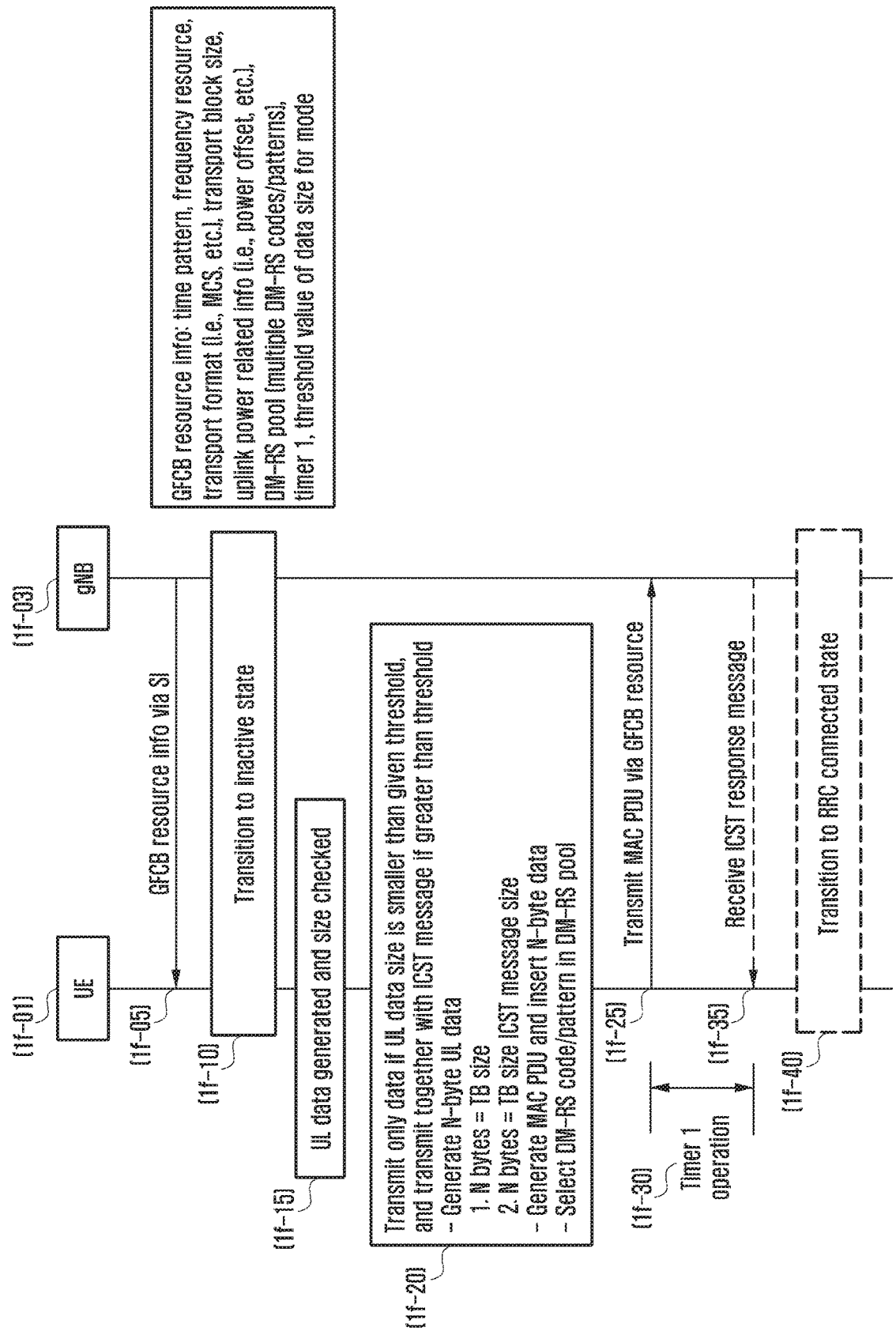

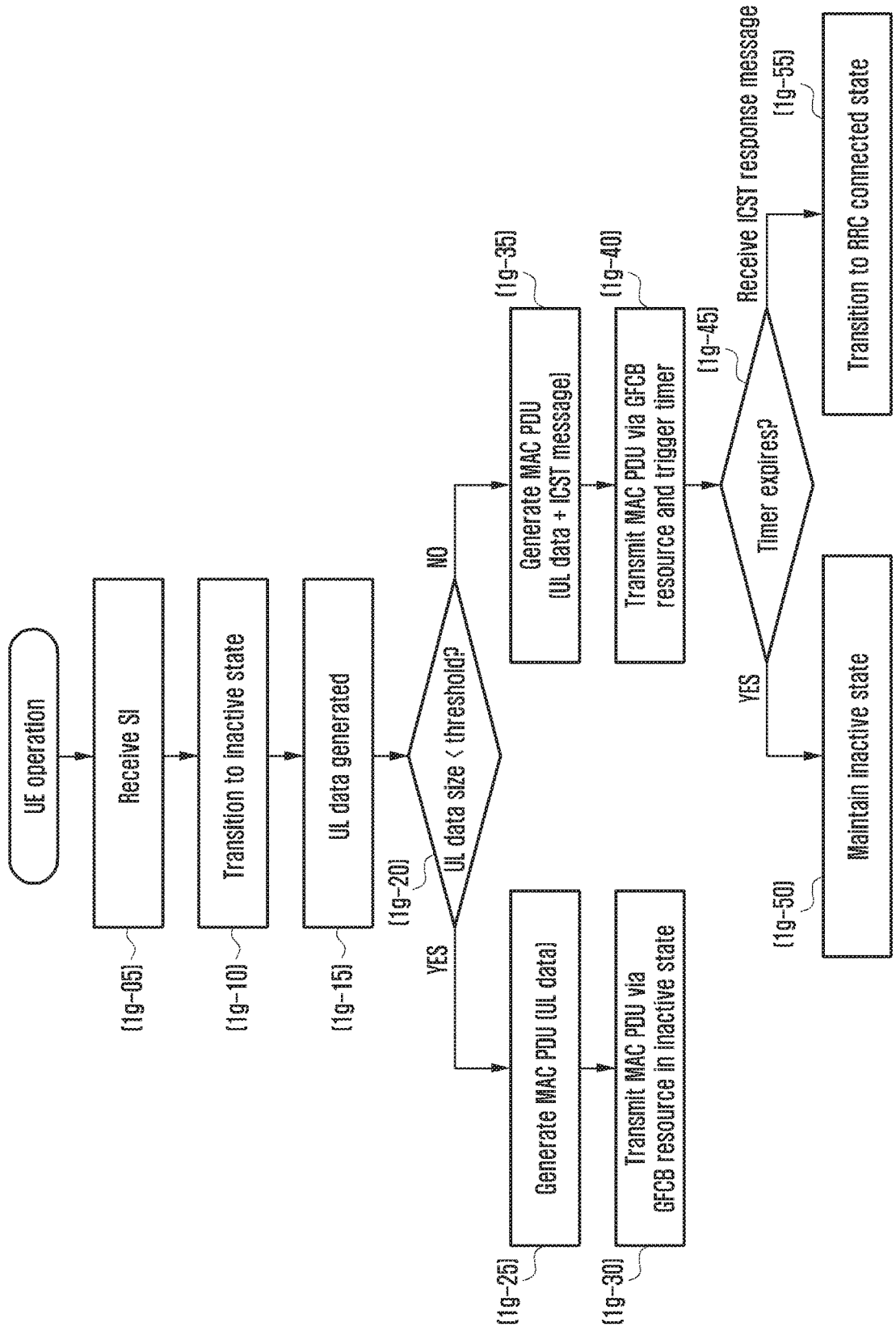

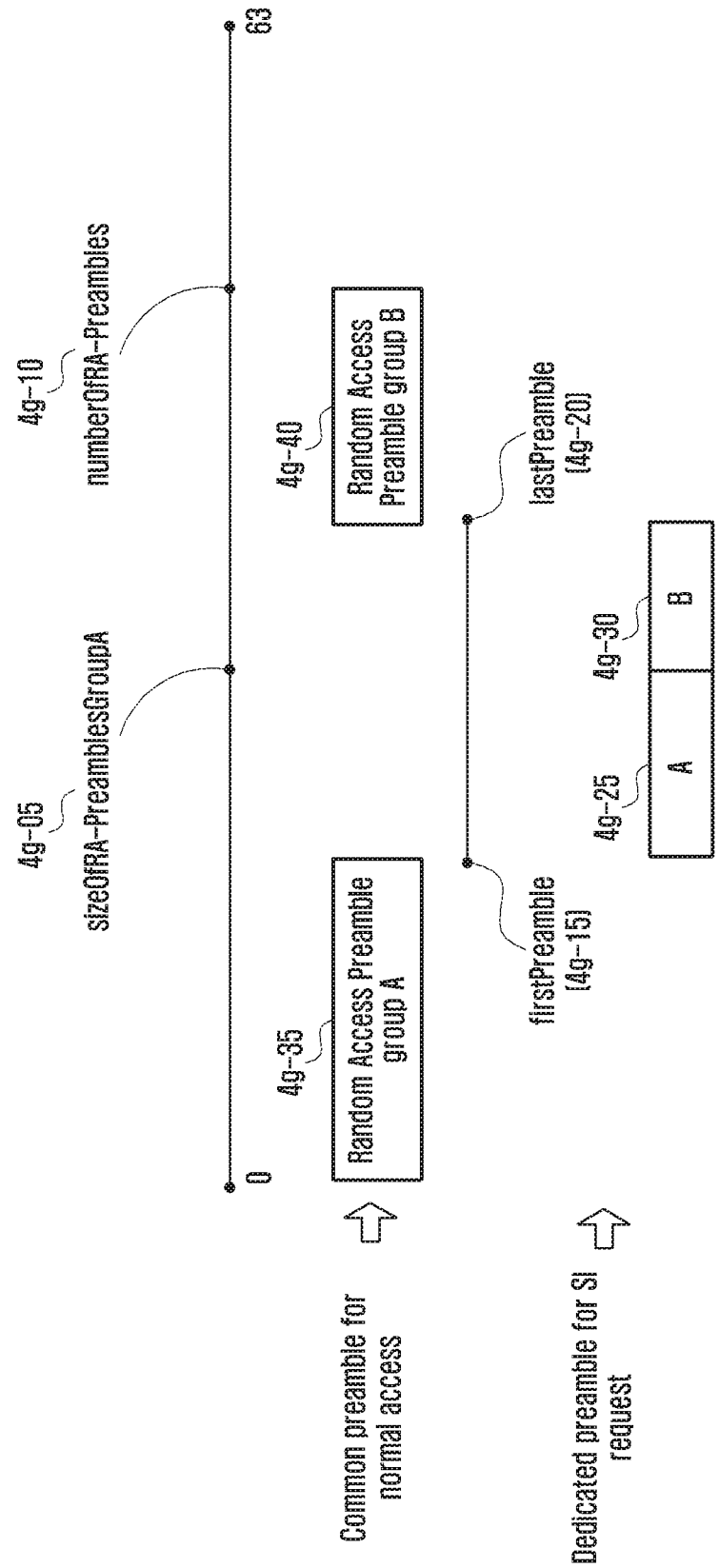

METHOD AND APPARATUS FOR INACTIVE MODE OPERATION IN WIRELESS COMMUNICATION SYSTEM

CROSS-REFERENCE TO RELATED APPLICATION(S)

This application is a continuation application of prior application Ser. No. 16/823,928 filed on Mar. 19, 2020, which has issued as U.S. Pat. No. 10,798,676 on Oct. 6, 2020; which is a continuation application of prior application Ser. No. 16/690,807 filed on Nov. 21, 2019, which has issued as U.S. Pat. No. 10,638,448 on Apr. 28, 2020; which is a continuation application of prior application Ser. No. 16/428,004 filed on May 31, 2019, which has issued as U.S. Pat. No. 10,645,669 on May 5, 2020; which is a continuation application of prior application Ser. No. 15/893,041, filed on Feb. 9, 2018, which issued as U.S. Pat. No. 10,314,005 on Jun. 4, 2019; and which claimed priority under 35 U.S.C. § 119(a) of a Korean patent application No. 10-2017-0018920, filed on Feb. 10, 2017, in the Korean Intellectual Property, and of a Korean patent application No. 10-2017-0020021, filed on Feb. 14, 2017, in the Korean Intellectual Property, the disclosure of each of which is incorporated by reference herein in its entirety.

TECHNICAL FIELD

The disclosure relates to a method for a terminal to transmit uplink data without a transmission resource previously allocated by a base station in a next generation mobile communication system.

More particularly, the disclosure relates to a communication method using a terminal category in a next generation mobile communication system.

In addition, the disclosure relates to an inactive mode and a paging procedure in a next generation mobile communication system.

In addition, the disclosure relates to an operation of acquiring system information (SI) in a next generation mobile communication system.

BACKGROUND

To meet the demand for wireless data traffic having increased since deployment of fourth generation (4G) communication systems, efforts have been made to develop an improved fifth generation (5G) or pre-5G communication system. Therefore, the 5G or pre-5G communication system is also called a 'Beyond 4G Network' or a 'Post long term evolution (LTE) System'. The 5G communication system is considered to be implemented in higher frequency millimeter wave (mmWave) bands, e.g., 60 GHz bands, so as to accomplish higher data rates. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G communication systems. In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-Points (CoMP), reception-end interference cancellation and the like. In the 5G system, hybrid frequency shift keying (FSK) and quadrature amplitude modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of things (IoT) where distributed entities, such as things, exchange and process information without human intervention. The Internet of everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a machine-to-machine (M2M) communication, machine type communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing information technology (IT) and various industrial applications.

In line with this, various attempts have been made to apply 5G communication systems to IoT networks. For example, technologies such as a sensor network, MTC, and M2M communication may be implemented by beamforming, MIMO, and array antennas. Application of a cloud RAN as the above-described Big Data processing technology may also be considered to be as an example of convergence between the 5G technology and the IoT technology.

Meanwhile, when uplink data occurs at a terminal in the long term evolution (LTE) system, the terminal transmits a request for a transmission resource to a base station and transmits uplink data through an allocated resource. If the size of data to be transmitted by the terminal is small, the above procedure acts as overhead which may cause a communication delay.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, the disclosure provides a method for transmitting uplink data without previously allocated transmission resources.

In addition, the disclosure defines detailed information included in a terminal category in a wireless communication system and provides a method for reporting that a terminal supports a specific service when accessing a network.

In addition, the disclosure provides a method for effectively setting a paging area of a terminal, being in a radio resource control (RRC) inactive mode, in a next generation mobile communication system, and transmitting and processing a paging message to the terminal.

In addition, the disclosure provides a method for requesting system information (SI) through a random access process.

According to embodiments of the disclosure, an operating method of a terminal in a wireless communication system comprises, while the terminal is in an inactive mode, receiving a paging message from a base station, identifying a paging identifier included in the paging message, if the paging identifier corresponds to a core network (CN) paging identifier, transmitting a first radio resource control (RRC) message, and, if the paging identifier corresponds to a radio access network (RAN) paging identifier, transmitting a second RRC message.

In addition, according to embodiments of the disclosure, a terminal comprises a transceiver configured to transmit and receive a signal, and a controller configured to, while the terminal is in an inactive mode, receive a paging message from a base station, identify a paging identifier included in the paging message, if the paging identifier corresponds to a CN paging identifier, transmit a first RRC message, and if the paging identifier corresponds to a RAN paging identifier, transmit a second RRC message.

In addition, according to embodiments of the disclosure, an operating method of a base station in a wireless communication system comprises transmitting a paging message to a terminal that is in an inactive mode, receiving a connection request message corresponding to a paging identifier included in the paging message from the terminal, and transmitting a first RRC message or a second RRC message to the terminal based on the connection request message.

In addition, according to embodiments of the disclosure, a base station comprises a transceiver configured to transmit and receive a signal, and a controller configured to transmit a paging message to a terminal being that is in an inactive mode, to receive a connection request message corresponding to a paging identifier included in the paging message from the terminal, and to transmit a first RRC message or a second RRC message to the terminal, based on the connection request message.

According to an embodiment of the disclosure, in a next generation mobile communication system, a method for a terminal to transmit uplink data without a transmission resource previously allocated from a base station may reduce a delay up to data transmission after uplink data occurs.

According to another embodiment of the disclosure, even if a terminal has a bandwidth smaller than a bandwidth supported by a base station, the terminal informs the base station of this fact earlier and can be scheduled with a bandwidth supported by the terminal.

According to still another embodiment of the disclosure, in the next generation mobile communication system, a method for effectively setting a paging area of an RRC inactive mode terminal and transmitting and processing a paging message to a terminal may effectively manage the mobility of the RRC inactive mode terminal.

According to yet another embodiment of the disclosure, it is possible to efficiently request and receive SI other than SI including setup information necessary for initial access.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 1D is a diagram illustrating grant-free uplink transmission resources according to an embodiment of the disclosure;

FIG. 1F is a diagram illustrating a method for determining whether to maintain an inactive state depending on a size of uplink data and performing uplink transmission in an embodiment of the disclosure;

FIG. 1G is a diagram illustrating an operation of user equipment (UE) according to an embodiment of the disclosure;

FIG. 1I is a block diagram illustrating a configuration of a g node B (gNB) according to an embodiment of the disclosure;

FIG. 3O is a diagram illustrating a procedure in which an anchor gNB transmits a paging message to a UE in an RRC inactive mode located out of a cell coverage of the anchor gNB according to an embodiment of the disclosure;

FIG. 4G is a diagram illustrating a second method for indicating a preamble dedicated to an SI request according to an embodiment of the disclosure;

FIG. 4I is a block diagram illustrating a configuration of a gNB according to an embodiment of the disclosure;

Throughout the drawings, it should be noted that like reference numbers are used to depict the same or similar elements, features, and structures.

DETAILED DESCRIPTION

Figure 1A:
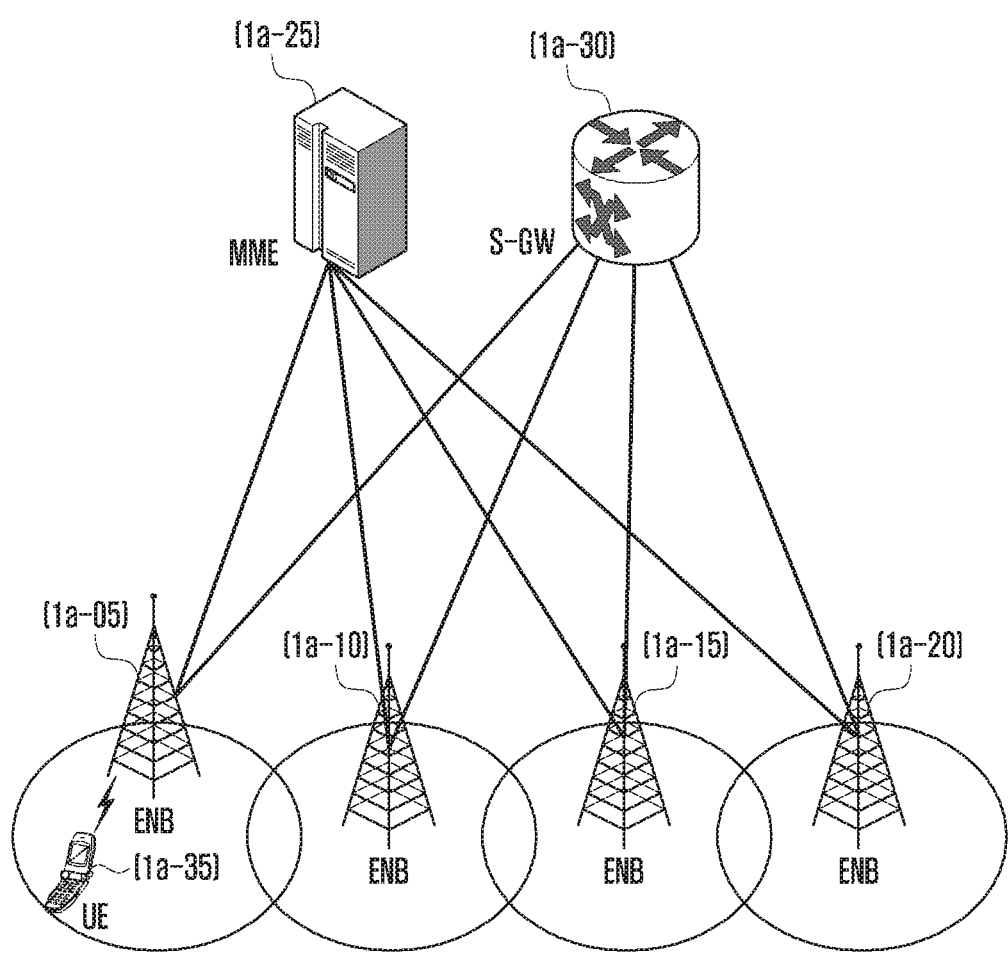
FIG. 1A is a diagram illustrating a structure of a long term evolution (LTE) system according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In the following description, well known elements, functions, operations, techniques, etc. may not be described or illustrated in detail to avoid obscuring the subject matter of the disclosure. In addition, terms used herein are defined in consideration of functions of this disclosure and may be varied depending on a user or an operator's intention or custom. Therefore, the definition should be made based on the contents throughout this description.

The advantages and features of the disclosure and the manner of achieving them will become apparent through embodiments described in detail below with reference to the accompanying drawings. The disclosure may, however, be embodied in many different forms and should not be construed as limited to embodiments set forth herein. Rather, these embodiments are provided so that this disclosure will be thorough and complete, and will fully convey the scope of the disclosure to those skilled in the art. The disclosure is only defined by the scope of claims. Like reference numerals refer to like elements throughout this disclosure.

In the following description, a term for identifying an access node, a term for indicating a network entity, a term for indicating a message, a term for indicating an interface between network entities, a term for indicating various kinds of identification information, and the like are only and not to be construed as a limitation. Other terms having equivalent technical meanings may be also used.

For convenience of explanation, the following description uses terms and names defined in the 3rd generation partnership project (3GPP) long term evolution (LTE) standard. However, the disclosure is not limited to the following description and may be equally applied to any other system that conforms to other standards. In particular, the disclosure is applicable to 3GPP new radio (NR) which is the 5th generation mobile communication standard.

First Embodiment

FIG. 1A is a diagram illustrating a structure of a long term evolution (LTE) system according to an embodiment of the disclosure.

Referring to FIG. 1A, the wireless communication system includes a plurality of e node Bs (eNBs) (also referred to as evolved universal terrestrial access network (E-UTRAN) node B, evolved node B, eNodeB, or a base station) 1a-05, 1a-10, 1a-15 and 1a-20, a mobility management entity (MME) 1a-25, and a serving gateway (S-GW) 1a-30. A user equipment (UE) (also referred to as a terminal or a mobile device) 1a-35 accesses an external network through the eNB 1a-05, 1a-10, 1a-15 or 1a-20 and the S-GW 1a-30.

The eNBs 1a-05, 1a-10, 1a-15, and 1a-20 are access nodes of the cellular network and provide a radio access to UEs that desire to access the network. That is, in order to service user traffic, the eNBs 1a-05, 1a-10, 1a-15, and 1a-20 collect various kinds of state information such as buffer states, available transmission power states, and channel states of the UEs, perform scheduling, and support a connection between each UE and a core network (CN). The MME 1a-25 is a device for performing various control functions as well as a mobility management function for the UE, and is connected to the plurality of eNBs. The S-GW 1a-30 is a device for providing a data bearer. In addition, the MME 1a-25 and the S-GW 1a-30 may further perform a bearer management and authentication for the UE that desires to access the network, and also process packets received from or to be transmitted to the eNBs 1a-05, 1a-10, 1a-15, and 1a-20.

Figure 1B:
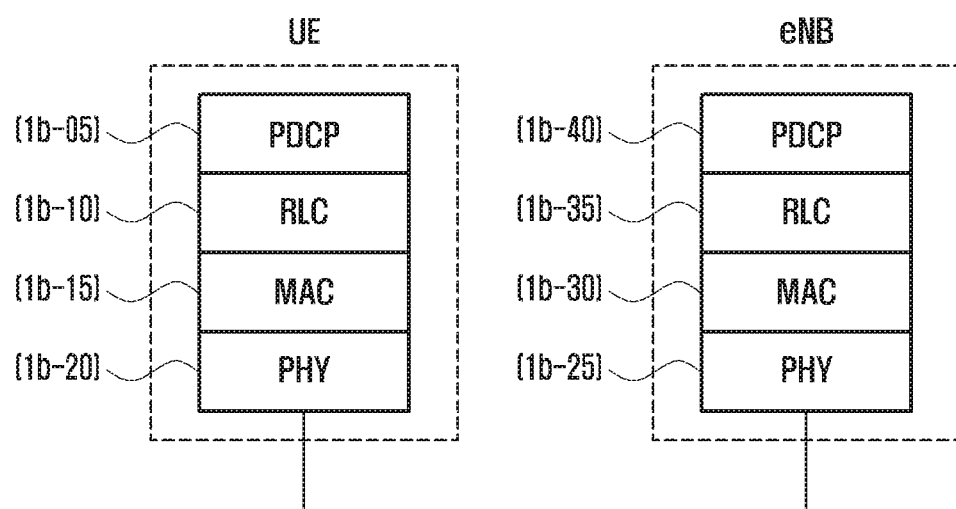
FIG. 1B is a diagram illustrating a radio protocol structure of an LTE system according to an embodiment of the disclosure.

FIG. 1B is a diagram illustrating a radio protocol structure of an LTE system according to an embodiment of the disclosure.

Referring to FIG. 1B, in each of the UE and the eNB, a radio protocol of the LTE system is composed of a packet data convergence protocol (PDCP) 1b-05 or 1b-40, a radio link control (RLC) 1b-10 or 1b-35, and a medium access control (MAC) 1b-15 or 1b-30. The PDCP 1b-05 or 1b-40 performs an operation of internet protocol (IP) header compression/decompression, and the like. The main functions of the PDCP are summarized as follows.

Header compression and decompression: ROHC only
Transfer of user data
In-sequence delivery of upper layer packet data units (PDUs) at PDCP re-establishment procedure for RLC AM
For split bearers in dual connectivity (DC) (only support for RLC acknowledgement mode (AM)): PDCP PDU routing for transmission and PDCP PDU reordering for reception
Duplicate detection of lower layer service data units (SDUs) at PDCP re-establishment procedure for RLC AM
Retransmission of PDCP SDUs at handover and, for split bearers in DC, of PDCP PDUs at PDCP data-recovery procedure, for RLC AM
Ciphering and deciphering
Timer-based SDU discard in uplink
The RLC 1b-10 or 1b-35 performs an automatic repeat request (ARQ) operation or the like by reassembling a PDCP packet data unit (PDCP PDU) in a suitable size. The main functions of the RLC are summarized as follows.
Transfer of upper layer PDUs
Error correction through ARQ (only for AM data transfer)
Concatenation, segmentation and reassembly of RLC SDUs (only for UM and AM data transfer)
Re-segmentation of RLC data PDUs (only for AM data transfer)
Reordering of RLC data PDUs (only for unacknowledged mode (UM) and AM data transfer)
Duplicate detection (only for UM and AM data transfer)
Protocol error detection (only for AM data transfer)
RLC SDU discard (only for UM and AM data transfer)
RLC re-establishment
The MAC 1b-15 or 1b-30 is connected to several RLC layer devices included in one UE and performs an operation of multiplexing RLC PDUs into a MAC PDU and demultiplexing RLC PDUs from the MAC PDU. The main functions of the MAC are summarized as follows.
Mapping between logical channels and transport channels
Multiplexing/demultiplexing of MAC SDUs belonging to one or different logical channels into/from transport blocks (TB) delivered to/from the physical layer on transport channels
Scheduling information reporting
Error correction through hybrid automatic repeat request (HARQ)
Priority handling between logical channels of one UE
Priority handling between UEs by means of dynamic scheduling
multimedia broadcast multicast service (MBMS) service identification
Transport format selection
Padding
A physical layer (PHY) 1b-20 or 1b-25 performs an operation of channel-coding and modulating upper layer data and then transmitting orthogonal frequency division multiplexing (OFDM) symbols thereof to the radio channel, or an operation of demodulating and channel-decoding OFDM symbols received through the radio channel and then delivering them to the upper layer.

Although not shown in the drawings, a radio resource control (RRC) layer exists above the PDCP layer in each of the UE and the eNB. For RRC, the RRC layers may exchange a configuration control message related to access or measurement.

Figure 1C:
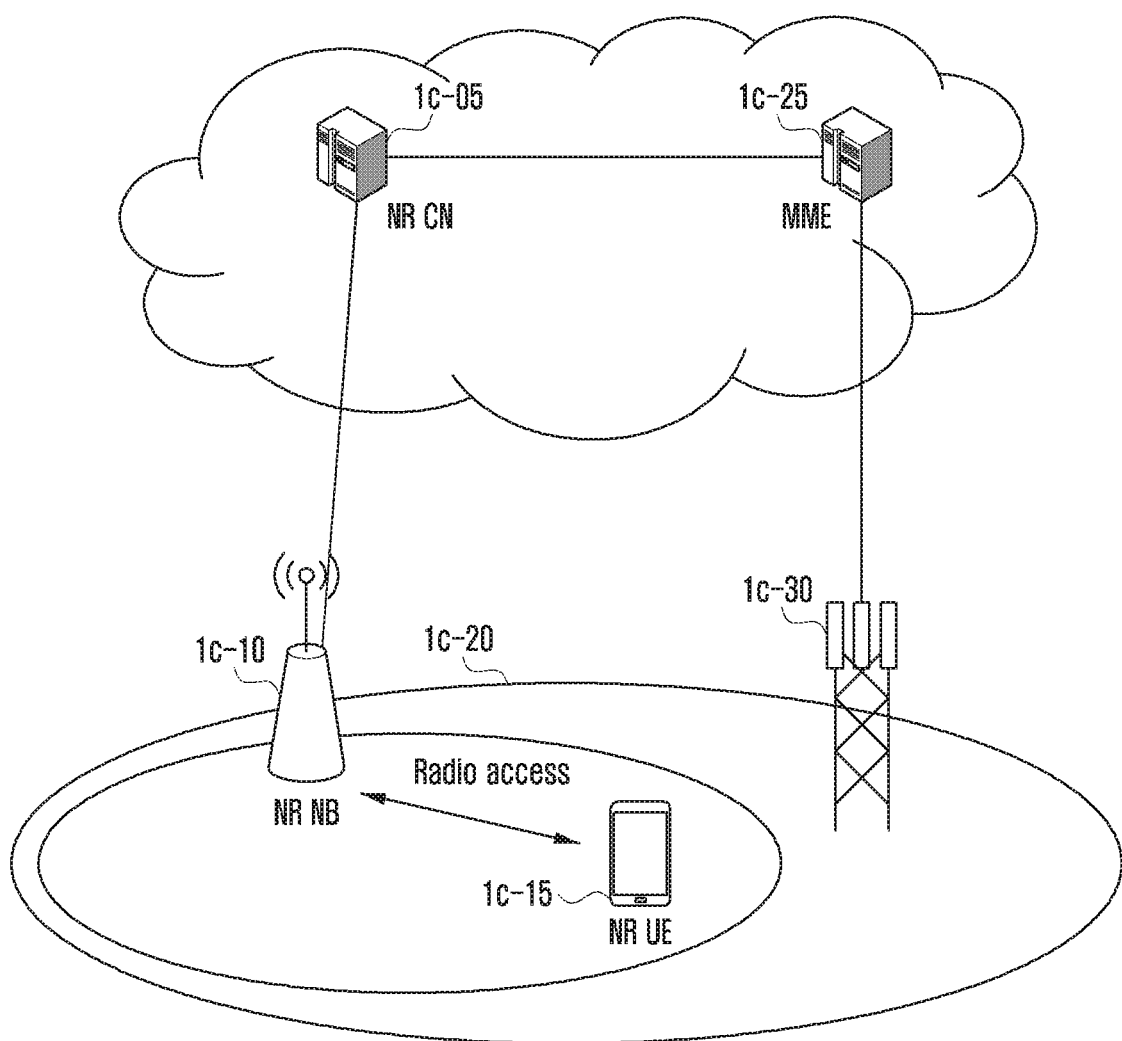
FIG. 1C is a diagram illustrating a structure of a next generation mobile communication system according to an embodiment of the disclosure.

FIG. 1C is a diagram illustrating a structure of a next generation mobile communication system according to an embodiment of the disclosure.

Referring to FIG. 1C, a radio access network (RAN) of the next generation mobile communication system includes a next generation base station (also referred to as a new radio node B, a g node B (gNB), NR gNB, fifth generation (5G) NB, or an NR base station) 1c-10 and a new radio core network (NR CN) 1c-05. A user terminal (also referred to as new radio user equipment, NR UE, UE, or terminal) 1c-15 accesses an external network through the NR gNB 1c-10 and the NR CN 1c-05.

In FIG. 1C, the NR gNB 1c-10 corresponds to the eNB of the existing LTE system. The NR gNB 1c-10 is connected to the NR UE 1c-15 through a radio channel and can provide a better service than the existing Node B. In the next generation mobile communication system, since all user traffic is provided through a shared channel, a device for collecting various kinds of state information, such as buffer states, available transmission power states, and channel states of NR UEs, and thereby performing scheduling is required. This is performed by the NR gNB 1c-10. Normally, one NR gNB 1c-10 controls a plurality of cells and includes a central unit (CU) for performing control and signaling and a distributed unit (DU) for performing transmission and reception of signals. In order to realize high-speed data transfer compared to the existing LTE, more than the existing maximum bandwidth may be applied, and also a beamforming technique may be used with OFDM as a radio access technology. In addition, an adaptive modulation and coding (AMC) scheme is used to determine a modulation scheme and a channel coding rate according to a channel state of the NR UE. The NR CN 1c-05 performs functions such as mobility support, bearer setup, and quality of service (QoS) setup. The NR CN 1c-05 is a device for performing various control functions as well as a mobility management function for the NR UE, and is connected to a plurality of NR gNB. Also, the next generation mobile communication system may be linked to the existing LTE system, and the NR CN 1c-05 is connected to the MME 1c-25 through a network interface. The MME 1c-25 is connected to the eNB 1c-30, which is the existing base station covering an area 1c-20 associated with the NR gNB 1c-10.

There are two methods for performing uplink transmission without any dynamically allocated transmission resource (hereinafter, grant-free). According to one method, the UE is allocated a dedicated grant-free uplink resource from the gNB and performs a semi-persistent scheduling (SPS) operation. The other method is a grant-free contention based (GFCB) uplink transmission method in which the gNB allocates a common grant-free uplink resource through which all the UEs can transmit uplink resources without contention.

FIG. 1D is a diagram illustrating grant-free uplink transmission resources according to an embodiment of the disclosure.

Referring to FIG. 1D, In the LTE, the SPS is a method for allowing the UE to perform transmission and reception without transmission resources dynamically allocated by the gNB. The SPS is used for scheduling a service in which small data is frequently generated. The SPS is needed to reduce the amount of control information increasing in proportion to users and further to secure the system capacity for data transmission of the user. That is, in case of the SPS, the gNB transmits uplink/downlink resource allocation control information 1d-05 once to the UE, and then the gNB and the UE perform operations for data 1d-10, 1d-15, 1d-20, and 1d-25 according to the once transmitted control information. That is, the SPS in the LTE allocates one transmission resource for MAC PDU transmission every period. The resource allocated according to the control information remain valid until SPS activation or SPS deactivation/release occurs. The SPS operation for the uplink in the LTE is as follows.

1. The gNB establishes the SPS operation to the UE through an RRC message. The RRC message includes an SPS cell-radio network temporary identifier (C-RNTI), an SPS period, and the maximum number of HARQ processes for the SPS.

2. After the SPS is established for the uplink, the gNB transmits, to the UE, downlink control information (DCI) format 1/1A/2/2A/2B/2C including the uplink resource allocation control information 1d-05 with the SPS C-RNTI of a physical downlink control channel (PDCCH). The DCI may include an allocation type frequency division duplex/time division duplex(FDD/TDD), a modulation coding scheme (MCS) level, a new data indicator (NDI), a redundancy version (RV), an HARQ process number, and resource block assignment information.

After the SPS is activated, the UE continuously monitors the PDCCH to receive uplink and downlink scheduling commands. If a dynamic scheduling command is detected, the dynamic scheduling command has priority over the SPS for that particular subframe. This function is useful when it is necessary to increase the amount of resources allocated to the SPS.

The GFCB resource refers to a resource for instructing all the UEs to perform uplink transmission in common, and the eNB broadcasts related configuration information through system information (SI) 1d-30. The GFCB resource information includes a time pattern, a frequency resource, a transport format (MCS, etc.), a transport block size, uplink power related information (power offset, etc.), a demodulation reference signal (DM-RS) pool (multiple DM-RS codes/patterns), and a timer 1 for state transition. The UE performs contention-based uplink transmission by using GFCB resources 1d-35, 1d-40, and 1d-45 corresponding to the above setup with respect to a specific uplink transmission situation. This transmission method may cause a conflict because several UEs can use the same resource at the same time. In order to reduce this conflict, the transmission method should be used only for a specific situation. An embodiment of the disclosure provides a method for the UE to use the GFCB resources when uplink data of a small size occurs in an inactive state.

Figure 1E:
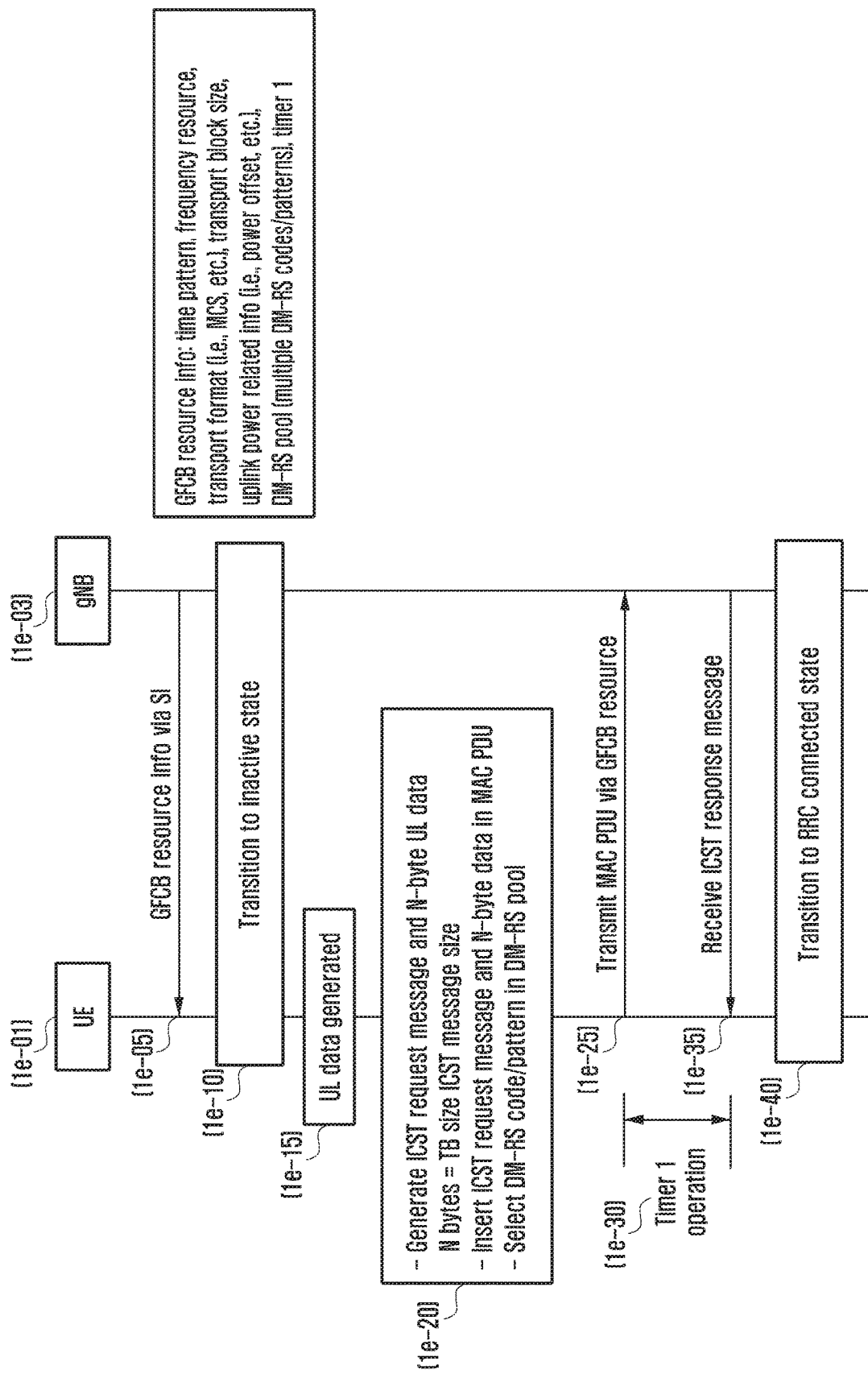
FIG. 1E is a diagram illustrating a method for transmitting data and an inactive state transition message together by using a pre-allocated common transmission resource in an embodiment of the disclosure.

FIG. 1E is a diagram illustrating a method for transmitting data and an inactive state transition message together by using a pre-allocated common transmission resource in an embodiment of the disclosure.

Referring to FIG. 1E, in embodiment 1-1, UE 1e-01 that supports GFCB uplink transmission receives SI including GFCB resource information from gNB 1e-03 at operation 1e-05. The GFCB resource information includes a time pattern, a frequency resource, a transport format (MCS, etc.), a transport block size, an uplink power related information (power offset, etc.), a demodulation reference signal (DM-RS) pool (multiple DM-RS codes/patterns), and a timer 1 for state transition. If the UE 1e-01 transitions to an inactive state according to a specific condition at operation 1e-10, and if uplink data is generated in the inactive state at operation 1e-15, the UE prepares to perform uplink transmission through the GFCB resources at operation 1e-20. The UE 1e-01 may perform an operation for acquiring synchronization if the synchronization is not matched, and may perform the above operation 1e-20 after acquiring synchronization. The synchronization acquisition operation may be a random access procedure. The above preparation process means that the UE 1e-01 prepares to transmit an inactive to a connected state transition (ICST) request message or a resume request message together with data. That is, the UE 1e-01 divides the generated uplink data, which corresponds to subtracting the size of the ICST message from the transport block size of the configured GFCB resource, into N bytes, and inserts it together with the ICST request message in the MAC PDU. Also, the UE 1e-01 selects the DM-RS code/pattern in the configured DM-RS pool. The UE 1e-01 transmits the MAC PDU through the configured GFCB resource at operation 1e-25 and triggers a timer at operation 1e-30. This timer is used for checking whether a response is received from the gNB 1e-03 in response to the ICST request. That is, when an ICST response message is received from the gNB 1e-03 at operation 1e-35 while the timer is running, the UE 1e-01 transitions to the RRC connected state at operation 1e-40. If the ICST response message is not received from the gNB 1e-03 while the timer is running, the UE 1e-01 maintains the inactive state.

FIG. 1F is a diagram illustrating a method for determining whether to maintain an inactive state depending on a size of uplink data and performing uplink transmission in an embodiment of the disclosure.

Referring to FIG. 1F, in embodiment 1-2, when uplink data is generated in the inactive state, UE 1f-01 determines, based on the size of the generated data, whether RRC connection is necessary. That is, if the size of the generated uplink data is smaller than a given reference size, the UE supports an operation of transmitting data while maintaining the inactive state.

The UE 1f-01 that supports GFCB uplink transmission receives SI including GFCB resource information from gNB 1f-03 at operation 1f-05. The GFCB resource information includes a time pattern, a frequency resource, a transport format (MCS, etc.), a transport block size, an uplink power related information (power offset, etc.), a DM-RS pool (multiple DM-RS codes/patterns), a timer 1 for state transition, and a threshold value of the data size for state transition determination. If the UE 1f-01 transitions to an inactive state according to a specific condition at operation 1f-10, and if uplink data is generated in the inactive state at operation 1f-15, the UE 1f-01 prepares to perform uplink transmission through the GFCB resources at operation 1f-20. At this operation, the UE 1f-01 compares the size of the generated uplink data with the threshold value and thereby determines whether to perform state transition. That is, when the size of the generated uplink data is greater than the threshold value, the UE 1f-01 performs the transmission operation through the GFCB resource shown in FIG. 1E (operations 1e-20 to 1e-40). On the other hand, if the size of the generated uplink data is smaller than the threshold value, the UE 1f-01 configures the MAC PDU with uplink data packets corresponding to the size of the transport block, and selects the DM-RS code/pattern in the configured DM-RS at operation 1f-20. Then the UE 1f-01 transmits the MAC PDU through the configured GFCB resource at operation 1f-25. As described above, only when the size of the uplink data is greater than the threshold value, the UE 1f-01 triggers a timer at operation 1f-30 simultaneously with transmitting the MAC PDU. This timer is used for checking whether a response is received from the gNB 1f-03 in response to the ICST request. That is, when an ICST response message is received from the gNB 1f-03 at operation 1f-35 while the timer is running, the UE 1f-01 transitions to the RRC connected state at operation 1f-40. If the size of the generated uplink data is smaller than the threshold value, the UE 1f-01 skips operations of operations 1f-30 to 1f-40 and maintains the inactive state.

FIG. 1G is a diagram illustrating an operation of UE according to an embodiment of the disclosure.

Referring to FIG. 1G, the operation of the UE according to the embodiments 1-1 and 1-2 are shown. The UE may receive SI including GFCB resource information from gNB at operation 1g-05, and transition to an inactive state in a specific situation at operation 1g-10. The GFCB resource information may include a time pattern, a frequency resource, a transport format (MCS, etc.), a transport block size, uplink power related information (power offset, etc.), a DM-RS pool (multiple DM-RS codes/patterns), a timer 1 for state transition, and a threshold value of a data size for state transition determination. In addition, the specific situation may include a condition such as loss of data to be transmitted by the UE in an RRC connected state, a poor radio connection state with the gNB, or handover to another cell.

When uplink data is generated in the inactive state at operation 1g-15, the UE compares the uplink data size with the threshold value set by the eNB and thereby determines at operation 1g-20 whether to request a state transition. Depending on whether the operation of the above operation is supported or not, an embodiment of the disclosure divides into the embodiment 1-1 and the embodiment 1-2. That is, when the size of uplink data generated in the UE is greater than the threshold value, the operation of the embodiment 1-1 for forming both the generated uplink data and an ICST request message into an MAC PDU and transmitting it at operations 1g-35, 1g-40, 1g-45, 1g-50, and 1g-55. When the size of uplink data generated in the UE is smaller than the threshold value, only the generated uplink data is transmitted through the GFCB resource while the inactive state is maintained, at operations 1g-25 and 1g-30, as described in the embodiment 1-2.

Specifically, the UE generates the MAC PDU including the uplink data and the ICST request message at operation 1g-35, and transmits the generated MAC PDU through the GFCB resource at operation 1g-40. At this time, the UE triggers a timer for monitoring an ICST response signal from the gNB. At operation 1g-45, the UE may check whether the timer expires or whether an ICST response message is received before the timer expires. When the ICST response message is received from the gNB while the timer is running, the UE transitions to the RRC connected state at operation 1g-55. If the ICST response message is not received from the gNB until the timer expires, the UE maintains the inactive state at operation 1g-50.

Figure 1H:
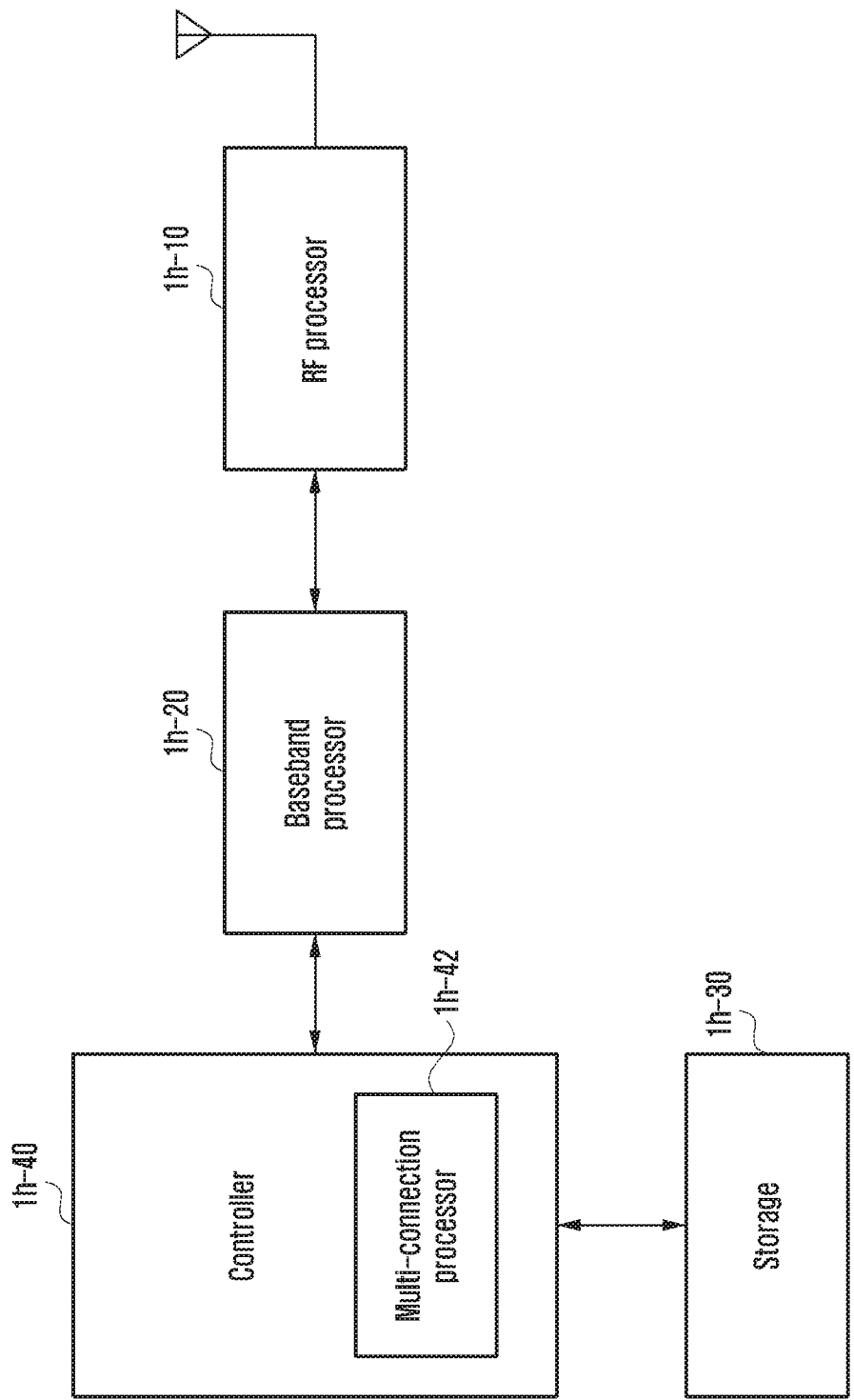
FIG. 1H is a block diagram illustrating a configuration of UE according to an embodiment of the disclosure.
Figure 11:
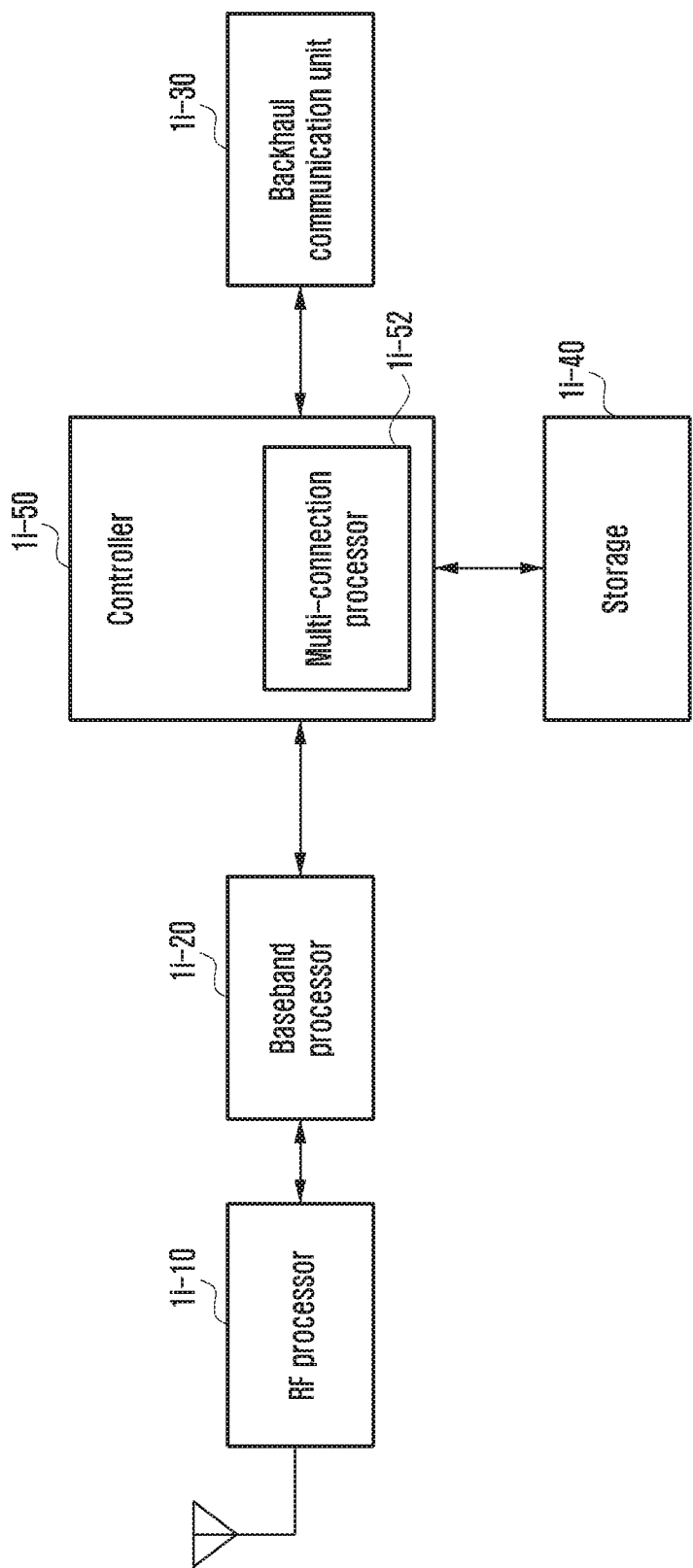

FIG. 1H is a block diagram illustrating a configuration of UE according to an embodiment of the disclosure.

Referring to FIG. 1H, the UE includes a radio frequency (RF) processor 1h-10, a baseband processor 1h-20, a storage 1h-30, and a controller 1h-40.

The RF processor 1h-10 performs a function, such as band conversion and amplification of a signal, for transmitting and receiving the signal through a radio channel. That is, the RF processor 1h-10 up-converts a baseband signal provided from the baseband processor 1h-20 into an RF band signal to transmit the RF band signal through an antenna, and also down-converts an RF band signal received through the antenna into a baseband signal. For example, the RF processor 1h-10 may include a transmitter filter, a receiver filter, an amplifier, a mixer, an oscillator, a digital to analog converter (DAC), an analog to digital converter (ADC), and the like. Although FIG. 1H shows only one antenna, the UE may have a plurality of antennas. In addition, the RF processor 1h-10 may include a plurality of RF chains. Further, the RF processor 1h-10 may perform beamforming. For the beamforming, the RF processor 1h-10 may adjust the phase and size of each signal transmitted and received through a plurality of antennas or antenna elements. Also, the RF processor 1h-10 may perform multiple-input multiple-output (MIMO) and receive several layers in the MIMO operation.

The baseband processor 1h-20 performs a conversion function between a baseband signal and a bit stream in accordance with a physical layer standard of the system. For example, in data transmission, the baseband processor 1h-20 creates complex symbols by encoding and modulating transmission bit streams. Also, in data reception, the baseband processor 1h-20 restores reception bit streams by demodulating and decoding a baseband signal provided from the RF processor 1h-10. In case of complying with OFDM scheme, in data transmission, the baseband processor 1h-20 generates complex symbols by encoding and modulating transmission bit streams, maps the complex symbols to subcarriers, and constructs OFDM symbols through an inverse fast Fourier transform (IFFT) operation and a cyclic prefix (CP) insertion. In addition, in data reception, the baseband processor 1h-20 divides a baseband signal provided from the RF processor 1h-10 into OFDM symbol units, restores signals mapped to subcarriers through a fast Fourier transform (FFT) operation, and restores reception bit streams through demodulation and decoding.

The baseband processor 1h-20 and the RF processor 1h-10 transmits and receives a signal as described above. Accordingly, the baseband processor 1h-20 and the RF processor 1h-10 may be referred to as a transmitting unit, a receiving unit, a transceiver, or a communication unit. In addition, at least one of the baseband processor 1h-20 and the RF processor 1h-10 may include a plurality of communication modules to support a plurality of different radio access technologies. Also, at least one of the baseband processor 1h-20 and the RF processor 1h-10 may include different communication modules for processing signals of different frequency bands. For example, the different radio access technologies may include a wireless local area network (LAN) (e.g., IEEE 802.11), a cellular network (e.g., LTE), and the like. In addition, the different frequency bands may include a super high frequency (SHF) band (e.g., 2.5 GHz, 5 GHz), and a millimeter wave (e.g., 60 GHz) band.

The storage 1h-30 stores a basic program for the operation of the UE, an application program, and data such as setting information. In particular, the storage 1h-30 may store information associated with a second access node that performs wireless communication by using a second radio access technology. Also, the storage 1h-30 provides the stored data in response to a request of the controller 1h-40.

The controller 1h-40 controls overall operations of the UE. For example, the controller 1h-40 transmits and receives a signal through the baseband processor 1h-20 and the RF processor 1h-10. Also, the controller 1h-40 writes and reads data to and from the storage 1h-40. For this, the controller 1h-40 may include at least one processor. For example, the controller 1h-40 may include a communication processor (CP) for performing the control for communication and an application processor (AP) for controlling an upper layer such as an application program. The controller 1h-40 includes a multi-connection processor that is configured to operate in a multiple connection mode.

FIG. 1I is a block diagram illustrating a configuration of a gNB according to an embodiment of the disclosure.

Referring to FIG. 1I, the gNB includes an RF processor 1i-10, a baseband processor 1i-20, a backhaul communication unit 1i-30, a storage 1i-40, and a controller 1i-50.

The RF processor 1i-10 performs a function, such as band conversion and amplification of a signal, for transmitting and receiving the signal through a radio channel. That is, the RF processor 1i-10 up-converts a baseband signal provided from the baseband processor 1i-20 into an RF band signal to transmit the RF band signal through an antenna, and also down-converts an RF band signal received through the antenna into a baseband signal. For example, the RF processor 1i-10 may include a transmitter filter, a receiver filter, an amplifier, a mixer, an oscillator, a DAC, an ADC, and the like. Although FIG. 1I shows only one antenna, the first access node may have a plurality of antennas. In addition, the RF processor 1i-10 may include a plurality of RF chains. Further, the RF processor 1i-10 may perform beamforming. For the beamforming, the RF processor 1i-10 may adjust the phase and size of each signal transmitted and received through a plurality of antennas or antenna elements. Also, the RF processor 1i-10 may perform MIMO and receive several layers in the MIMO operation.

The baseband processor 1i-20 performs a conversion function between a baseband signal and a bit stream in accordance with a physical layer standard of the first radio access technology. For example, in data transmission, the baseband processor 1i-20 creates complex symbols by encoding and modulating transmission bit streams. Also, in data reception, the baseband processor 1i-20 restores reception bit streams by demodulating and decoding a baseband signal provided from the RF processor 1i-10. In case of complying with OFDM scheme, in data transmission, the baseband processor 1i-20 generates complex symbols by encoding and modulating transmission bit streams, maps the complex symbols to subcarriers, and constructs OFDM symbols through an IFFT operation and a CP insertion. In addition, in data reception, the baseband processor 1i-20 divides a baseband signal provided from the RF processor 1i-10 into OFDM symbol units, restores signals mapped to subcarriers through an FFT operation, and restores reception bit streams through demodulation and decoding. The baseband processor 1i-20 and the RF processor 1i-10 transmits and receives a signal as described above. Thus, the baseband processor 1i-20 and the RF processor 1i-10 may be referred to as a transmitting unit, a receiving unit, a transceiver, a communication unit, or a wireless communication unit.

The backhaul communication unit 1i-30 provides an interface for performing communication with other nodes in a network. That is, the backhaul communication unit 1i-30 converts a bit stream transmitted from the gNB to another node, e.g., a sub-gNB, a CN, etc., into a physical signal, and also converts a physical signal received from such other node into a bit stream.

The storage 1i-40 stores a basic program for the operation of the gNB, an application program, and data such as setting information. In particular, the storage 1i-40 may store information on a bearer allocated to the connected UE, a measurement result reported from the connected UE, and the like. In addition, the storage 1i-40 may store information for determining whether to provide or suspend multiple connections to or from the UE. Also, the storage 1i-40 provides the stored data in response to a request of the controller 1i-50.

The controller 1i-50 controls overall operations of the gNB. For example, the controller 1i-50 transmits and receives a signal through the baseband processor 1i-20 and the RF processor 1i-10 or through the backhaul communication unit 1i-30. Also, the controller 1i-50 writes and reads data to and from the storage 1i-40. For this, the controller 1i-50 may include at least one processor. According to an embodiment of the disclosure, the controller 1i-50 includes a multiple connection processor 1i-52 that performs a process for operating in a multiple connection mode.

The above-described first embodiment of the disclosure may include the followings:

a method for the UE to transmit uplink data, based on contention without dynamically allocated transmission resources (grant-free), and a method for determining whether to request a state transition, based on the size of uplink data generated in the UE, wherein the above state transition refers to a change from an inactive state to an RRC connected state.

The overall operation

Broadcast of GFCB resource information through system information

GFCB resource information: Time pattern, Frequency resource, Transport format (i.e., MCS, etc.), Transport block size, Uplink power related information (i.e., power offset, etc.), DM-RS pool (multiple DM-RS codes/patterns), Timer 1

Generation of uplink (UL) data in UE of an inactive state (state transition check)

1. In case of requesting a state transition

Generation of ICST request message and N-byte UL data (N bytes=TB size−ITCST message size)

Insertion of ICST request message and N-byte data into MAC PDU

2. In case of not requesting a state transition

Generation of UL data corresponding to TB size

Insertion of data packet only into MAC PDU

Selection of DM-RS code/pattern in DM-RS pool

Trigger of timer 1 after transmission of MAC PDU through GFCB resource

Transition to the connected state when ICST response message is received before timer 1 expires Second Embodiment The second embodiment of the disclosure relates to a method for signaling a terminal category in a wireless communication system.

Figure 2A:
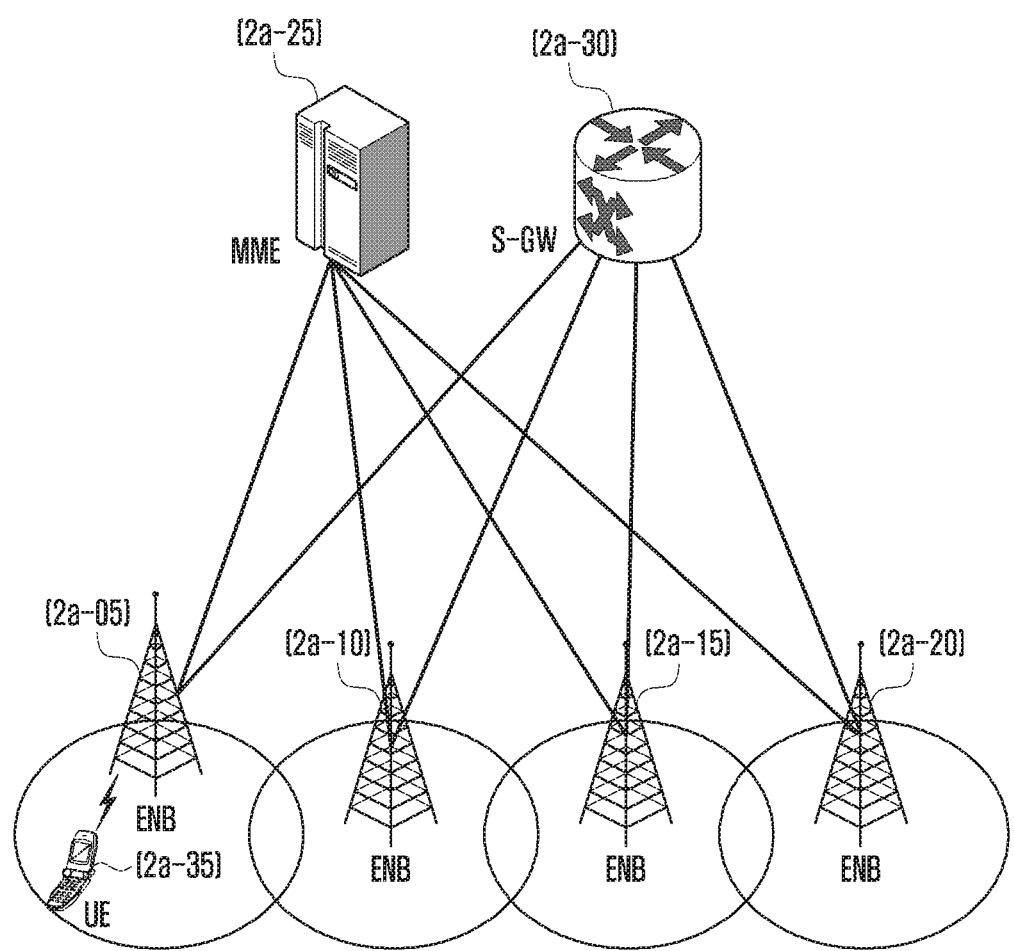
FIG. 2A is a diagram illustrating a structure of an LTE system according to an embodiment of the disclosure.

FIG. 2A is a diagram illustrating a structure of an LTE system according to an embodiment of the disclosure.

Referring to FIG. 2A, the wireless communication system includes a plurality of eNBs 2a-05, 2a-10, 2a-15 and 2a-20, a MME 2a-25, and an S-GW 2a-30. A UE 2a-35 accesses an external network through the eNB 2a-05, 2a-10, 2a-15 or 2a-20 and the S-GW 2a-30.

The eNBs 2a-05, 2a-10, 2a-15, and 2a-20 are access nodes of the cellular network and provide a radio access to UEs that desire to access the network. That is, in order to service user traffic, the eNBs 2a-05, 2a-10, 2a-15, and 2a-20 collect various kinds of state information such as buffer states, available transmission power states, and channel states of the UEs, perform scheduling, and support a connection between each UE and a CN. The MME 2a-25 is a device for performing various control functions as well as a mobility management function for the UE, and is connected to the plurality of eNBs. The S-GW 2a-30 is a device for providing a data bearer. In addition, the MME 2a-25 and the S-GW 2a-30 may further perform a bearer management and authentication for the UE that desires to access the network, and also process packets received from or to be transmitted to the eNBs 2a-05, 2a-10, 2a-15, and 2a-20.

Figure 2B:
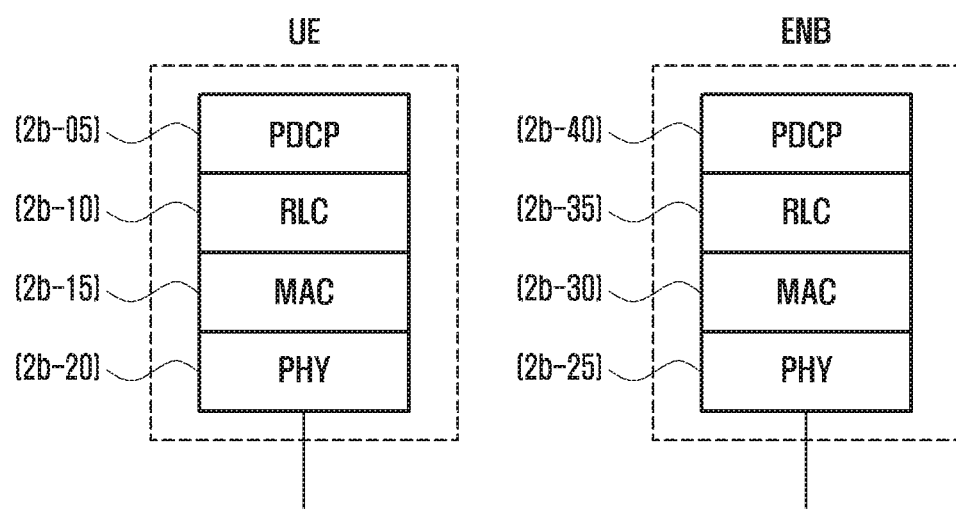
FIG. 2B is a diagram illustrating a radio protocol structure of an LTE system according to an embodiment of the disclosure.

FIG. 2B is a diagram illustrating a radio protocol structure of an LTE system according to an embodiment of the disclosure.

The NR to be defined in the future may adopt another radio protocol structure which is partially different from the illustrated radio protocol structure, but FIG. 2B will be described for a reference.

Referring to FIG. 2B, in each of the UE and the eNB, a radio protocol of the LTE system is composed of a PDCP 2b-05 or 2b-40, a RLC 2b-10 or 2b-35, and a MAC 2b-15 or 2b-30. The PDCP 2b-05 or 2b-40 performs an operation of IP header compression/decompression, and the like. The RLC 2b-10 or 2b-35 reassembles a PDCP PDU in a suitable size. The MAC 2b-15 or 2b-30 is connected with several RLC layer devices included in one UE and performs an operation of multiplexing RLC PDUs into a MAC PDU and demultiplexing RLC PDUs from the MAC PDU. A PHY 2b-20 or 2b-25 performs an operation of channel-coding and modulating upper layer data and then transmitting OFDM symbols thereof to the radio channel, or an operation of demodulating and channel-decoding OFDM symbols received through the radio channel and then delivering them to the upper layer. Also, the physical layer uses hybrid ARQ (HARQ) for additional error correction, and a receiving end transmits one bit indicating whether a packet transmitted from a transmitting end is received. This is called HARQ acknowledgement (ACK)/negative acknowledgement (NACK) information. Downlink HARQ ACK/NACK information for uplink transmission is transmitted through a physical hybrid-ARQ indicator channel (PHICH) physical channel, and uplink HARQ ACK/NACK information for downlink transmission may be transmitted through a physical uplink control channel (PUCCH) or physical uplink shared channel (PUSCH) physical channel.

Although not shown in the drawings, a RRC layer exists above the PDCP layer in each of the UE and the eNB. For RRC, the RRC layers may exchange a configuration control message related to access or measurement. For example, the eNB may instruct the UE on measurement by using an RRC layer message, and the UE may report a measurement result to the eNB by using an RRC layer message.

Figure 2C:
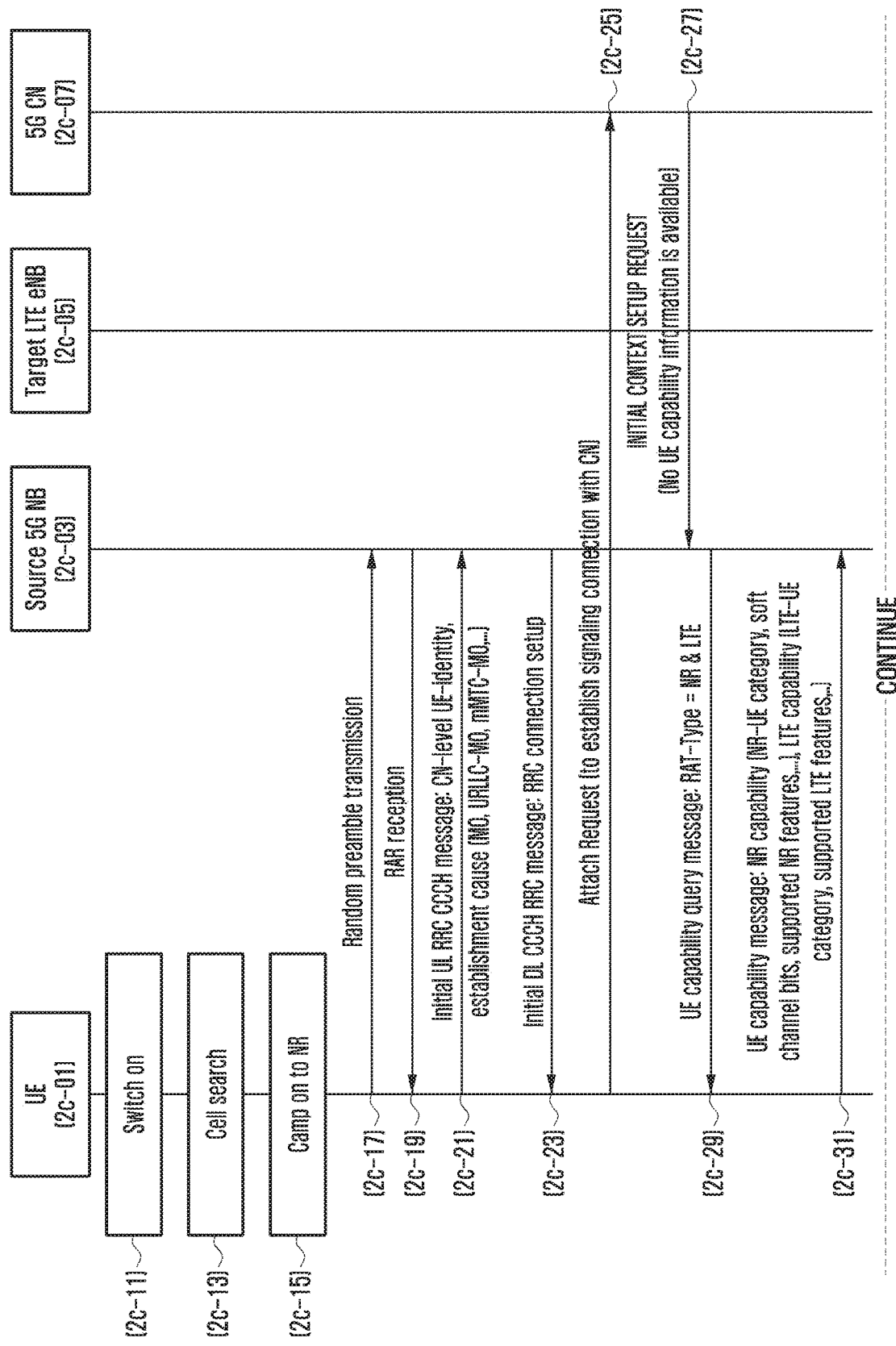
FIGS. 2CA and 2CB are diagrams illustrating a message flow between UE and a 5G NB according to an embodiment of the disclosure.
Figure 2C:
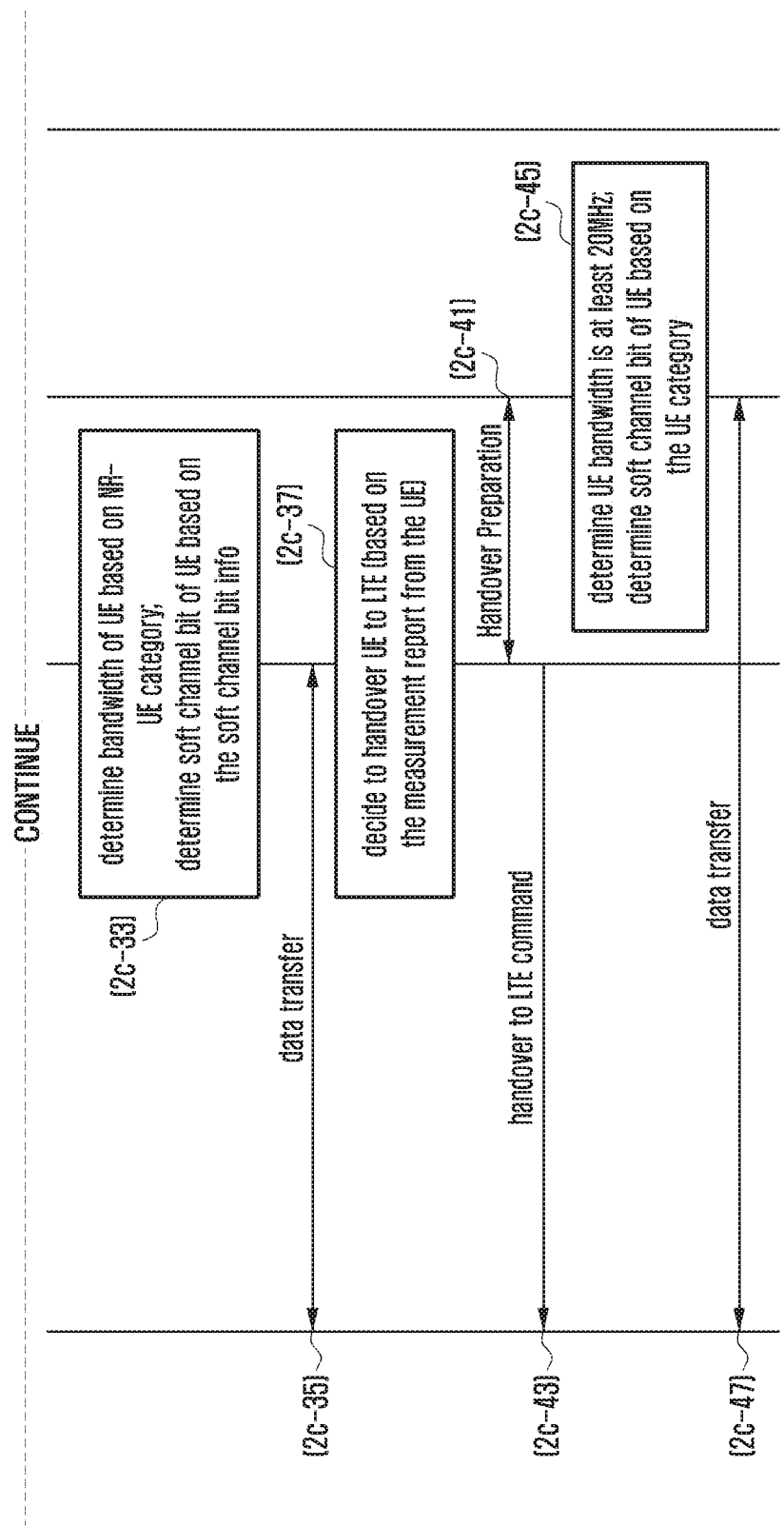

FIGS. 2CA and 2CB are diagrams illustrating a message flow between a UE and a 5G NB according to an embodiment of the disclosure.

Referring to FIGS. 2CA and 2CB, after switched on at operation 2c-11, the UE 2c-01 searches for neighboring cells at operation 2c-13 and camps on the 5G NB (also referred to as an NR base station, etc.) 2c-03 at operation 2c-15. That is, the UE 2c-01 selects a certain cell and waits in the selected cell. Then, for reasons such as the generation of data to be transmitted in uplink, the UE 2c-01 performs a random access procedure for entering a connected mode with the corresponding 5G NB 2c-03.

Specifically, at operation 2c-17, the UE 2c-01 transmits a random access preamble signal to the 5G NB 2c-03 to match uplink synchronization. At operation 2c-19, the 5G NB 2c-03 transmits a response message to the UE 2c-01 to notify the reception of the random access preamble signal to the UE 2c-01 and also provide uplink transmission timing information for uplink synchronization and uplink resource allocation information for uplink transmission to the UE 2c-01. At operation 2c-21, the UE 2c-01 transmits an initial uplink (UL) common control channel (CCCH) message of an RRC layer through a resource according to the resource allocation information. This is because the UE 2c-01 cannot transmit a dedicated control channel (DCCH) message because the UE 2c-01 is not yet connected to the 5G NB 2c-03.

The initial UL RRC CCCH message includes UE identifier information for a CN 2c-07 (the above-mentioned MME and any corresponding entity) and an establishment cause. The establishment cause has a value (e.g., mo-data) indicating data transmitted from the UE 2c-01 (mobile-originated), and one of a value (e.g., urllc-mo-data) indicating data transmission of ultra-reliable and low-latency communications (URLLC), and a value (e.g., mmtc-mo-data) indicating data transmission of massive machine-type communication (mMTC). This is because whether the UE 2c-01 supports the URLLC or the mMTC should be notified to the 5G NB 2c-03 more quickly than the UE category and the corresponding service should be started immediately.

Based on the received information, the 5G NB 2c-03 determines whether to allow connection of the UE 2c-01, and establishes the connection of the UE 2c-01 through a downlink (DL) CCCH message at operation 2c-23. Therefore, the UE 2c-01 is connected to the 5G NB 2c-03 (RRC connected state), and transmits at operation 2c-25 an attach request message to the CN 2c-07 in order to access the CN 2c-07 as well as the 5G NB 2c-03. Accordingly, the 5G CN 2c-07 transmits an initial UE setup request message to the 5G NB 2c-03 at operation 2c-27. However, because of assuming the initial transmission of the UE 2c-01, the CN 2c-07 informs the 5G NB 2c-03 that there is no UE capability information (a UE function, a maximum transfer rate, etc.).

Therefore, at operation 2c-29, the 5G NB 2c-03 transmits a UE capability query message to the UE 2c-01. The UE capability query message may include information on querying which system (e.g., 2G, 3G, 4G, or the like, depending on the current operator's network) the UE 2c-01 has the capability about. The illustrated example assumes a scenario that queries NR and LTE capabilities. In reply, the UE 2c-01 reports the NR and LTE related capabilities at operation 2c-31.

The LTE related capability includes an LTE category of the UE. The following information is implicitly expressed in the category, so that the network can deduce the implied information from only the category information of the UE.

| | |
|---|---|
| Downlink physical layer parameter | Maximum number of DL-SCH transport block bits received within a TTI (i.e. overall maximum bit rate that can be achieved if 20 MHz BW per CC is provided); hereafter max DL bit per TTI Maximum number of bits of a DL-SCH transport block received within a TTI (i.e. maximum bit rate that can be achieved per CC w/o MIMO if 20 MHz BW is provided); hereafter max DL bit per TB Total number of soft channel bits Maximum number of supported layers for spatial multiplexing in DL; hereafter max layers |
| Uplink physical layer parameter | Maximum number of UL-SCH transport block bits transmitted within a TTI, hereafter max UL bit per TTI Maximum number of bits of an UL-SCH transport block transmitted within a TTI; hereafter max UL bit per TB Support for 64QAM in UL |
| Total layer 2 buffer sizes | Total layer 2 buffer sizes With support for split bearers |
| MBMS related | Maximum number of bits of a MCH transport block received within a TTI; max MCH bit per TTI |
| Half-duplex FDD operation type | Half-duplex FDD operation type |

The LTE UE category is frequently used as an index indicating the maximum data rate of the UE, which is calculated on the assumption that the bandwidth of the UE is at least 20 MHz. In LTE, the maximum bandwidth per cell is 20 MHz, and the minimum bandwidth of the UE is also 20 MHz. Therefore, considering only the UE category and the system bandwidth of a corresponding cell, a scheduler of the eNB can determine the maximum data rate providable to the UE in the corresponding cell and a frequency band for scheduling the UE. This is because the UE bandwidth is always greater than or equal to the system bandwidth.

On the other hand, the NR related capability includes an NR category. In NR, a variety of bandwidths may be provided, and the UE bandwidth may be sometimes smaller than the bandwidth of the 5G NB. Therefore, the 5G NB cannot perform scheduling by considering only the bandwidth thereof. That is, when the UE bandwidth is unknown, the 5G NB cannot determine a frequency resource and its bandwidth for the UE scheduling. Therefore, since it is desirable to notify the UE bandwidth to the 5G NB as soon as possible, the UE bandwidth information should be further included in the NR UE category.

Additionally, in LTE, the soft channel bits may be derived by linking with a DL category. This is designed on the assumption that the bandwidth of the eNB is homogeneous. However, in order to give a greater diversity to the soft channel bits, NR which is a next generation communication system suggests that soft channel bits are independently signaled rather than included in the DL category. The following table summarizes information contained in the LTE category and the NR category.

| LTE DL ue-Category | LTE UL ue-Category |
|---|---|
| max DL bit per TTI max DL bit per TB Total number of soft channel bits | max UL bit per TTI max UL bit per TB |
| Layer 2 buffer size max MCH bit per TTI | |
| NR DL ue-Category | NR UL ue-Category |
| max DL bit per TTI max DL bit per TB Layer 2 buffer size max MCH bit per TTI Total DL bandwidth | max UL bit per TTI max UL bit per TB |

When the NR related capability and the LTE related capability are delivered to the 5G NB 2c-03 by the UE 2c-01, the 5G NB 2c-03 can know the UE bandwidth from the NR category information and also determine the maximum available soft channel bit of the UE 2c-01 from the soft channel bit information of NR at operation 2c-33. Therefore, at operation 2c-35, the 5G NB 2c-03 performs data transmission/reception with the UE 2c-01 by using the above bandwidth and the maximum processable bits.

Thereafter, a scenario may be considered in which the UE 2c-01 measures and reports the signal strength, etc. of neighbor base stations and then, at operation 2c-37, the 5G NB 2c-03 decides to handover the UE 2c-01 to the LTE eNB 2c-05. Accordingly, the 5G NB 2c-03 performs a handover preparation procedure with the LTE eNB 2c-05 at operation 2c-41 and transmits a handover command to the UE 2c-01 at operation 2c-43. At operation 2c-45, the LTE eNB 2c-05 receives the NR related capability and the LTE related capability from the 5G NB 2c-03, assumes that the UE bandwidth supports at least 20 MHz, and may determine the maximum available soft channel bit of the UE 2c-01 in LTE, based on the LTE category information. Thus, at operation 2c-47, the LTE eNB 2c-05 performs data transmission/reception with the UE 2c-01 by using the above bandwidth and the maximum processable bits.

Figure 2D:
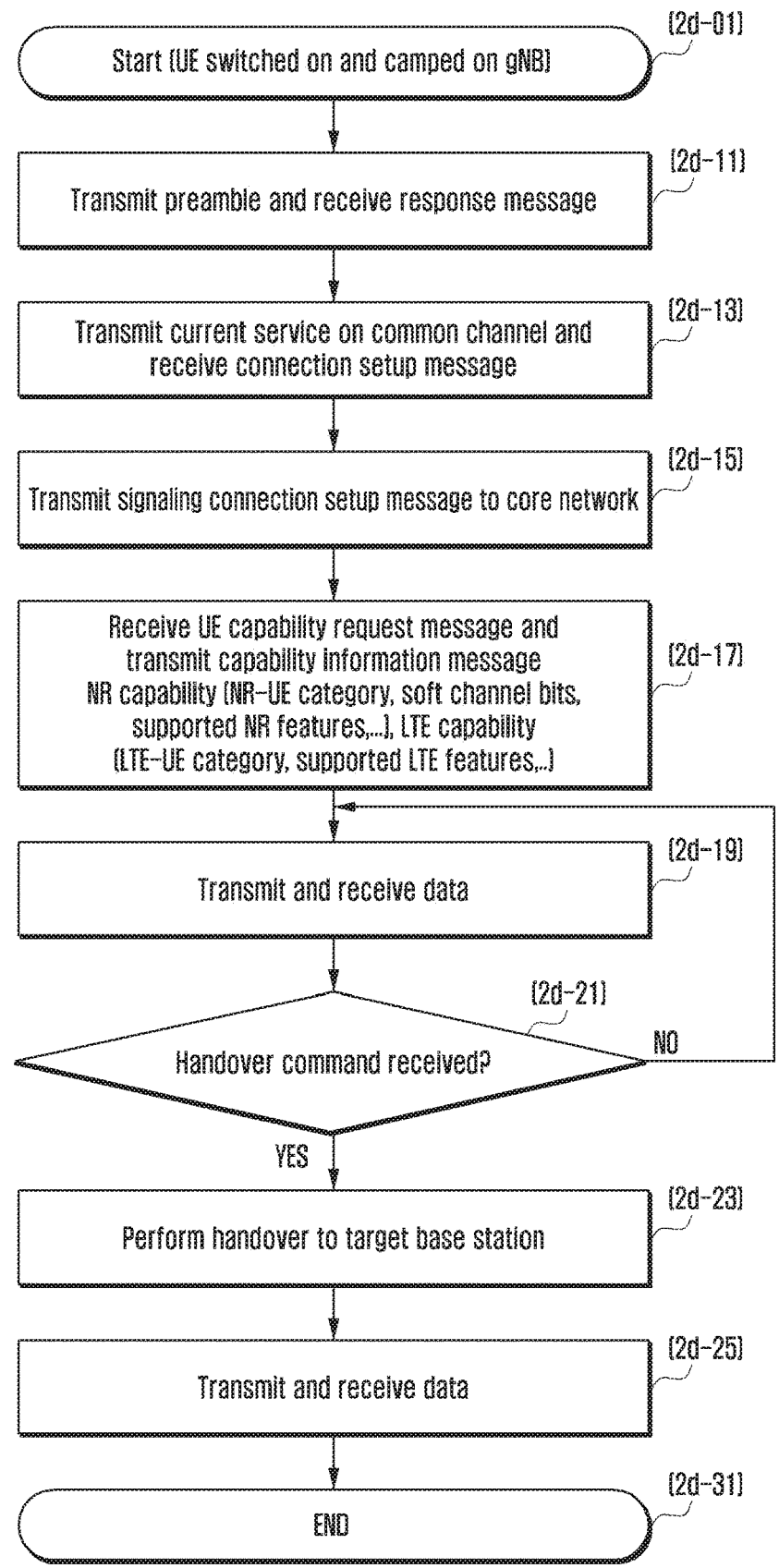
FIG. 2D is a diagram illustrating an operation of a UE according to an embodiment of the disclosure.

FIG. 2D is a diagram illustrating an operation of a UE according to an embodiment of the disclosure.

Referring to FIG. 2D, it is assumed that after switched on, the UE searches for neighboring cells and camps on the 5G NB at operation 2d-01 (namely, selecting a certain cell and waiting in the selected cell).

Thereafter, for reasons such as the generation of data to be transmitted in uplink, the UE performs a random access procedure for entering a connected mode with the corresponding 5G NB. Specifically, at operation 2d-11, the UE transmits a random access preamble signal to the 5G NB to match uplink synchronization and receives a response message. The response message includes uplink transmission timing information for uplink synchronization and uplink resource allocation information to be used for uplink transmission.

At operation 2d-13, the UE transmits an initial UL CCCH message of an RRC layer through a corresponding resource according to the resource allocation information. This is because the UE cannot transmit a DCCH message because the UE is not yet connected to the 5G NB. The initial UL RRC CCCH message includes UE identifier information for the CN (the above-mentioned MME and any corresponding entity) and an establishment cause. The establishment cause has a value (e.g., mo-data) indicating mobile-originated data, and one of a value (e.g., urllc-mo-data) indicating data transmission of ultra-reliable and low-latency communications (URLLC), and a value (e.g., mmtc-mo-data) indicating data transmission of massive machine-type communication (mMTC). This is because whether the UE supports the URLLC or the mMTC should be notified to the 5G NB more quickly than the UE category and the corresponding service should be started immediately. Thereafter, the UE receives a connection setup message from the 5G NB through a DL CCCH message. Therefore, the UE is connected to the 5G NB (RRC connected state).

Then, at operation 2d-15, the UE transmits an attach request message to the CN in order to access the CN as well as the 5G NB. Thereafter, when a UE capability query message is received from the 5G NB, the UE reports UE capabilities for systems (e.g., NR and LTE) at operation 2d-17.

The LTE related capability includes an LTE category of the UE. The following information is implicitly expressed in the category, so that the network can deduce the implied information from only the category information of the UE.

| | |
|---|---|
| Downlink physical layer parameter | Maximum number of DL-SCH transport block bits received within a TTI (i.e. overall maximum bit rate that can be achieved if 20 MHz BW per CC is provided); hereafter max DL bit per TTI<br>Maximum number of bits of a DL-SCH transport block received within a TTI (i.e. maximum bit rate that can be achieved per CC w/o MIMO if 20 MHz BW is provided); hereafter max DL bit per TB<br>Total number of soft channel bits<br>Maximum number of supported layers for spatial multiplexing in DL; hereafter max layers |
| Uplink physical layer parameter | Maximum number of UL-SCH transport block bits transmitted within a TTI; hereafter max UL bit per TTI<br>Maximum number of bits of an UL-SCH transport block transmitted within a TTI; hereafter max UL bit per TB<br>Support for 64QAM in UL |
| Total layer 2 buffer sizes | Total layer 2 buffer sizes<br>With support for split bearers |
| MBMS related | Maximum number of bits of a MCH transport block received within a TTI; max MCH bit per TTI |
| Half-duplex FDD operation type | Half-duplex FDD operation type |

The LTE UE category is frequently used as an index indicating the maximum data rate of the UE, which is calculated on the assumption that the bandwidth of the UE is at least 20 MHz. In LTE, the maximum bandwidth per cell is 20 MHz, and the minimum bandwidth of the UE is also 20 MHz. Therefore, considering only the UE category and the system bandwidth of a corresponding cell, a scheduler of the eNB can determine the maximum data rate providable to the UE in the corresponding cell and a frequency band for scheduling the UE. This is because the UE bandwidth is always greater than or equal to the system bandwidth.

On the other hand, the NR related capability includes an NR category. In NR, a variety of bandwidths may be provided, and the UE bandwidth may be sometimes smaller than the bandwidth of the 5G NB. Therefore, the 5G NB cannot perform scheduling by considering only the bandwidth thereof. That is, when the UE bandwidth is unknown, the 5G NB cannot determine a frequency resource and its bandwidth for the UE scheduling. Therefore, since it is desirable to notify the UE bandwidth to the 5G NB as soon as possible, the UE bandwidth information should be further included in the NR UE category.

Additionally, in LTE, the soft channel bits may be derived by linking with a DL category. This is designed on the assumption that the bandwidth of the eNB is homogeneous. However, in order to give a greater diversity to the soft channel bits, NR which is a next generation communication system suggests that soft channel bits are independently signaled rather than included in the DL category. The following table summarizes information contained in the LTE category and the NR category.

| LTE DL ue-Category | LTE UL ue-Category |
|---|---|
| max DL bit per TTI<br>max DL bit per TB<br>Total number of soft channel bits | max UL bit per TTI<br>max UL bit per TB |
| Layer 2 buffer size<br>max MCH bit per TTI | |
| NR DL ue-Category | NR UL ue-Category |
| max DL bit per TTI<br>max DL bit per TB<br>Layer 2 buffer size<br>max MCH bit per TTI<br>Total DL bandwidth | max UL bit per TTI<br>max UL bit per TB |

When the NR related capability and the LTE related capability are delivered to the 5G NB, the 5G NB can know the UE bandwidth from the NR category information and also determine the maximum available soft channel bit of the UE from the soft channel bit information of NR. Accordingly, the 5G NB performs DL/UL resource allocation (i.e., scheduling) to the UE by using the above bandwidth and the maximum processable bits and then performs data transmission/reception with the UE at operation 2d-19.

Thereafter, if a handover command is received from the 5G NB at operation 2d-21, the UE performs handover to a target base station at operation 2d-23. Depending on whether the target base station is the 5G NB or the LTE eNB, the UE may determine the UE bandwidth and the maximum processable soft channel bits as described above. Therefore, at operation 2d-25, the UE receives scheduling from the target base station and performs data transmission/reception with the target base station and then ends at operation 2d-31.

Figure 2E:
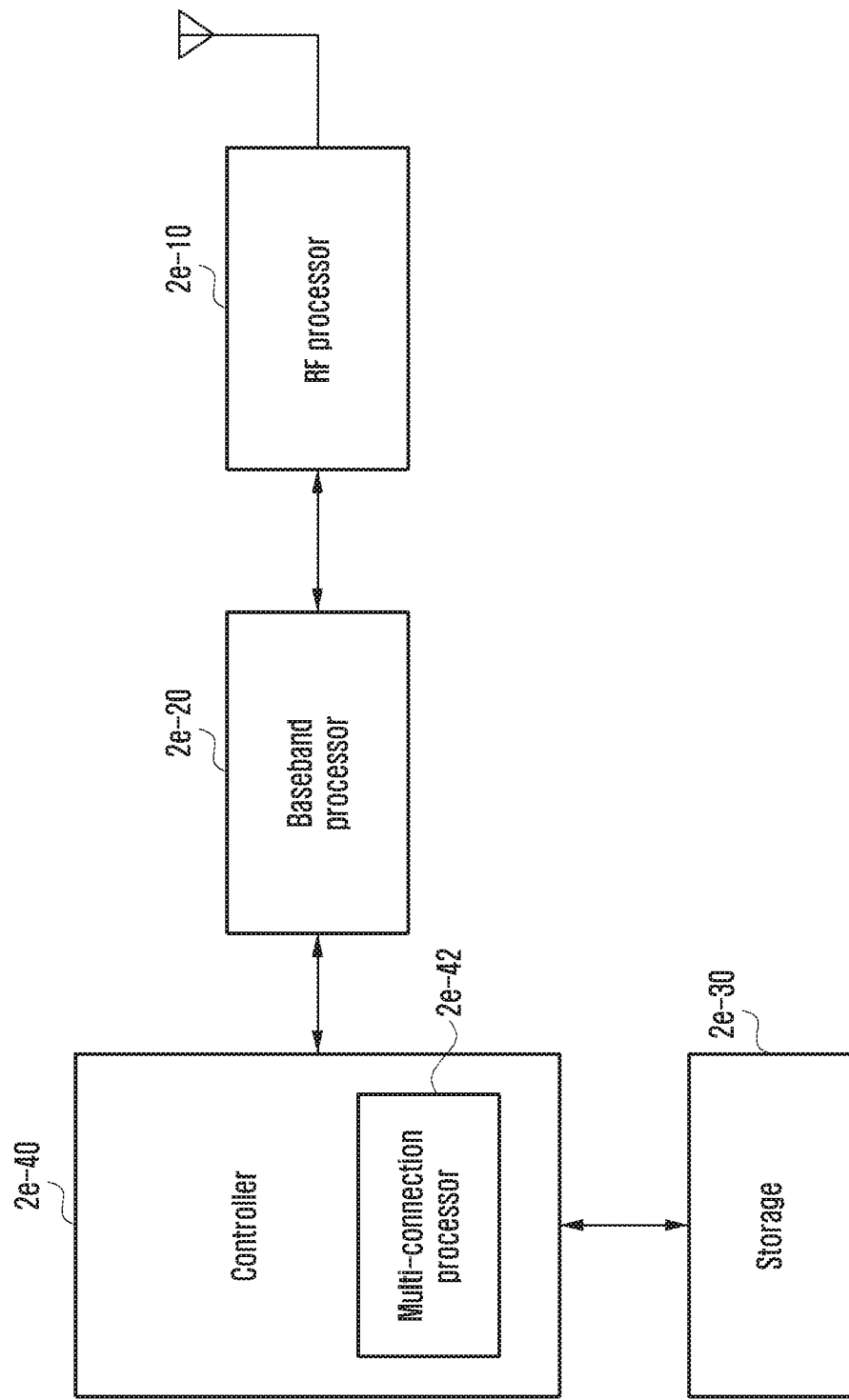
FIG. 2E is a diagram illustrating a configuration of a UE according to an embodiment of the disclosure.

FIG. 2E is a diagram illustrating a configuration of a UE according to an embodiment of the disclosure.

Referring to FIG. 2E, the UE includes a RF processor 2e-10, a baseband processor 2e-20, a storage 2e-30, and a controller 2e-40.

The RF processor 2e-10 performs a function, such as band conversion and amplification of a signal, for transmitting and receiving the signal through a radio channel. That is, the RF processor 2e-10 up-converts a baseband signal provided from the baseband processor 2e-20 into an RF band signal to transmit the RF band signal through an antenna, and also down-converts an RF band signal received through the antenna into a baseband signal. For example, the RF processor 2e-10 may include a transmitter filter, a receiver filter, an amplifier, a mixer, an oscillator, a DAC, an ADC, and the like. Although FIG. 2E shows only one antenna, the UE may have a plurality of antennas. In addition, the RF processor 2e-10 may include a plurality of RF chains. Further, the RF processor 2e-10 may perform beamforming. For the beamforming, the RF processor 2e-10 may adjust the phase and size of each signal transmitted and received through a plurality of antennas or antenna elements.

The baseband processor 2e-20 performs a conversion function between a baseband signal and a bit stream in accordance with a physical layer standard of the system. For example, in data transmission, the baseband processor 2e-20 creates complex symbols by encoding and modulating transmission bit streams. Also, in data reception, the baseband processor 2e-20 restores reception bit streams by demodulating and decoding a baseband signal provided from the RF processor 2e-10. In case of complying with OFDM scheme, in data transmission, the baseband processor 2e-20 generates complex symbols by encoding and modulating transmission bit streams, maps the complex symbols to subcarriers, and constructs OFDM symbols through an IFFT operation and a CP insertion. In addition, in data reception, the baseband processor 2e-20 divides a baseband signal provided from the RF processor 2e-10 into OFDM symbol units, restores signals mapped to subcarriers through a FFT operation, and restores reception bit streams through demodulation and decoding.

The baseband processor 2e-20 and the RF processor 2e-10 transmits and receives a signal as described above. Accordingly, the baseband processor 2e-20 and the RF processor 2e-10 may be referred to as a transmitting unit, a receiving unit, a transceiver, or a communication unit. In addition, at least one of the baseband processor 2e-20 and the RF processor 2e-10 may include different communication modules for processing signals of different frequency bands. The different frequency bands may include a super high frequency (SHF) band (e.g., 2.5 GHz, 5 GHz), and a millimeter wave (e.g., 60 GHz) band.

The storage 2e-30 stores a basic program for the operation of the UE, an application program, and data such as setting information.

The controller 2e-40 controls overall operations of the UE. For example, the controller 2e-40 transmits and receives a signal through the baseband processor 2e-20 and the RF processor 2e-10. Also, the controller 2e-40 writes and reads data to and from the storage 2e-30. For this, the controller 2e-40 may include at least one processor. For example, the controller 2e-40 may include a CP for performing the control for communication and an AP for controlling an upper layer such as an application program. According to an embodiment of the disclosure, the controller 2e-40 includes a multiple connection processor 2e-42 that performs a process for operating in a multiple connection mode. For example, the controller 2e-40 may control the UE to perform the operation procedure shown in FIG. 2D.

According to an embodiment of the disclosure, the controller 2e-40 sets up an establishment cause value suitable for a service supported at the initial connection and transmits it to the 5G NB through the baseband processor and the RF processor.

Third Embodiment

In the next generation mobile communication system, a terminal with no data transmission/reception for a given time may be placed in an RRC inactive mode rather than in an RRC idle mode. The terminal in the RRC inactive mode can access a network with less signaling than in the RRC idle mode, and can have a smaller paging area (also referred to as an RAN paging area, an RAN notification area, or a CN based paging area). Therefore, the network can wake up the terminal more quickly through a paging message to allow the terminal to attempt access. The disclosure provides a method and apparatus for supporting mobility of the terminal which is in an inactive mode (also referred to as an RRC inactive mode, an RRC inactive state, or a lightly-connected mode) in the next generation mobile communication system.

Figure 3A:
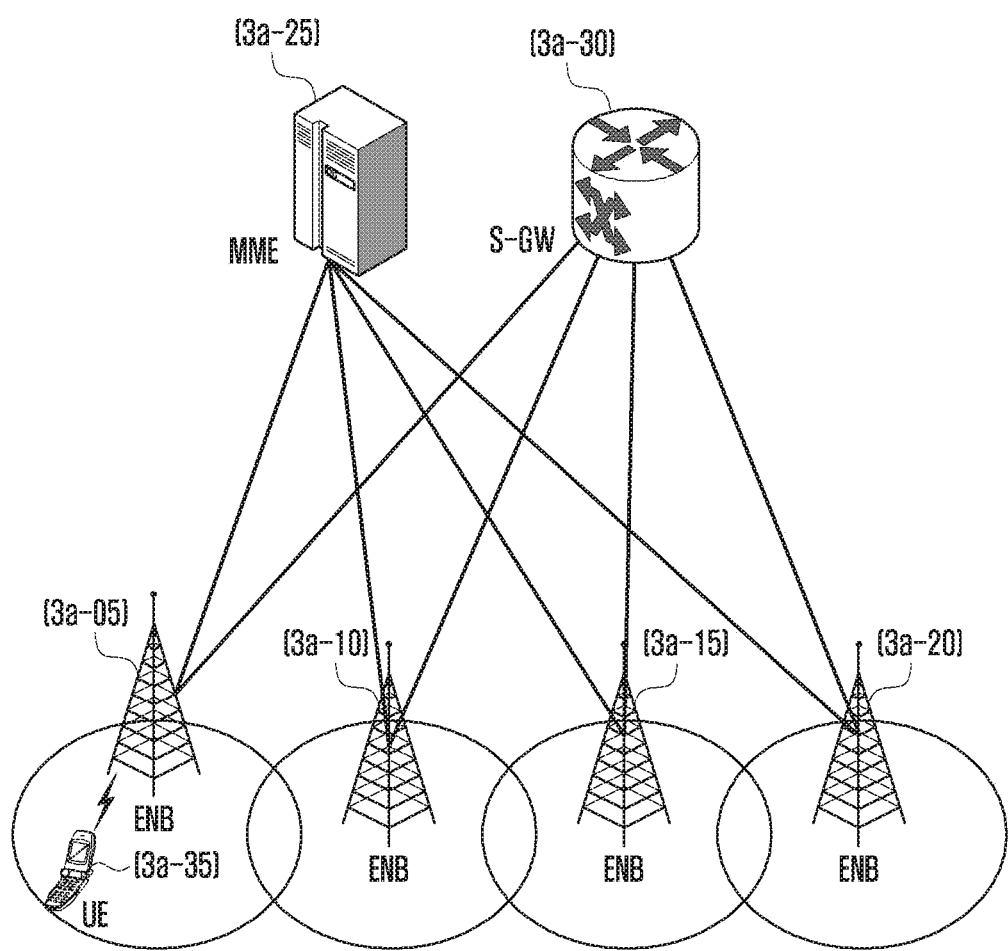
FIG. 3A is a diagram illustrating a structure of an LTE system according to an embodiment of the disclosure.

FIG. 3A is a diagram illustrating a structure of an LTE system according to an embodiment of the disclosure.

Referring to FIG. 3A, a RAN of the LTE system includes a plurality of eNBs (also referred to as E-UTRAN Node B, evolved Node B, eNodeB, or a base station) 3a-05, 3a-10, 3a-15 and 3a-20, a MME 3a-25, and a S-GW 3a-30. A user equipment (also referred to as UE or a terminal) 3a-35 accesses an external network through the eNB 3a-05, 3a-10, 3a-15 or 3a-20 and the S-GW 3a-30.

Each of the eNBs 3a-05, 3a-10, 3a-15, and 3a-20 corresponds to the existing node B of the universal mobile telecommunications system (UMTS) system. This eNB is connected to the UE 3a-35 via a radio channel and performs a more complicated function than that of the existing node B. Since all kinds of user traffic including a real-time service such as voice over IP (VoIP) is served through a shared channel in the LTE system, a device for collecting various kinds of state information such as buffer states, available transmission power states, and channel states of the UEs and performing scheduling is required. The eNBs 3a-05, 3a-10, 3a-15, and 3a-20 are in charge of this. Normally, one eNB controls a plurality of cells. For example, in order to realize a transfer rate of 100 Mbps, the LTE system uses, as a radio access technique, OFDM at the bandwidth of 20 MHz. In addition, an AMC scheme is used to determine a modulation scheme and a channel coding rate according to a channel state of the UE. The MME 3a-25 is a device for performing various control functions as well as a mobility management function for the UE, and is connected to the plurality of eNBs. The S-GW 3a-30 is a device for providing a data bearer, and creates or removes the data bearer under the control of the MME 3a-25.

Figure 3B:
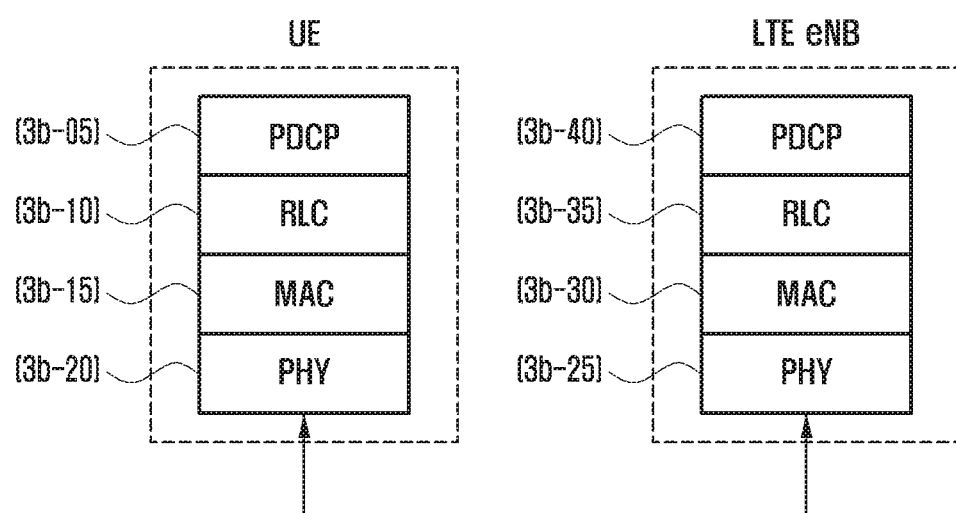
FIG. 3B is a diagram illustrating a radio protocol structure of an LTE system according to an embodiment of the disclosure.

FIG. 3B is a diagram illustrating a radio protocol structure of an LTE system according to an embodiment of the disclosure.

Referring to FIG. 3B, in each of the UE and the eNB, a radio protocol of the LTE system is composed of a PDCP 3b-05 or 3b-40, a RLC 3b-10 or 3b-35, and a MAC 3b-15 or 3b-30. The PDCP 3b-05 or 3b-40 performs an operation of IP header compression/decompression, and the like. The main functions of the PDCP are summarized as follows.

Header compression and decompression: robust header compression (ROHC) only

Transfer of user data

In-sequence delivery of upper layer PDUs at PDCP re-establishment procedure for RLC AM For split bearers in DC (only support for RLC AM): PDCP PDU routing for transmission and PDCP PDU reordering for reception Duplicate detection of lower layer SDUs at PDCP re-establishment procedure for RLC AM Retransmission of PDCP SDUs at handover and, for split bearers in DC, of PDCP PDUs at PDCP data-recovery procedure, for RLC AM Ciphering and deciphering Timer-based SDU discard in uplink The RLC 3b-10 or 3b-35 performs an ARQ operation or the like by reassembling a PDCP PDU in a suitable size. The main functions of the RLC are summarized as follows.

Transfer of upper layer PDUs

Error correction through ARQ (only for AM data transfer)

Concatenation, segmentation and reassembly of RLC SDUs (only for UM and AM data transfer)

Re-segmentation of RLC data PDUs (only for AM data transfer)

Reordering of RLC data PDUs (only for UM and AM data transfer)

Duplicate detection (only for UM and AM data transfer)

Protocol error detection (only for AM data transfer)

RLC SDU discard (only for UM and AM data transfer)

RLC re-establishment

The MAC 3b-15 or 3b-30 is connected to several RLC layer devices included in one UE and performs an operation of multiplexing RLC PDUs into a MAC PDU and demultiplexing RLC PDUs from the MAC PDU. The main functions of the MAC are summarized as follows.

Mapping between logical channels and transport channels

Multiplexing/demultiplexing of MAC SDUs belonging to one or different logical channels into/from transport blocks (TB) delivered to/from the physical layer on transport channels Scheduling information reporting Error correction through HARQ Priority handling between logical channels of one UE Priority handling between UEs by means of dynamic scheduling MBMS service identification Transport format selection Padding A PHY 3b-20 or 3b-25 performs an operation of channel-coding and modulating upper layer data and then transmitting OFDM symbols thereof to the radio channel, or an operation of demodulating and channel-decoding OFDM symbols received through the radio channel and then delivering them to the upper layer.

Figure 3C:
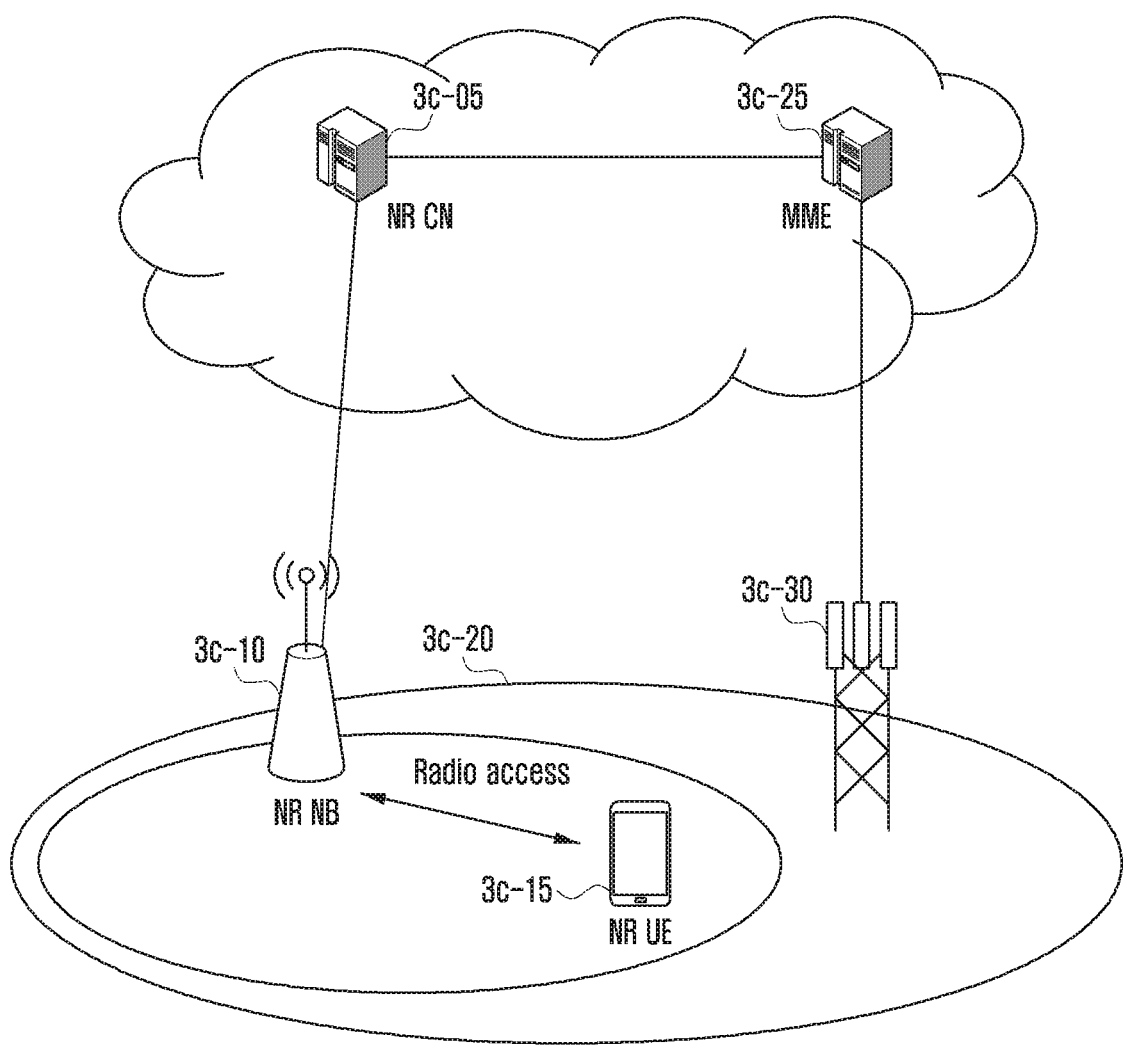
FIG. 3C is a diagram illustrating a structure of a next generation mobile communication system according to an embodiment of the disclosure.

FIG. 3C is a diagram illustrating a structure of a next generation mobile communication system according to an embodiment of the disclosure.

Referring to FIG. 3C, a RAN of the next generation mobile communication system (hereinafter, NR or 5G) includes a next generation base station (also referred to as a new radio node B, NR gNB, gNB, 5G NB, or an NR base station) 3c-10 and a NR CN 3c-05. A user terminal (also referred to as new radio user equipment, NR UE, UE, or terminal) 3c-15 accesses an external network through the NR gNB 3c-10 and the NR CN 3c-05.

In FIG. 3C, the NR gNB 3c-10 corresponds to the eNB of the existing LTE system. The NR gNB 3c-10 is connected to the NR UE 3c-15 through a radio channel and can provide a better service than the existing Node B. In the next generation mobile communication system, since all user traffic is provided through a shared channel, a device for collecting various kinds of state information, such as buffer states, available transmission power states, and channel states of NR UEs, and thereby performing scheduling is required. This is performed by the NR gNB 3c-10. Normally, one NR gNB 3c-10 controls a plurality of cells and includes a CU for performing control and signaling and a DU for performing transmission and reception of signals. In order to realize high-speed data transfer compared to the existing LTE, more than the existing maximum bandwidth may be applied, and also a beamforming technique may be used with OFDM as a radio access technology. In addition, an AMC scheme is used to determine a modulation scheme and a channel coding rate according to a channel state of the NR UE. The NR CN 3c-05 performs functions such as mobility support, bearer setup, and QoS setup. The NR CN 3c-05 is a device for performing various control functions as well as a mobility management function for the NR UE, and is connected to a plurality of NR gNB. Also, the next generation mobile communication system may be linked to the existing LTE system, and the NR CN 3c-05 is connected to the MME 3c-25 through a network interface. The MME 3c-25 is connected to the eNB 3c-30 which is the existing base station that serves area 3c-20.

Figure 3D:
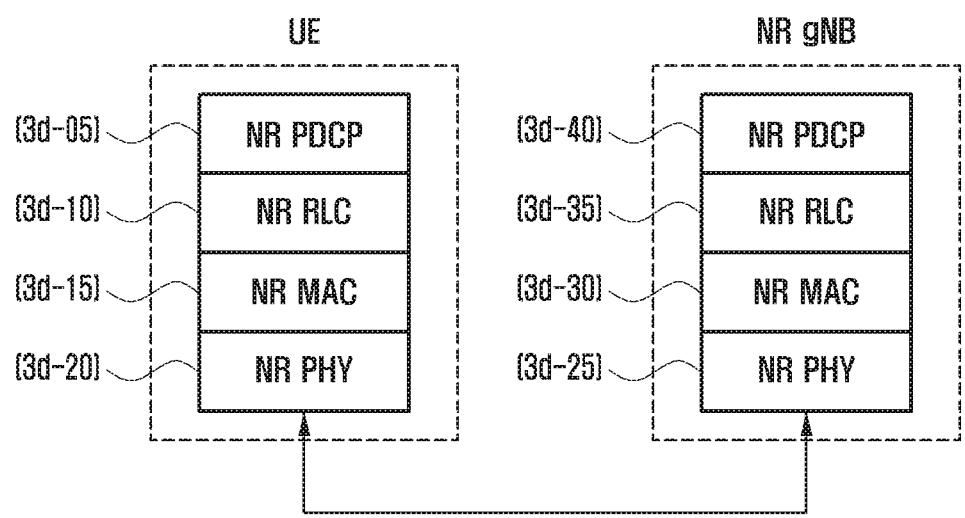
FIG. 3D is a diagram illustrating a radio protocol structure of a next generation mobile communication system according to an embodiment of the disclosure.

FIG. 3D is a diagram illustrating a radio protocol structure of a next generation mobile communication system according to an embodiment of the disclosure.

Referring to FIG. 3D, in each of the UE and the NR gNB, a radio protocol of the next generation mobile communication system is composed of an NR PDCP 3d-05 or 3d-40, an NR RLC 3d-10 or 3d-35, and an NR MAC 3d-15 or 3d-30. The main functions of the NR PDCP 3d-05 or 3d-40 may include at least parts of the following functions.

Header compression and decompression: ROHC only

Transfer of user data

In-sequence delivery of upper layer PDUs

PDCP PDU reordering for reception

Duplicate detection of lower layer SDUs

Retransmission of PDCP SDUs

Ciphering and deciphering

Timer-based SDU discard in uplink

In the above, the reordering function of the NR PDCP refers to a function of rearranging PDCP PDUs received from a lower layer on the basis of a PDCP sequence number (PDCP SN). The reordering function may include a function of delivering data to an upper layer in the order of rearrangement, a function of recording lost PDCP PDUs through reordering, a function of reporting the status of the lost PDCP PDUs to a transmitter, and/or a function of requesting retransmission of the lost PDCP PDUs.

The main functions of the NR RLC 3d-10 or 3d-35 may include at least parts of the following functions.

Transfer of upper layer PDUs

In-sequence delivery of upper layer PDUs

Out-of-sequence delivery of upper layer PDUs

Error correction through ARQ

Concatenation, segmentation and reassembly of RLC SDUs

Re-segmentation of RLC data PDUs

Reordering of RLC data PDUs

Duplicate detection

Protocol error detection

RLC SDU discard

RLC re-establishment

In the above, the in-sequence delivery function of the NR RLC refers to a function of delivering RLC SDUs, received from a lower layer, to an upper layer in order. If one original RLC SDU is divided into several RLC SDUs and then received, the in-sequence delivery function may include a function of reassembling and delivering the RLC PDUs, a function of rearranging the received RLC PDUs on the basis of an RLC sequence number (SN) or a PDCP SN, a function of recording lost RLC PDUs through reordering, a function of reporting the status of the lost RLC PDUs to a transmitter, and/or a function of requesting retransmission of the lost RLC PDUs. If there is a lost RLC SDU, the in-sequence delivery function may include a function of delivering only the RLC SDUs before the lost RLC SDU to an upper layer in order. If a given timer expires even if there is a lost RLC SDU, the in-sequence delivery function may include a function of delivering all the RLC SDUs, received before the start of the timer, to an upper layer in order, or a function of delivering all the RLC SDUs, received up to the present moment, to an upper layer in order.

In the above, the out-of-sequence delivery function of the NR RLC refers to a function of delivering RLC SDUs, received from a lower layer, directly to an upper layer regardless of order. If one original RLC PDU is divided into several RLC SDUs and then received, the out-of-sequence delivery function may include a function of reassembling and delivering the RLC PDUs, and a function of recording lost RLC PDUs by storing RLC SNs or PDCP SNs of the received RLC PDUs and reordering them.

The NR MAC 3d-15 or 3d-30 is connected to several NR RLC layer devices included in one UE, and the main functions of the NR MAC may include at least parts of the following functions.

Mapping between logical channels and transport channels
Multiplexing/demultiplexing of MAC SDUs
Scheduling information reporting
Error correction through HARQ
Priority handling between logical channels of one UE
Priority handling between UEs by means of dynamic scheduling
MBMS service identification
Transport format selection
Padding A PHY 3d-20 or 3d-25 performs an operation of channel-coding and modulating upper layer data and then transmitting OFDM symbols thereof to the radio channel, or an operation of demodulating and channel-decoding OFDM symbols received through the radio channel and then delivering them to the upper layer.

Although not shown in the drawings, a RRC layer exists above the PDCP layer in each of the UE and the NR gNB. For, the RRC layers may exchange a configuration control message related to access or measurement.

Figure 3E:
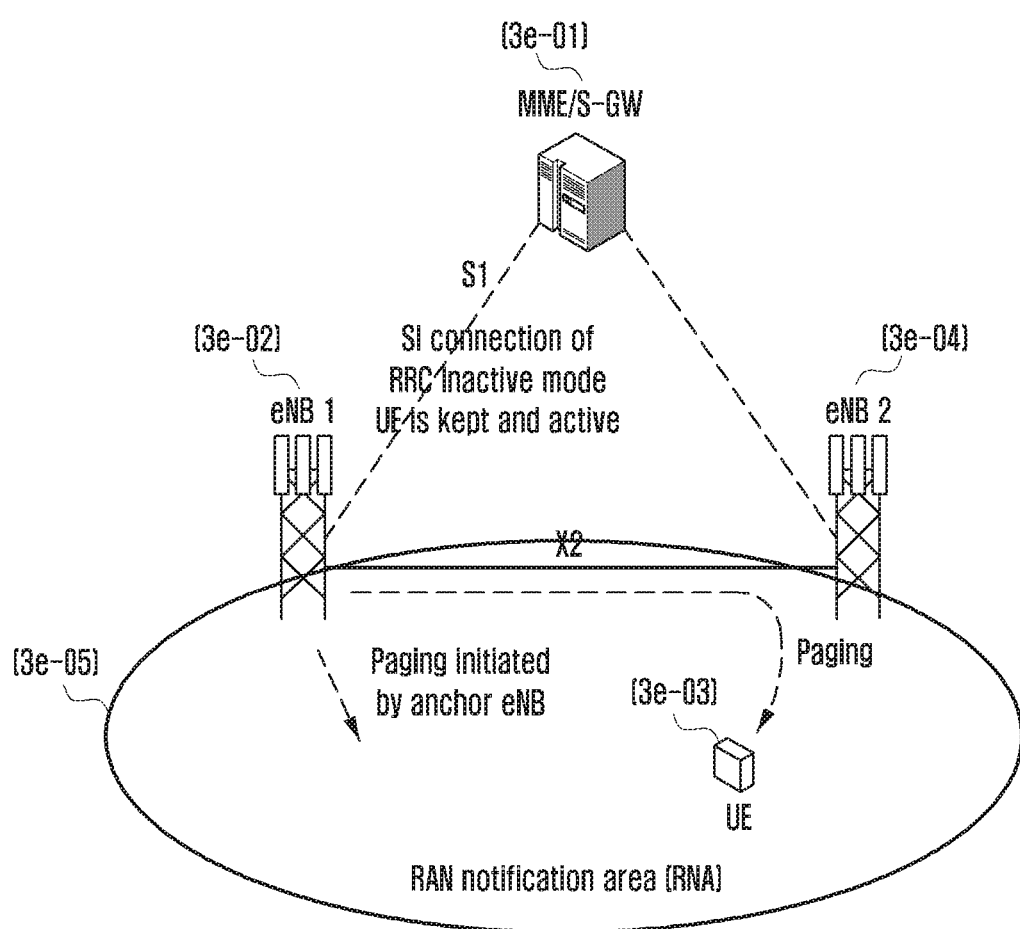
FIG. 3E is a diagram illustrating a radio resource control (RRC) inactive mode according to an embodiment of the disclosure.

FIG. 3E is a diagram illustrating an RRC inactive mode according to an embodiment of the disclosure.

Referring to FIG. 3E, the RRC inactive mode is a newly defined UE mode in addition to the idle mode or the connected mode in order to reduce the signaling overhead due to the handover and paging transmission operation. This new UE mode may be also referred to as an RRC inactive state, a lightly connected mode, or any other similar name. The RRC inactive mode is characterized by storing UE context of UE 3e-03 (i.e., UE in RRC inactive mode), maintaining the S1 connection of the UE, and triggering the paging by anchor gNB 3e-02 or 3e-04 or an MME 3e-01. The anchor gNB 3e-02 or 3e-04 is a base station that stores the UE context, and can manage the mobility of the UE 3e-03. Therefore, the MME 3e-01 recognizes the UE 3e-03 as being in the connected mode and, if there is data to be delivered to the UE 3e-03, the MME 3e-01 immediately delivers the data to the gNB 3e-02 or 3e-04 rather than triggers first the paging. The gNB 3e-02 or 3e-04 that receives the data forwards the paging to all gNBs within a certain area 3e-05 (i.e., a paging area, a RAN notification area (RNA), a CN-based paging area, or a RAN paging area), and all the gNBs transmit the paging.

Considering the above-described features of the RRC inactive mode, an embodiment of the disclosure provides UE and network operations capable of reducing battery consumption and signaling overhead of the UE.

Figure 3F:
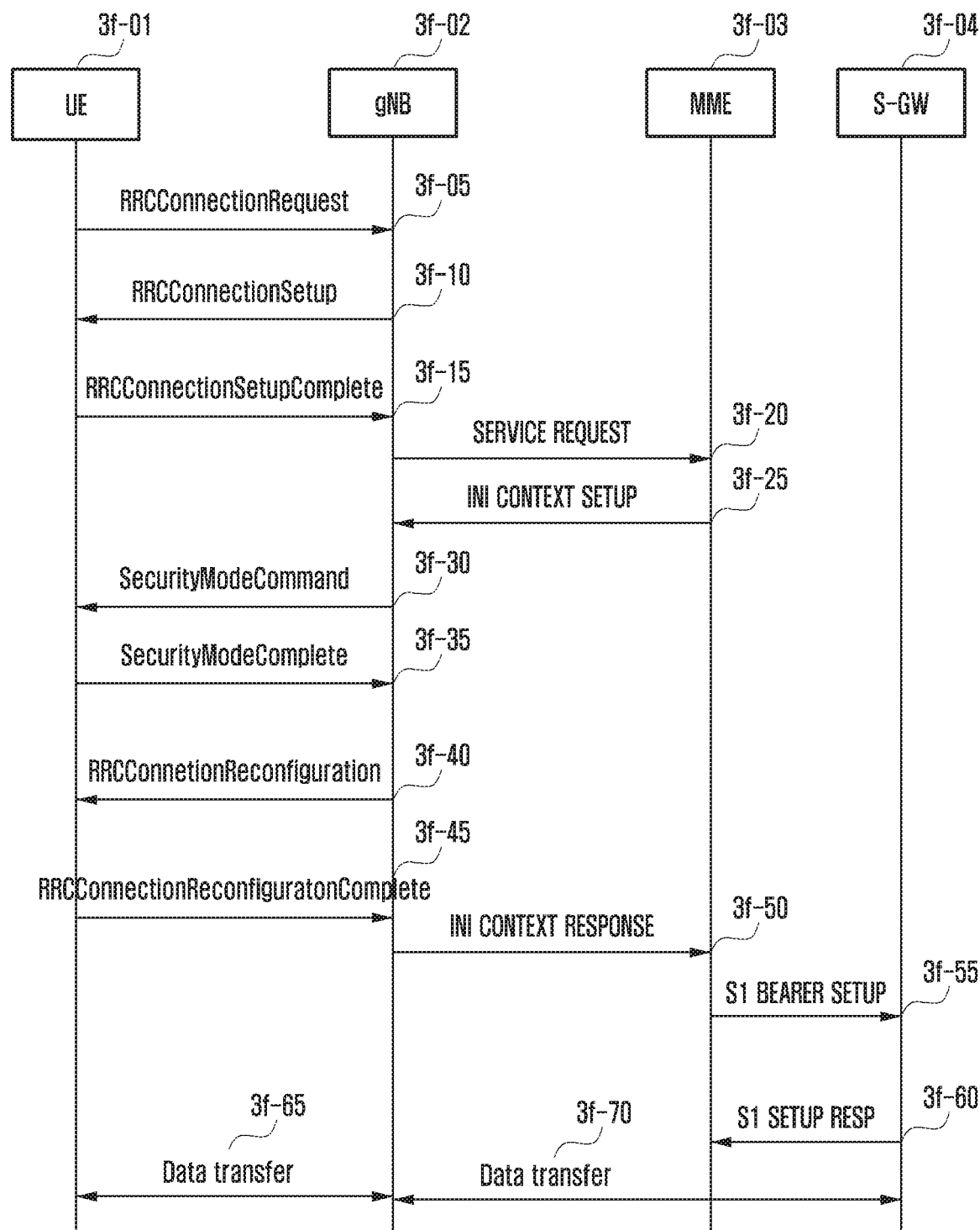
FIG. 3F is a diagram illustrating a procedure for a UE to establish a connection with a network in order to transmit and receive data according to an embodiment of the disclosure.

FIG. 3F is a diagram illustrating a procedure for a UE to establish a connection with a network in order to transmit and receive data according to an embodiment of the disclosure.

Referring to FIG. 3F, the UE 3f-01 with no connection established (also referred to as UE in idle mode) performs an RRC connection establishment procedure with the gNB 3f-02 when data to be transmitted occurs. Specifically, at operation 3f-05, the UE 3f-01 establishes uplink transmission synchronization with the gNB 3f-02 through a random access procedure and transmits an RRCConnectionRequest message to the gNB 3f-02. This message contains an identifier of the UE, an establishment cause, and the like. At operation 3f-10, the gNB 3f-02 transmits an RRCConnectionSetup message to the UE 3f-01 to establish the RRC connection. This message contains RRC connection configuration information and the like. The RRC connection is also referred to as a signaling radio bearer (SRB), and is used for transmission/reception of RRC messages which are control messages between the UE 3f-01 and the gNB 3f-02.

At operation 3f-15, the UE 3f-01 that establishes the RRC connection transmits an RRCConnetionSetupComplete message to the gNB 3f-02. This message contains a control message, called a SERVICE REQUEST, by which the UE 3f-01 requests the MME 3f-03 to set a bearer for a certain service. At operation 3f-20, the gNB 3f-02 transmits the SERVICE REQUEST message contained in the RRCConnetionSetupComplete message to the MME 3f-03, and the MME 3f-03 determines whether to provide the service requested by the UE 3f-01. If it is determined to provide the requested service, the MME 3f-03 transmits an INITIAL CONTEXT SETUP REQUEST message to the gNB 3f-02 at operation 3f-25. This message contains QoS information to be applied to the setup of a data radio bearer (DRB), security related information (e.g., a security key, a security algorithm) to be applied to the DRB, and the like.

For security setup, the gNB 3f-02 transmits a SecurityModeCommand message to the UE 3f-01 at operation 3f-30 and then receives a SecurityModeComplete message from the UE 3f-01 at operation 3f-35. When the security setup is completed, the gNB 3f-02 transmits an RRCConnectionReconfiguration message to the UE 3f-01 at operation 3f-40. This message contains configuration information of DRB for processing user data. At operation 3f-45, the UE 3f-01 sets the DRB by applying this information and then transmits an RRCConnectionReconfigurationComplete message to the eNB 3f-02. The gNB 3f-02 that completes the DRB setup with the UE 3f-01 transmits an INITIAL CONTEXT SETUP COMPLETE message to the MME 3f-03 at operation 3f-50. The MME 3f-03 that receives this message transmits an S1 BEARER SETUP message to the S-GW 3f-04 at operation 3f-55 and then receives an S1 BEARER SETUP RESPONSE message from the S-GW 3f-04 at operation 3f-60 in order to set up an S1 bearer. The S1 bearer is a connection for data transmission established between the S-GW 3*f*-04 and the gNB 3*f*-02, and corresponds to the DRB on a one-to-one basis. When the above process is completed, the UE 3*f*-01 transmits and receives data to the gNB 3*f*-02 through the S-GW 3*f*-04 at operations 3*f*-65 and 3*f*-70. This general data transmission process is mainly composed of three stages, namely, RRC connection setup, security setup, and DRB setup.

Figure 3G:
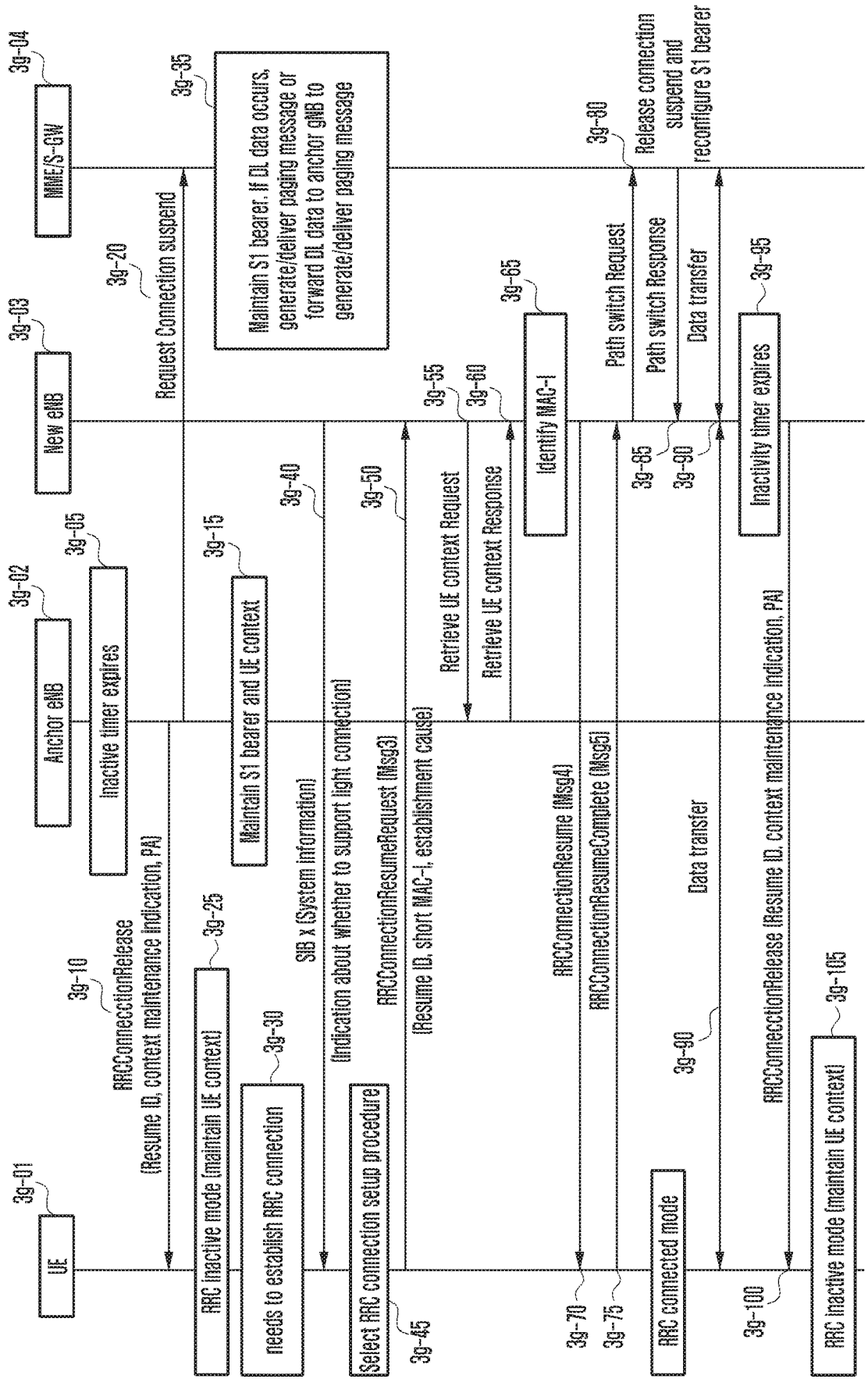
FIG. 3G is a diagram illustrating a signaling procedure between a UE and a gNB for supporting a radio resource control (RRC) inactive mode and a procedure for setting a paging area of the UE in an RRC inactive mode in a next generation mobile communication system according to an embodiment of the disclosure.

FIG. 3G is a diagram illustrating a signaling procedure between a UE and a gNB for supporting an RRC inactive mode and a procedure for setting a paging area of the UE in an RRC inactive mode in a next generation mobile communication system according to an embodiment of the disclosure.

Referring to FIG. 3G, shown is the overall flow for performing a procedure of reusing UE context and S1 bearer among a UE 3*g*-01, an anchor gNB 3*g*-02, a new gNB 3*g*-03, and an MME 3*g*-04. The UE 3*g*-01 which is in the RRC connected mode performs data transmission and reception with the anchor gNB 3*g*-02. If the data transmission and reception are suspended, the anchor gNB 3*g*-02 triggers a certain timer. If the data transmission and reception are not resumed until the timer expires at operation 3*g*-05, the anchor gNB 3*g*-02 considers releasing the RRC connection of the UE 3*g*-01.

After releasing the RRC connection of the UE 3*g*-01 according to a predetermined rule, at operation 3*g*-10 the anchor gNB 3*g*-02 stores the UE context and transmits a control message that instructs the UE 3*g*-01 to release the RRC connection. At this time, the anchor gNB 3*g*-02 may allocate a resume identifier (ID) (or a UE context identifier) and transmit setup information of a paging area (PA), which is also referred to as an RAN notification area (RNA), an RAN paging area, or a CN based paging area, for which the UE 3*g*-01 will report mobility during the RRC inactive mode (also referred to as an RRC inactive state or a lightly connected mode). From the allocated resume ID, the UE 3*g*-01 can know that the UE 3*g*-01 needs to store the UE context. Alternatively, through the above message, the anchor gNB 3*g*-02 may transmit a separate context maintenance indication for instructing the UE 3*g*-01 to operate in the RRC inactive mode and to store the UE context.

In addition, the control message may contain a list of cells for which the UE 3*g*-01 can apply a procedure of using the stored context when desiring to reset the RRC connection within a valid period or a specific period for which the anchor gNB 3*g*-02 maintains the context. The paging area setup information may include a list of cell IDs or paging area identities (or referred to RAN area IDs or CN based paging area IDs), and also include an addition/subtraction indication for each cell ID. The addition/subtraction indication may be a 1-bit indicator. If this indication indicates the addition of a certain cell ID, this cell ID may be added to the paging area. If this indication indicates the subtraction of a certain cell ID, this cell ID may be subtracted from the paging area. The RRC message of the operation 3*g*-10 may use an RRCConnectionRelease message or a newly defined RRC message including the above setup information to allow the UE 3*g*-01 to transition to the RRC inactive mode.

After releasing the RRC connection of the UE 3*g*-01, the anchor gNB 3*g*-02 maintains the UE context and the S1 bearer at operation 3*g*-15. The S1 bearer includes an S1-control bearer used for exchanging control messages between the anchor gNB 3*g*-02 and the MME 3*g*-04, and an S1-user plane bearer used for exchanging user data between the anchor gNB 3*g*-02 and the S-GW 3*g*-04. By maintaining the S1 bearer, a procedure for S1 bearer setup may be omitted when the UE 3*g*-01 attempts to establish the RRC connection in the same cell or in the same gNB. The anchor gNB 3*g*-02 may delete the UE context and release the S1 bearer when the validity period expires. Upon receiving the RRC connection release message at operation 3*g*-10, the UE 3*g*-01 switches to the RRC inactive mode.

At operation 3*g*-20, the anchor gNB 3*g*-02 transmits a control message for requesting a connection suspension to the MME 3*g*-04. At operation 3*g*-35, the MME 3*g*-04 that receives this control message instructs the S-GW 3*g*-04 to request, rather than forward downlink data to the anchor gNB 3*g*-02, the MME 3*g*-04 to start a paging procedure when the downlink data for the UE 3*g*-01 occurs. Alternatively, at operation 3*g*-20, the S-GW 3*g*-04 may directly forward the downlink data to the anchor gNB 3*g*-02 so that the anchor gNB 3*g*-02 generates and transmits a paging message to neighbor gNB. That is, the anchor gNB 3*g*-02 that receives the downlink data stores the data in a buffer and proceeds with the paging procedure. The anchor gNB 3*g*-02 refers to a base station that maintains the UE context and the S1-U bearer.

Upon receiving the RRC connection release message that includes the context maintenance indication and the resume ID at step 3*g*-10, the UE 3*g*-01 transitions to the RRC inactive mode at operation 3*g*-25 while releasing the RRC connection, triggering a timer corresponding to the valid period, writing the valid cell list in a memory, and maintaining the UE context in the memory without deleting it. The UE context refers to various kinds of information related to the RRC setup of the UE 3*g*-01 and includes SRB setup information, DRB setup information, security key information, and the like.

Thereafter, a need of having to establish the RRC connection arises for any reason at operation 3*g*-30. The UE 3*g*-01 that has not been assigned the resume ID or not instructed to maintain the context in the previous RRC connection release process performs the RRC connection setup procedure previously described in FIG. 3F, but the UE 3*g*-01 that has been assigned the resume ID or instructed to transition to the RRC inactive mode in the previous RRC connection release procedure may attempt to an RRC connection resumption procedure using the stored UE context. Depending on whether the network supports the RRC inactive mode, the UE 3*g*-01 in RRC inactive mode may perform the general RRC connection setup procedure (FIG. 3F) or the RRC connection resumption procedure using the stored UE context. Through the system information, each gNB or cell may transmit an indication about whether each gNB or cell supports or does not support the RRC inactive mode (or light connection). This indication may be included in a second block (Systeminformation2) of SI or other SI blocks (Systeminformation1-19). What the anchor gNB 3*g*-02 supports the RRC inactive mode may mean that the following operations 3*g*-50, 3*g*-55, 3*g*-60, 3*g*-65, 3*g*-70, 3*g*-75, 3*g*-85, and 3*g*-90 can be set up and supported by the corresponding anchor gNB 3*g*-02 or the corresponding cell.

When a need of having to establish the RRC connection, the UE 3*g*-01 in RRC inactive mode receives SI of a cell on which the UE is currently camping. If the SI does not include an indication that the anchor gNB 3*g*-02 or cell supports the RRC inactive mode (or light connection), the UE 3*g*-01 may perform at operation 3*g*-45 the RRC connection setup procedure previously described in FIG. 3F. However, if the SI includes an indication that the anchor gNB 3*g*-02 or cell supports the RRC inactive mode (or light connection), the UE 3*g*-01 may perform the RRC connection resumption procedure using the stored UE context at operation 3g-45. The RRC connection resumption procedure using the stored UE context is as follows.

First, the UE 3g-01 transmits a preamble in a message 1 to perform a random access procedure. If the resource allocation is possible according to the preamble received in the message 1, the anchor gNB 3g-02 allocates the corresponding uplink resource to the UE 3g-01 in a message 2. At operation 3g-50, the UE 3g-01 transmits a resume request message including the resume ID received at operation 3g-10, based on the received uplink resource information. This message may be a modified message of the RRCConnectionRequest message or a newly defined message (e.g., RRCConnectionResumeRequest). If the anchor gNB 3g-02 releases the connection and the UE 3g-01 in RRC inactive mode moves and camps on a cell of another gNB, this new gNB 3g-03 may receive and identify the resume ID of the UE and thereby know the previous gNB from which the UE has previously received the service.

If the new gNB 3g-03 successfully receives and identifies the resume ID, the new gNB performs a procedure of retrieving the UE context from the anchor gNB 3g-02 at operations 3g-55 and 3g-60. The new gNB 3g-03 can acquire the UE context from the anchor gNB 3g-02 through the S1 or X2 interface. If the new gNB 3g-03 fails to identify the UE 3g-01 for a certain reason even though having received the resume ID, the new gNB 3g-03 may transmit the RRCConnectionSetup message to the UE 3g-01 to return to the RRC connection setup procedure previously described in FIG. 3F. That is, the UE 3g-01 may receive the RRCConnectionSetup message and then transmit the RRCConnectionSetupComplete message to the new gNB 3g-03 to establish the connection. Alternatively, if the new gNB 3g-03 fails to identify the UE 3g-01 (e.g., failing to retrieve the UE context from the anchor gNB) even though having received the resume ID, the new gNB 3g-03 may send the RRCConnectionRelease message or the RRCConnectionReject message to the UE 3g-01 to deny the connection of the UE 3g-01 and enable the UE 3g-01 to attempt the general RRC connection setup procedure described in FIG. 3F.

At operation 3g-65, the new gNB 3g-03 identifies MAC-I, based on the retrieved UE context. The MAC-I is a message authentication code calculated by the UE 3g-01 on the control message by applying security information, namely the security key and the security counter, of the retrieved UE context. Using the MAC-I in the message, the security key and the security counter stored in the UE context, etc., the new gNB 3g-03 checks the integrity of the message. In addition, at operation 3g-70, the new gNB 3g-03 determines the setup to be applied to the RRC connection of the UE, and transmits the RRCConnectionResume message containing the setup information to the UE 3g-01. The RRCConnectionResume message may be a control message that information (REUSE INDICATOR) indicating 'RRC context reuse' is contained in the normal RRCConnectionRequest message. The RRCConnectionResume message contains various kinds of information related to the RRC connection setup of the UE 3g-01, like the RRCConnectionSetup message.

In case of receiving the normal RRConnectionSetup message, the UE 3g-01 establishes the RRC connection, based on the setup information indicated in the RRCConnectionSetup message. On the other hand, in case of receiving the RRCConnectionResume message, the UE 3g-01 establishes the RRC connection by considering all of the stored setup information and the setup information indicated in the control message (delta configuration). That is, the UE 3g-01 may determine the setup information to be applied by considering the indicated setup information as the delta information for the stored setup information, and update the setup information or the UE context. For example, if the SRB setup information is contained in the RRCConnectionResume message, the UE 3g-01 configures the SRB by applying the instructed SRB setup information. If the SRB setup information is not contained in the RRCConnectionResume message, the UE 3g-01 configures the SRB by applying the SRB setup information contained in the UE context.

The UE 3g-01 establishes the RRC connection by applying the updated UE context and setup information and transmits the RRCConnectionResumeComplete message to the new gNB 3g-03 at operation 3g-75. Then, at operations 3g-80 and 3g-85, the new gNB 3g-03 transmits a control message for requesting the release of the connection suspension to the MME 3g-04 and also requests the S1 bearer to be reconfigured for the new gNB 3g-03. Upon receiving this message, the MME 3g-04 instructs the S-GW 3g-04 to reconfigure the S1 bearer for the new gNB 3g-03 and process data for the UE 3g-01 normally. When the above procedure is completed, the UE 3g-01 resumes data transmission/reception in the cell at operation 3g-90.

In the above procedure, if the UE 3g-01 in RRC inactive mode does not move greatly and camps again on the cell of the anchor gNB 3g-02 when the anchor gNB 3g-02 releases the connection, the anchor gNB 3g-02 may not perform operations 3g-55 and 3g-60, perform only the connection suspension of the S1 bearer instead of operations 3g-80 and 3g-85, search for the UE context by referring the resume ID indicated in the message 3, and reestablish the connection in a manner similar to the above-described procedures.

If the data transmission and reception are suspended, the new gNB 3g-03 triggers a certain timer. If the data transmission and reception are not resumed until the timer expires at operation 3g-95, the new gNB 3g-03 considers releasing the RRC connection of the UE 3g-01. After releasing the RRC connection of the UE 3g-01 according to a predetermined rule, at operation 3g-100 the new gNB 3g-03 stores the UE context and transmits a control message that instructs the UE 3g-01 to release the RRC connection. At this time, the new gNB 3g-03 may allocate a resume ID and transmit setup information of a paging area (PA, or referred to as an RAN notification area (RNA), an RAN paging area, or a CN based paging area) for which the UE 3g-01 will report mobility during the RRC inactive mode. When being out of the paging area, the UE 3g-01 in RRC inactive mode may perform a procedure of updating the paging area at operation 3g-105. The paging area setup information may include a list of cell identifiers (IDs) or paging area identities (or referred to RAN area IDs or CN based paging area IDs), and also include an addition/subtraction indication for each cell ID. The addition/subtraction indication may be a 1-bit indicator. If this indication indicates the addition of a certain cell ID, this cell ID may be added to the paging area. If this indication indicates the subtraction of a certain cell ID, this cell ID may be subtracted from the paging area. The RRC message of the operation 3g-100 may use an RRCConnectionRelease message or a newly defined RRC message including the above setup information to allow the UE to transition to the RRC inactive mode.

Figure 3H:
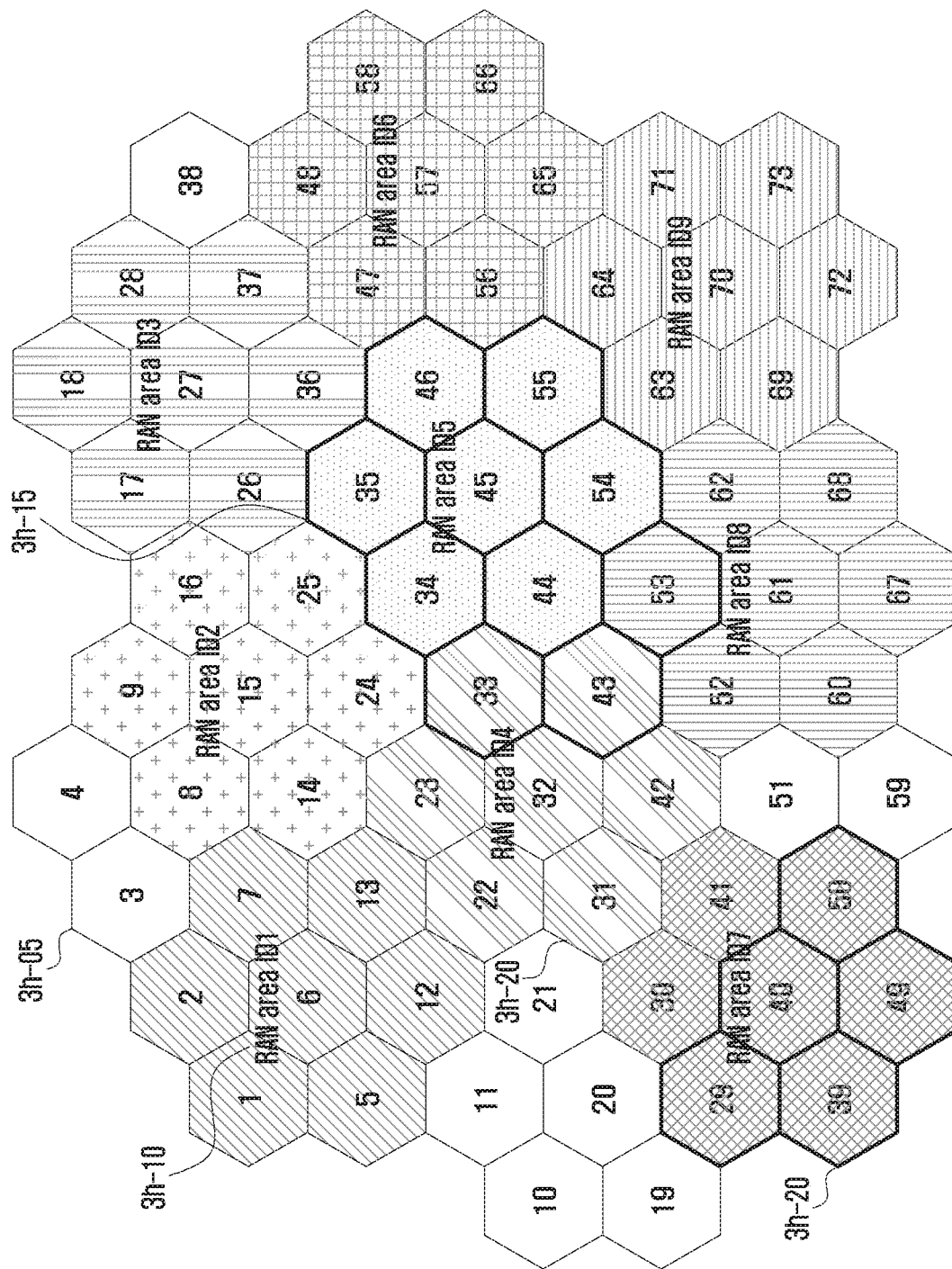
FIG. 3H is a diagram illustrating an example of configuring paging area setup information of a UE in an RRC inactive mode according to an embodiment of the disclosure.

FIG. 3H is a diagram illustrating an example of configuring paging area setup information of a UE in an RRC inactive mode according to an embodiment of the disclosure.

Referring to FIG. 3H, the embodiment 3-1 of establishing the paging area of the UE in RRC inactive mode is as follows.

In the embodiment 3-1, when configuring the paging area setup information of the RRC message transmitted at operation 3g-10 or 3g-100 of FIG. 3G, the gNB may establish the paging area of the UE in RRC inactive mode by using a CN based paging area ID (also referred to as a tracking area ID). The CN based paging area ID may be paging area setup information assigned to UE in RRC idle mode, and may be new area setup information defined by the network (or MME or CN). In addition, the CN based paging area ID may be broadcasted through the SI of each cell. That is, if each cell broadcasts the paging area ID through the system information, the paging areas can be established logically as shown in FIG. 3H. The UE, which is assigned the paging area of the UE in RRC inactive mode by means of the CN based paging area IDs as discussed above, reads the SI of each cell while moving, and checks the CN based paging area ID information in the system information. If it does not correspond to the assigned paging area ID, the UE determines that it is out of the paging area, and may perform a procedure of updating the paging area. The paging area setup information of the RRC message may include one or more CN based paging area IDs. In the embodiment 3-1, the paging area setup procedure of the UE in RRC inactive mode may be performed by the anchor gNB, the MME, or any other specific entity of the network. The anchor gNB stores the UE context and may indicate the gNB that manages the mobility of the UE in RRC inactive mode.

The advantage of the above-described embodiment 3-1 is that it is possible to easily establish the paging area of the UE by means of a small number of CN based paging area IDs since the CN based paging area ID can cover a very large area (a plurality of cells). However, because the paging area is large, it may take a long time for the network to send the paging message and find the UE. Further, because the paging message is transmitted to many gNBs/cells, signaling overhead may be caused.

The embodiment 3-2 of establishing the paging area of the UE in RRC inactive mode is as follows.

In the embodiment 3-2, when configuring the paging area setup information of the RRC message transmitted at operation 3g-10 or 3g-100 of FIG. 3G, the gNB may establish the paging area of the UE in RRC inactive mode by using a RAN based paging area ID (also referred to as a RAN notification area ID or a RAN area ID). An area covered by the RAN based paging area ID may be smaller than an area covered by the CN based paging area ID used in the embodiment 3-1. In addition, the RAN based paging area ID may be new area setup information defined by the network and may be broadcasted through the SI of each cell. That is, if each cell broadcasts the paging area ID through the system information, the paging areas can be established logically as shown in FIG. 3H. The UE, which is assigned the paging area of the UE in RRC inactive mode by means of the RAN based paging area IDs, reads the SI of each cell while moving, and checks the RAN based paging area ID information in the system information. If it does not correspond to the assigned paging area ID, the UE determines that it is out of the paging area, and may perform a procedure of updating the paging area. The paging area setup information of the RRC message may include one or more RAN based paging area IDs. In the embodiment 3-2, the paging area setup procedure of the UE in RRC inactive mode may be performed by the anchor gNB, the MME, or any other specific entity of the network. The anchor gNB stores the UE context and may indicate the gNB that manages the mobility of the UE in RRC inactive mode.

The advantage of the above-described embodiment 3-2 is that it is possible to easily establish the paging area of the UE by means of a small number of RAN based paging area IDs since the RAN based paging area ID can cover a large area (a plurality of cells). However, because the paging area is somewhat large, it may take a time for the network to send the paging message and find the UE. Further, because the paging message is transmitted to several gNBs/cells, signaling overhead may be caused. On the other hand, this embodiment manages a smaller paging area than the embodiment 3-1, thereby delivering the paging message more quickly to the UE with less signaling overhead.

The embodiment 3-3 of establishing the paging area of the UE in RRC inactive mode is as follows.

In the embodiment 3-3, when configuring the paging area setup information of the RRC message transmitted at operation 3g-10 or 3g-100 of FIG. 3G, the gNB may establish the paging area of the UE in RRC inactive mode by using a list of cell IDs. An area covered by the cell ID may be the smallest unit capable of establishing the paging area, thereby setting the paging area most specifically and most variously. In addition, the cell ID may be new area setup information defined by the network and may be broadcasted through the SI of each cell. That is, if each cell broadcasts the cell ID through the system information, the paging areas can be established logically as shown in FIG. 3H. The UE, which is assigned the paging area of the UE in RRC inactive mode by means of the cell ID list, reads the SI of each cell while moving, and checks the cell ID information in the system information. If it does not correspond to the assigned cell ID, the UE determines that it is out of the paging area, and may perform a procedure of updating the paging area. The paging area setup information of the RRC message may include one or more cell IDs. In the embodiment 3-3, the paging area setup procedure of the UE in RRC inactive mode may be performed by the anchor gNB, the MME, or any other specific entity of the network. The anchor gNB stores the UE context and may indicate the gNB that manages the mobility of the UE in RRC inactive mode.

The advantage of the above-described embodiment 3-3 is that it is possible to easily establish the paging area specifically and variously since an area indicated by the cell ID may be the smallest unit capable of representing the paging area. Also, because of indicating a small area, it is possible to deliver the paging message to the UE within a short time. However, because many cell IDs may be added to the paging area setup information, the overhead may increase.

The embodiment 3-4 of establishing the paging area of the UE in RRC inactive mode is as follows.

In the embodiment 3-4, when configuring the paging area setup information of the RRC message transmitted at operation 3g-10 or 3g-100 of FIG. 3G, the gNB may establish the paging area of the UE in RRC inactive mode by using the RAN based paging area ID and the cell ID list. An area covered by the cell ID may be the smallest unit capable of establishing the paging area, thereby setting the paging area most specifically and most variously. In addition, sine the RAN based paging area IDs can indicate a fairly large paging area, the overhead of the paging area setup information may be reduced when the cell IDs are used together with the RAN based paging area IDs. The RAN based paging area ID and the cell ID may be new area setup information defined by the network and may be broadcasted through the SI of each cell. That is, if each cell broadcasts the cell ID and the RAN based paging area ID through the system information, the paging areas can be established logically as shown in FIG. 3H.

The advantage of the embodiment 3-4 is that it is possible to reduce the overhead of the paging area setup information of the RRC message transmitted at operation 3g-10 or 3g-100 of FIG. 3G and also establish the paging area specifically and variously. When the RAN based paging area ID and the cell ID are used together in the paging area setup information, each cell ID may include an addition/subtraction indication. If the addition/subtraction indication indicates addition, a cell ID having the addition indication may be added to the paging area of the UE, and a cell ID having the subtraction indication may be subtracted. Therefore, the paging area setup information may be configured more efficiently. For example, information required in the above embodiments to indicate paging areas 3h-15 and 3h-20 in FIG. 3H is as follows.

|  | Embodiment 3-1 | Embodiment 3-2 | Embodiment 3-3 | Embodiment 3-4 |
|---|---|---|---|---|
| 3h-15 | Not configurable | Not configurable | Ten cell IDs (33, 34, 35, 43, 44, 45, 46, 54, 55, 56) | One RAN based PA ID & three cell IDs (RAN area ID5, +33, +43, +54) |
| 3h-20 | Not configurable | Not configurable | Five cell IDs (29, 39, 40, 50, 51) | One RAN based PA ID & two cell IDs (RAN area ID7, −30, −41) |

The UE, which is assigned the paging area of the UE in RRC inactive mode by means of the RAN based paging area ID and the cell ID list, reads the SI of each cell while moving, and checks the cell ID information in the system information. If it does not correspond to the assigned cell ID, the UE determines that it is out of the paging area, and may perform a procedure of updating the paging area. The paging area setup information of the RRC message may include one or more cell IDs. In the embodiment 3-4, the paging area setup procedure of the UE in RRC inactive mode may be performed by the anchor gNB, the MME, or any other specific entity of the network. The anchor gNB stores the UE context and may indicate the gNB that manages the mobility of the UE in RRC inactive mode.

In the embodiment 3-4, the UE checks the paging area setup information of the RRC message transmitted at operations 3g-10 or 3g-100 in FIG. 3G and determines as follows.

If there is no paging area setup information, the UE regards, as the paging area setup information of the UE in RRC inactive mode, the paging area indicated by the CN based paging area IDs for the RRC idle mode.

If only the cell IDs exist in the paging area setup information, the UE regards the area indicated by the cell IDs as the paging area for the RRC inactive mode.

If there are only the RAN based paging area IDs in the paging area setup information, the UE regards the area indicated by the RAN based paging area IDs as the paging area for the RRC inactive mode.

If the paging area setup information contains the RAN based paging area IDs, the cell IDs, and the addition/subtraction indications of each ID, the UE regards, as the paging area for the RRC inactive mode, the area indicated by the RAN based paging area IDs, the cell IDs, and the addition/subtraction indications of each ID.

The area indicated by the RAN based paging area IDs, the cell IDs, and the addition/subtraction indications of each ID refers to an area obtained by adding cells broadcasting the RAN based paging area IDs and cells broadcasting the cell IDs having the addition indication and also subtracting cells broadcasting the cell IDs having the subtraction indication.

In case of configuring the paging area setup information of the UE by applying one of the above-described embodiments 3-1, 3-2, 3-3 and 3-4, a paging area update (PAU) procedure may be performed when the UE is out of the paging area. An embodiment of the disclosure provides the PAU procedures of the UE, as follows.

Figure 3I:
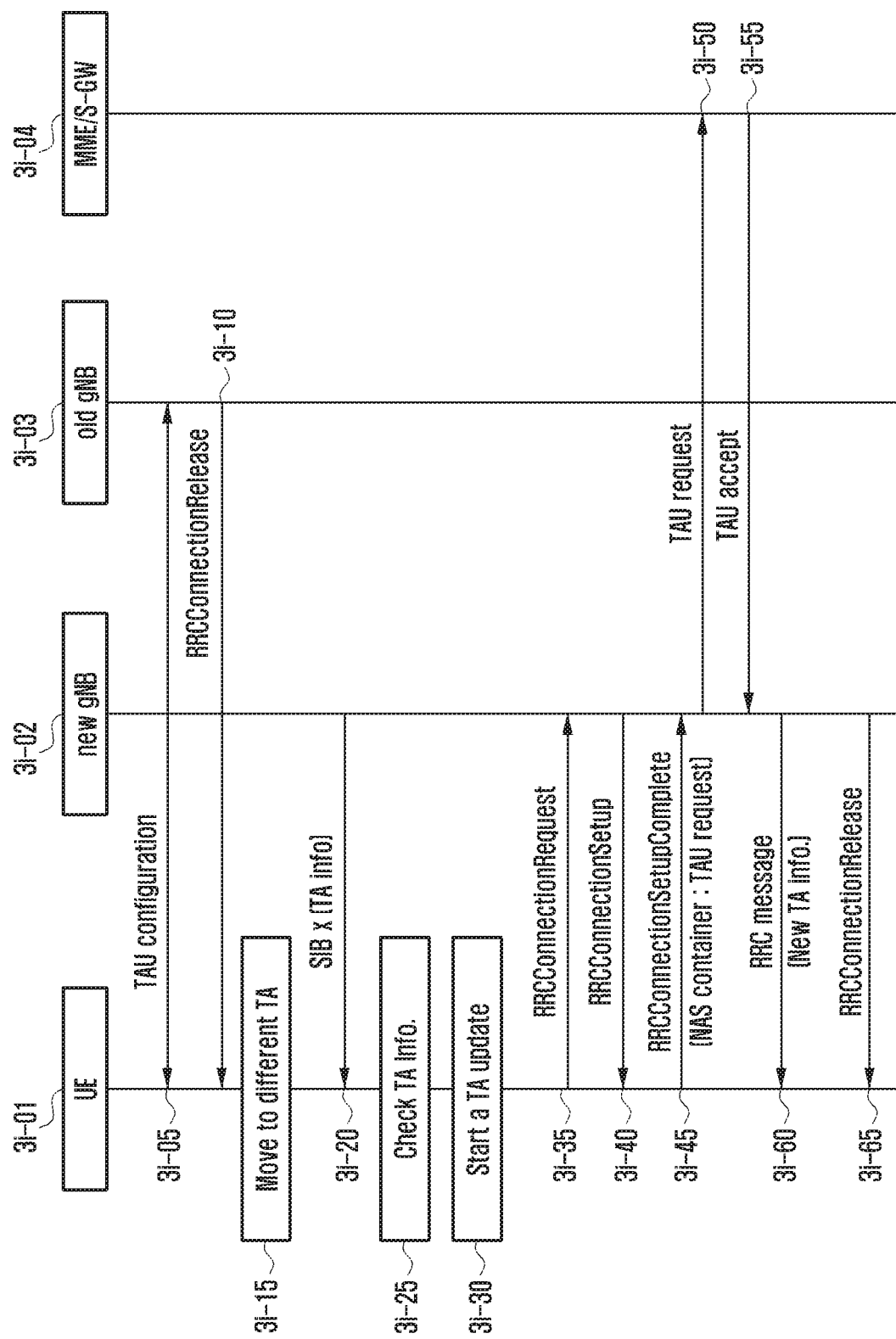
FIG. 3I is a diagram illustrating a procedure in which a paging area of a UE in an RRC inactive mode is configured with core network (CN) based paging area identifiers (IDs) and the UE updates the paging area according to an embodiment of the disclosure.

FIG. 3I is a diagram illustrating a procedure in which a paging area of a UE in an RRC inactive mode is configured with CN based paging area IDs and the UE updates the paging area according to an embodiment of the disclosure.

Referring to FIG. 3I, the UE 3i-01 may configure a tracking area or a CN based paging area for a certain reason at operation 3i-05. The tracking area or CN based paging area may be indicated by a list of tracking area IDs or a list of new CN based paging area IDs. The above reason may be defined in a procedure in which the UE 3i-01 initially accesses the network and establishes the connection thereof, or when the tracking area or the paging area is periodically updated. The UE 3i-01 may configure the tracking area or paging area by receiving a tracking area update (TAU) accept message from the MME 3i-04 in the tracking area or paging area configuration procedure. The TAU accept message may be contained in the RRC message, for example, in the DedicatedlnfoNAS of the RRCConnectionReconfiguration message or of the DLlnformationTransfer message, and may be delivered to the UE 3i-01. The old gNB 3i-03 may release the connection of the UE 3i-01 for a certain reason at operation 3i-10. This reason may be the expiry of an inactive timer due to no data transmission/reception between the UE 3i-01 and the network for a given time.

The UE 3i-01 may return to the RRC inactive mode and move by a user's movement. Because of mobility, the UE 3i-01 may be out of the configured tracking area or paging area at operation 3i-15, and check a tracking area or paging area identifier from SI of a current cell at operation 3i-20. If it is determined at operation 3i-25 that the UE is out of the configured tracking area or paging area, the UE may perform a procedure of updating the tracking area or paging area at operation 3i-30.

In order to establish the connection to a new gNB or cell 3i-02 and update the tracking area or paging area, the UE 3i-01 may transmit an RRCConnectionRequest message to the old gNB at operation 3i-35. In the above RRC message, mo-signaling may be defined as the RRC connection establishment cause (establishmentCause) to attempt to update the tracking area or paging area. Alternatively, an indication for indicating the update of the RAN paging area may be defined as the RRC establishment cause (establishmentCause). The new gNB 3i-02 may transmit an RRCConnectionSetup message to the UE 3i-01 to allow the RRC connection establishment at operation 3i-40. In order to update the tracking area or paging area, the UE 3i-01 may transmit a TAU request message by inserting it in DedicatedlnfoNAS of an RRCConnectionSetupComplete message at operation 3i-45.

Then, at operation 3i-50, the new gNB 3i-02 may transmit the TAU request message to the MME 3i-04 in order to request the update of the tracking area or paging area. After receiving the TAU request message and accepting the update of the tracking area or paging area, the MME 3i-04 transmits a TAU accept message to the new gNB 3i-02 at operation 3*i*-55, and the new gNB 3*i*-02 inserts the TAU accept message in the RRC message and transmits it to the UE 3*i*-01 at operation 3*i*-60. The TAU accept message may contain new tracking area or paging area information. The RRC message transmitted to the UE 3*i*-01 by the new gNB 3*i*-02 at operation 3*i*-65 may be an RRCConnectionReconfiguration message or a DLlnformationTransfer message.

Figure 3J:
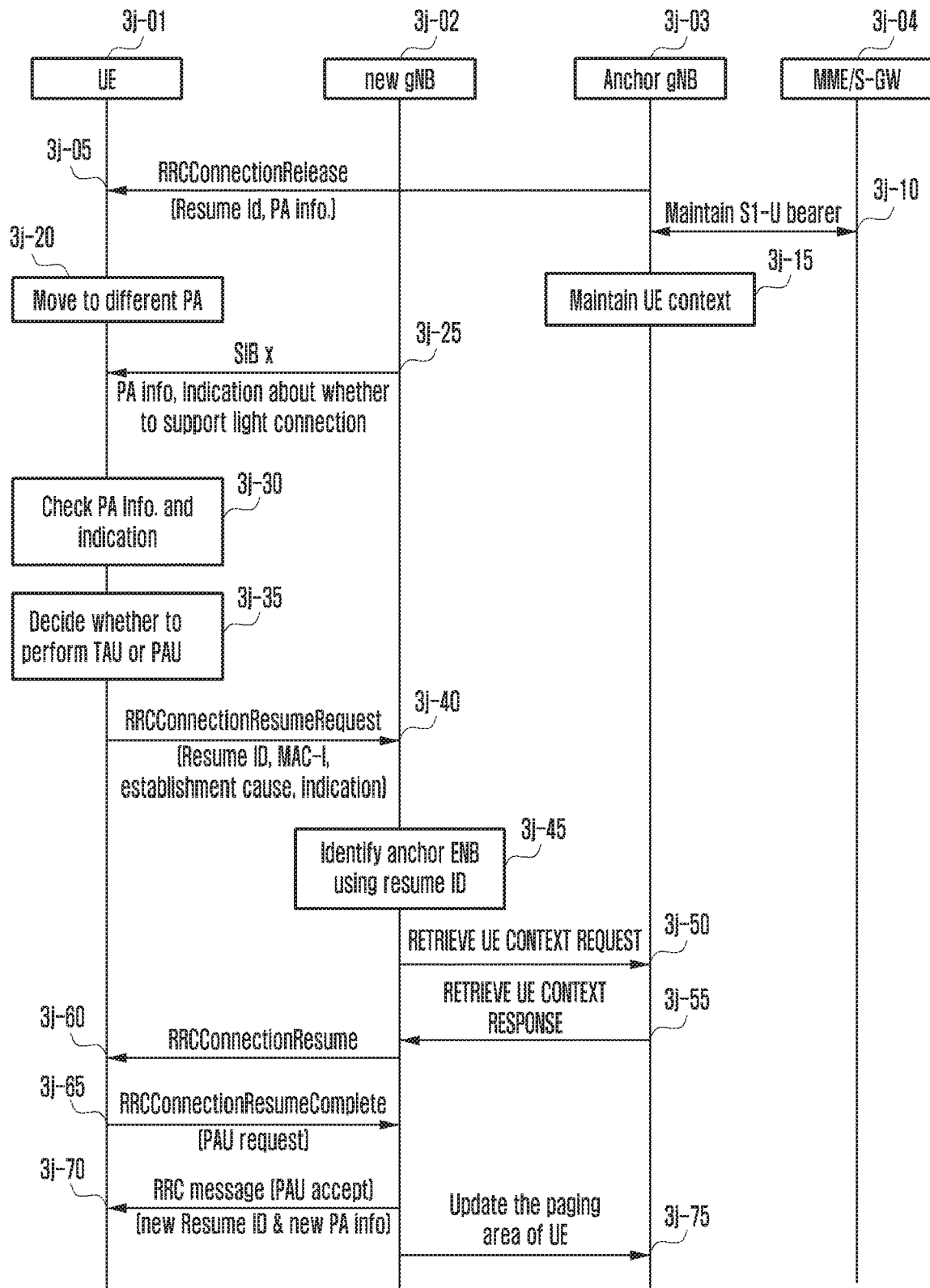
FIG. 3J is a diagram illustrating a procedure in which an RRC inactive UE performs a paging area update (PAU) to a new gNB according to an embodiment of the disclosure.

FIG. 3J is a diagram illustrating a procedure in which an RRC inactive UE performs a PAU to a new gNB according to an embodiment of the disclosure.

Referring to FIG. 3J, the UE 3*j*-01 connected to anchor gNB 3*j*-03 receives an RRCConnectionRelease message from the anchor gNB 3*j*-03 at operation 3*j*-05. If there is no data transmission/reception for a given time, the anchor gNB 3*j*-03 may set the RRC inactive mode by transmitting the RRCConnectionRelease message to the UE 3*j*-01. This RRC message may contain information about a paging area and a resume ID (or a UE context identifier) for the UE 3*j*-01 in RRC inactive mode. The paging area setup information may include a list of cell identifiers (IDs) or paging area identities (or referred to RAN area IDs or CN based paging area IDs), and also include an addition/subtraction indication for each cell ID. The addition/subtraction indication may be a 1-bit indicator. If this indication indicates the addition of a certain cell ID, this cell ID may be added to the paging area. If this indication indicates the subtraction of a certain cell ID, this cell ID may be subtracted from the paging area. The RRC message of the operation 3*j*-05 may use the RRCConnectionRelease message or a newly defined RRC message including the above setup information to allow the UE to transition to the RRC inactive mode.

The UE 3*j*-01 that receives the RRC message at operation 3*j*-05 may transition to an RRC inactive mode. The anchor gNB 3*j*-03 may store UE context information and maintain an S1 bearer at operations 3*j*-10 and 3*j*-15. Instead of the MME 3*j*-04, the anchor gNB 3*j*-03 may manage the mobility of the UE 3*j*-01. That is, if there is downlink data to be transmitted to the UE 3*j*-01, the anchor gNB 3*j*-03 may generate a paging message and transmit it to the UE 3*j*-01 through a paging area (PA).

The UE 3*j*-01 may move to a new gNB 3*j*-02 or cell in another PA at operation 3*j*-20. At operation 3*j*-25, using SI, each cell managed by each gNB broadcasts paging area information, such as a cell ID or a paging area ID (RAN area ID or CN based paging area ID), and an indication about whether the cell or gNB 3*j*-02 supports the RRC inactive mode (light connection). At operation 3*j*-30, the UE 3*j*-01 receives the SI of the camp-on cell and checks the paging area information and the indication. If the SI does not contain the indication that the cell (or gNB 3*j*-02) supports the RRC inactive mode, the UE 3*j*-01 may decide, at operation 3*j*-35, to perform the CN-based PAU procedure as shown in FIG. 3I. On the other hand, if the SI contains the indication that the cell (or gNB 3*j*-02) supports the RRC inactive mode, the UE 3*j*-01 may decide, at operation 3*j*-35, to perform the procedure of updating the paging area as follows.

If the paging area ID or cell ID broadcasted through the SI is not included in the paging area information configured in the UE 3*j*-01 at operation 3*j*-05, the UE 3*j*-01 determines that the UE is out of the paging area, and transmits at operation 3*j*-40 an RRCConnectionResumeRequest message to the gNB 3*j*-02 of the current camp-on cell in order to request the paging area update. This message may newly define and contain an establishment cause for the request of the paging area update. Alternatively, using a reserved 1 bit of this message, an indication to indicate the request of the PAU may be contained. Also, this message includes at least one of a resume ID (or a UE context identifier), a MAC-I, and the establishment cause. At operation 3*j*-45, the gNB 3*j*-02 that receives the RRCConnectionResumeRequest message can know, using the resume ID (or the UE context identifier), the anchor gNB 3*j*-03 that has previously supported the UE 3*j*-01. Therefore, at operations 3*j*-50 and 3*j*-55, the new gNB 3*j*-02 may retrieve the UE context information from the anchor gNB 3*j*-03 and check security setting from the retrieved UE context information. These operations 3*j*-50 and 3*j*-55 may be omitted if unnecessary, for example, when the UE 3*j*-01 attempts again to connect to the original anchor gNB.

The new gNB 3*j*-02 transmits an RRCConnectionResume message to the UE 3*j*-01 at operation 3*j*-60 in order to allow the connection establishment, and the UE transmits an RRCConnectionResumeComplete message to the new gNB 3*j*-02 at operation 3*j*-65 in order to complete the connection establishment. This message may contain a message or indication for requesting the paging area update. Upon receiving the PAU request, the new gNB 3*j*-02 transmits a PAU response to the UE 3*j*-01 through an RRC message and configures new paging area information at operation 3*j*-70. This RRC message may be an RRCConnectionRelease message, an RRCConnectionReconfiguration message, or a newly defined RRC message. At this operation 3*j*-70, the new gNB 3*j*-02 may identify the mobility, speed, traffic pattern, etc. of the UE 3*j*-01 through history information of the UE 3*j*-01 and thereby configure a new paging area of the UE 3*j*-01. This history information may be received when exchanging messages with the anchor gNB 3*j*-03 at operations 3*j*-50 and 3*j*-55, and may include information about the number of times, the period, and the time that the UE 3*j*-01 performed the paging update procedure.

After updating the paging area of the UE 3*j*-01, the new gNB 3*j*-02 updates the paging area of the UE 3*j*-01 in the anchor gNB 3*j*-03 at operation 3*j*-75. Since the anchor gNB 3*j*-03 maintains the UE context and the S1-U bearer and manages the mobility of the UE 3*j*-01, the paging area of the UE 3*j*-01 therein should be updated. This is to allow the anchor gNB 3*j*-03 to suitably generate and transmit a paging message and easily find the UE 3*j*-01 when downlink data for the corresponding UE 3*j*-01 reaches the anchor gNB 3*j*-03 in the future.

In the above procedure, if the UE 3*j*-01 with low mobility attempts to connect again to the anchor gNB 3*j*-03, operations 3*j*-50, 3*j*-55 and 3*j*-75 may not be performed.

Figure 3K:
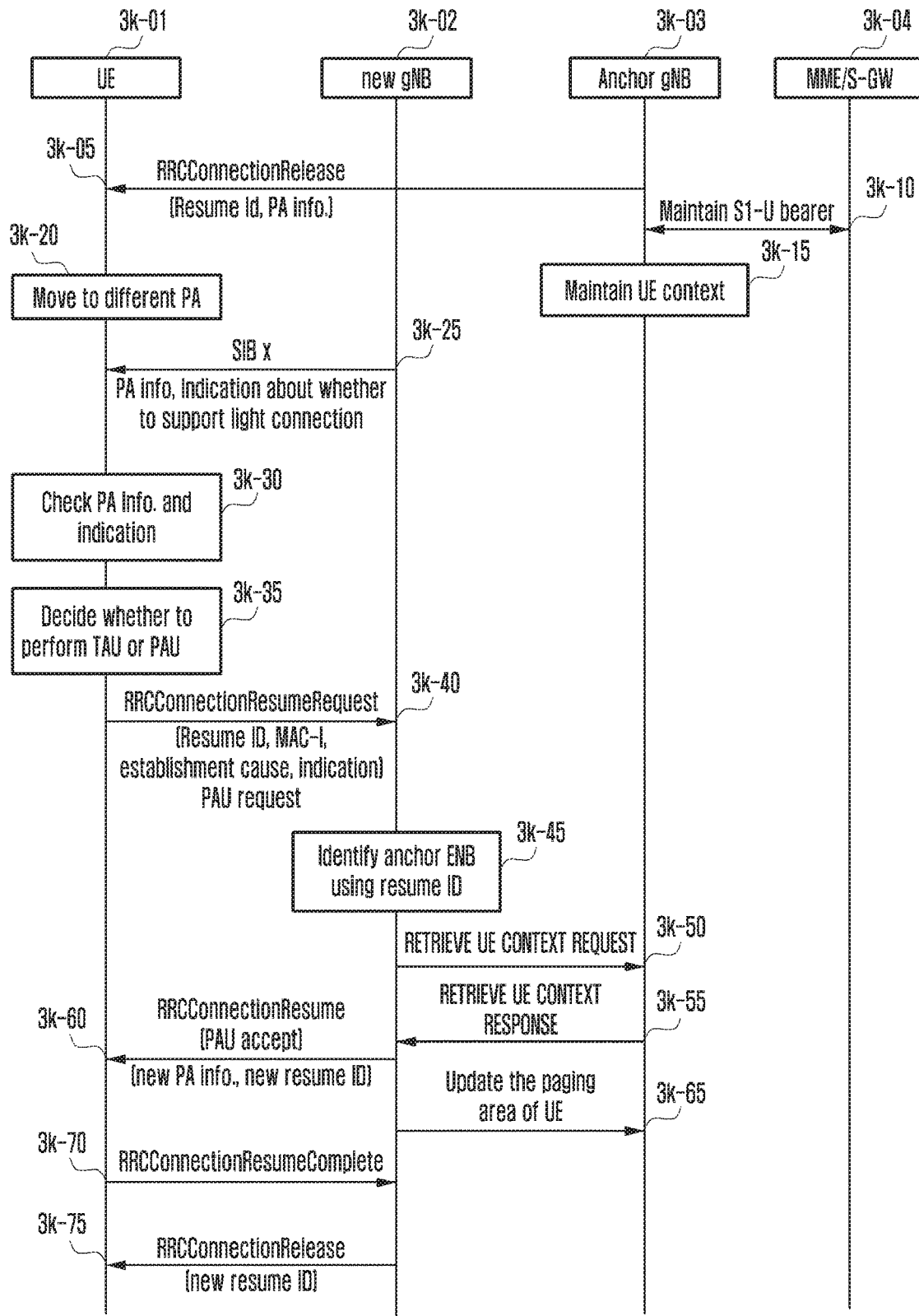
FIG. 3K is a diagram illustrating a procedure in which an RRC inactive UE performs a PAU to a new gNB according to an embodiment of the disclosure.

FIG. 3K is a diagram illustrating a procedure in which an RRC inactive UE performs a PAU to a new gNB according to an embodiment of the disclosure.

Referring to FIG. 3K, the UE 3*k*-01 connected to anchor gNB 3*k*-03 receives an RRCConnectionRelease message from the anchor gNB 3*k*-03 at operation 3*k*-05. If there is no data transmission/reception for a given time, the anchor gNB 3*k*-01 may set the RRC inactive mode by transmitting the RRCConnectionRelease message to the UE 3*k*-01. This RRC message may contain information about a paging area and a resume ID (or a UE context identifier) for the UE 3*k*-01 in RRC inactive mode. The paging area setup information may include a list of cell identifiers (IDs) or paging area identities (or referred to RAN area IDs or CN based paging area IDs), and also include an addition/subtraction indication for each cell ID. The addition/subtraction indication may be a 1-bit indicator. If this indication indicates the addition of a certain cell ID, this cell ID may be added to the paging area. If this indication indicates the subtraction of a certain cell ID, this cell ID may be subtracted from the paging area. The RRC message of the operation 3k-05 may use the RRCConnectionRelease message or a newly defined RRC message including the above setup information to allow the UE 3k-01 to transition to the RRC inactive mode.

The UE 3k-01 that receives the RRC message at operation 3k-05 may transition to an RRC inactive mode. The anchor gNB 3k-03 may store UE context information and maintain an S1 bearer at operations 3k-10 and 3k-15. Instead of the MME 3k-04, the anchor gNB 3k-03 may manage the mobility of the UE 3k-01. That is, if there is downlink data to be transmitted to the UE 3k-01, the anchor gNB 3k-03 may generate a paging message and transmit it to the UE 3k-01 through a PA.

The UE 3k-01 may move to a new gNB 3k-02 or cell in another PA at operation 3k-20. At operation 3k-25, using SI, each cell managed by each gNB broadcasts paging area information, such as a cell ID or a paging area ID (RAN area ID or CN based paging area ID), and an indication about whether the cell or the new gNB 3k-02 supports the RRC inactive mode (light connection). At operation 3k-30, the UE 3k-01 receives the SI of the camp-on cell and checks the paging area information and the indication. If the SI does not contain the indication that the cell (or the new gNB 3k-02) supports the RRC inactive mode, the UE 3k-01 may decide, at operation 3k-35, to perform the CN-based PAU procedure as shown in FIG. 3I. On the other hand, if the SI contains the indication that the cell (or the new gNB 3k-02) supports the RRC inactive mode, the UE 3k-01 may decide, at operation 3k-35, to perform the procedure of updating the paging area as follows.

If the paging area ID or cell ID broadcasted through the SI is not included in the paging area information configured in the UE 3k-01 at operation 3k-05, the UE 3k-01 determines that the UE 3k-01 is out of the paging area, and transmits at operation 3k-40 an RRCConnectionResumeRequest message to the new gNB 3k-02 of the current camp-on cell in order to request the paging area update. This message may newly define and contain an establishment cause for the request of the paging area update. Alternatively, using a reserved 1 bit of this message, an indication to indicate the request of the PAU may be contained. Also, this message includes at least one of a resume ID (or a UE context identifier), a MAC-I, and the establishment cause. At operation 3k-45, the new gNB 3k-02 that receives the RRCConnectionResumeRequest message can know, using the resume ID (or the UE context identifier), the anchor gNB 3k-03 that has previously supported the UE 3k-01. Therefore, at operations 3k-50 and 3k-55, the new gNB 3k-02 may retrieve the UE context information from the anchor gNB 3k-03 and check security setting from the retrieved UE context information. These operations 3k-50 and 3k-55 may be omitted if unnecessary, for example, when the UE 3k-01 attempts again to connect to the original anchor gNB 3k-03.

In order to allow the PAU request of the UE 3k-01 received at operation 3k-40, the new gNB 3k-02 may transmit an RRCConnectionResume message to the UE 3k-01 at operation 3k-60. This message may contain information about a new paging area as a response to the PAU request, and may also contain a new resume ID. If necessary, this new resume ID may be contained in an RRCConnectionRelease message to be transmitted to the UE 3k-01 at operation 3k-75. At operation 3k-60, the new gNB 3k-02 may identify the mobility, speed, traffic pattern, etc. of the UE 3k-01 through history information of the UE and thereby configure a new paging area of the UE 3k-01. This history information may be received when exchanging messages with the anchor gNB 3k-03 at operations 3k-50 and 3k-55, and may include information about the number of times, the period, and the time that the UE 3k-01 performed the paging update procedure. After updating the paging area of the UE, the new gNB 3k-02 updates the paging area of the UE 3k-01 in the anchor gNB 3k-03 at operation 3j-65. The UE 3k-01 may transmit an RRCConnectionResumeComplete message to the new gNB 3k-02 at operation 3k-70 in order to complete the connection establishment.

If there is no data transmission/reception for a given time, the new gNB 3k-02 may set again the UE 3k-01 to the RRC inactive mode by transmitting an RRCConnectionRelease message to the UE 3k-01. Since the anchor gNB 3k-03 maintains the UE context and the S1-U bearer and manages the mobility of the UE 3k-01, the paging area of the UE 3k-01 therein should be updated. This is to allow the anchor gNB 3k-03 to suitably generate and transmit a paging message and easily find the UE 3k-01 when downlink data for the corresponding UE 3k-01 reaches the anchor gNB 3k-03 in the future.

In the above procedure, if the UE 3k-01 with low mobility attempts to connect again to the anchor gNB 3k-03, operations 3k-50, 3k-55 and 3k-65 may not be performed.

Figure 3L:
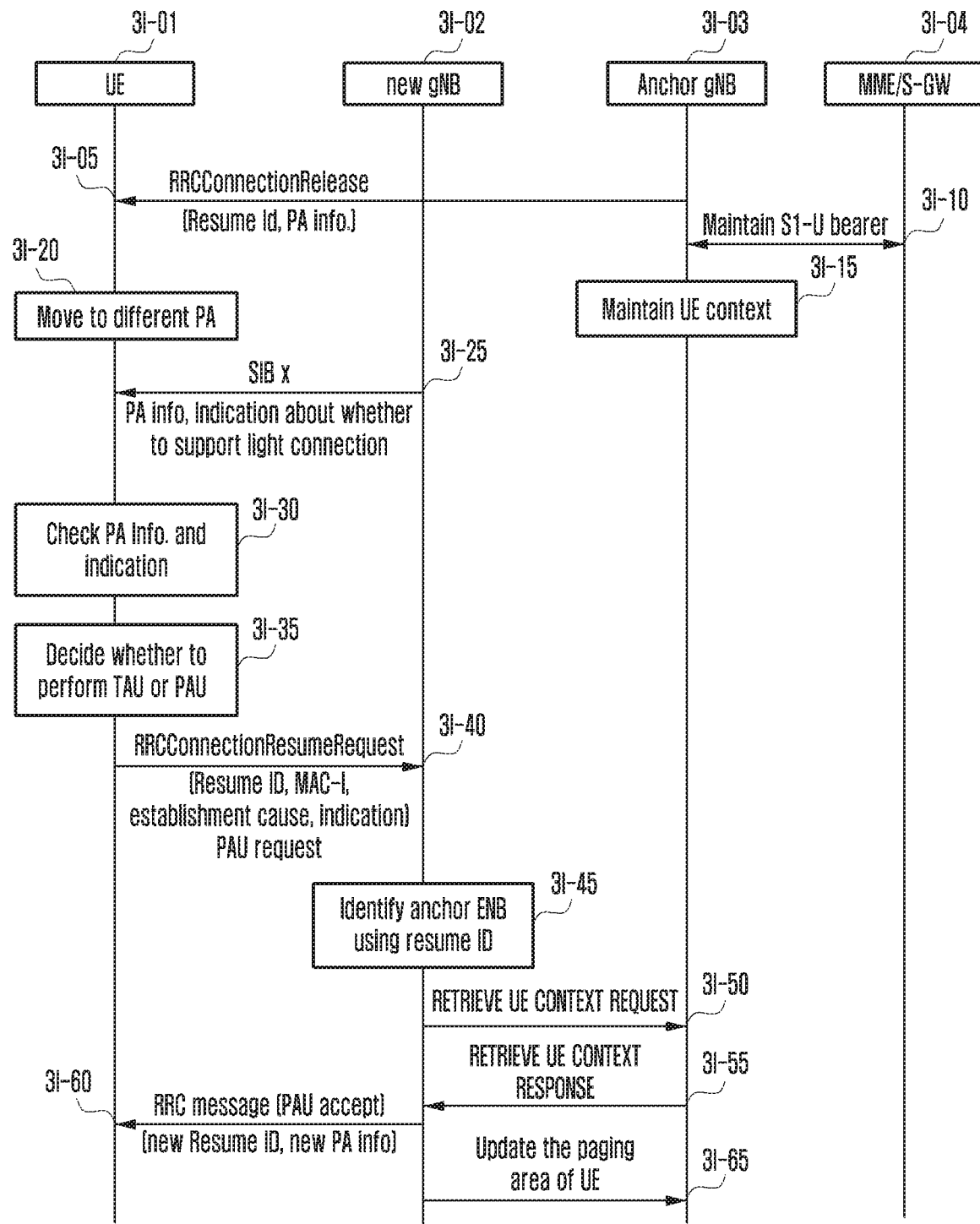
FIG. 3L is a diagram illustrating a procedure in which an RRC inactive UE performs a PAU to a new gNB according to an embodiment of the disclosure.

FIG. 3L is a diagram illustrating a procedure in which an RRC inactive UE performs a PAU to a new gNB according to an embodiment of the disclosure.

Referring to FIG. 3L, the UE 3l-01 connected to anchor gNB 3l-03 receives an RRCConnectionRelease message from the anchor gNB 3l-03 at operation 3l-05. If there is no data transmission/reception for a given time, the anchor gNB 3l-03 may set the RRC inactive mode by transmitting the RRCConnectionRelease message to the UE 3l-01. This RRC message may contain information about a paging area and a resume ID (or a UE context identifier) for the UE RRC inactive mode. The paging area setup information may include a list of cell identifiers (IDs) or paging area identities (or referred to RAN area IDs or CN based paging area IDs), and also include an addition/subtraction indication for each cell ID. The addition/subtraction indication may be a 1-bit indicator. If this indication indicates the addition of a certain cell ID, this cell ID may be added to the paging area. If this indication indicates the subtraction of a certain cell ID, this cell ID may be subtracted from the paging area. The RRC message of the operation 3l-05 may use the RRCConnectionRelease message or a newly defined RRC message including the above setup information to allow the UE 3l-01 to transition to the RRC inactive mode.

The UE 3l-01 that receives the RRC message at operation 3l-05 may transition to an RRC inactive mode. The anchor gNB 3l-03 may store UE context information and maintain an S1 bearer at operations 3l-10 and 3l-15. Instead of the MME 3l-04, the anchor gNB 3l-03 may manage the mobility of the UE 3l-01. That is, if there is downlink data to be transmitted to the UE 3l-01, the anchor gNB 3l-03 may generate and transmit a paging message to the UE 3l-01 through a PA.

The UE 3l-01 may move to a new gNB 3l-02 or cell in another PA at operation 3l-20. At operation 3l-25, using SI, each cell managed by each gNB broadcasts paging area information, such as a cell ID or a paging area ID (RAN area ID or CN based paging area ID), and an indication about whether the cell or gNB supports the RRC inactive mode (light connection). At operation 3l-30, the UE receives the SI of the camp-on cell and checks the paging area information and the indication. If the SI does not contain the indication that the cell (or the new gNB 3l-02) supports the RRC inactive mode, the UE 3l-01 may decide, at operation 3l-35, to perform the CN-based PAU procedure as shown in FIG.

3I. On the other hand, if the SI contains the indication that the cell (or the new gNB 3*l*-02) supports the RRC inactive mode, the UE 3*l*-01 may decide, at operation 3*l*-35, to perform the procedure of updating the paging area as follows.

If the paging area ID or cell ID broadcasted through the SI is not included in the paging area information configured in the UE 3*l*-01 at operation 3*l*-05, the UE 3*l*-01 determines that the UE 3*l*-01 is out of the paging area, and transmits at operation 3*l*-40 an RRCConnectionResumeRequest message to the new gNB 3*l*-02 of the current camp-on cell in order to request the paging area update. This message may newly define and contain an establishment cause for the request of the paging area update. Alternatively, using a reserved 1 bit of this message, an indication to indicate the request of the PAU may be contained. Also, this message includes at least one of a resume ID (or a UE context identifier), a MAC-I, and the establishment cause.

At operation 3*l*-45, the new gNB 3*l*-02 that receives the RRCConnectionResumeRequest message can know, using the resume ID (or the UE context identifier), the anchor gNB 3*l*-03 that has previously supported the UE 3*l*-01. Therefore, at operations 3*l*-50 and 3*l*-55, the new gNB 3*l*-02 may retrieve the UE context information from the anchor gNB 3*l*-03 and check security setting from the retrieved UE context information. These operations 3*l*-50 and 3*l*-55 may be omitted if unnecessary, for example, when the UE attempts again to connect to the original anchor gNB. In order to allow the PAU request of the UE 3*l*-01 received at operation 3*l*-40, the new gNB 3*l*-02 may transmit an RRC message as a response to the PAU request to the UE 3*l*-01 at operation 3*l*-60. This message may contain information about a new paging area as a response to the PAU request, and may also contain a new resume ID. This RRC message may be a newly defined RRC message, an RRCConnectionRelease message, an RRCConnectionReconfiguration message, or an RRCConnectionResume message.

At operation 3*l*-60, the new gNB 3*l*-02 may identify the mobility, speed, traffic pattern, etc. of the UE through history information of the UE and thereby configure a new paging area of the UE 3*l*-01. This history information may be received when exchanging messages with the anchor gNB 3*l*-03 at operations 3*l*-50 and 3*l*-55, and may include information about the number of times, the period, and the time that the UE 3*l*-01 performed the paging update procedure. After updating the paging area of the UE 3*l*-01, the new gNB 3*l*-02 updates the paging area of the UE in the anchor gNB 3*l*-03 at operation 3*l*-65.

If there is no data transmission/reception for a given time, the new gNB 3*l*-02 may set again the UE 3*l*-01 to the RRC inactive mode by transmitting an RRCConnectionRelease message to the UE 3*l*-01, or if the RRCConnectionRelease message is used at operation 3*l*-60 or if necessary, this message may be omitted. Since the anchor gNB 3*l*-03 maintains the UE context and the S1-U bearer and manages the mobility of the UE 3*l*-01, the paging area of the UE 3*l*-01 therein should be updated. This is to allow the anchor gNB 3*l*-03 to suitably generate and transmit a paging message and easily find the UE 3*l*-01 when downlink data for the corresponding UE 3*l*-01 reaches the anchor gNB 3*l*-03 in the future.

In the above procedure, if the UE with low mobility attempts to connect again to the anchor gNB 3*l*-03, operations 3*l*-50, 3*l*-55 and 3*l*-65 may not be performed.

In FIGS. 3J, 3K, and 3L, the gNB may set a timer to the UE through the RRCConnectionSetup message at operation 3*f*-40 or the RRCConnectionReconfiguration message at operation 3*f*-70 in FIG. 3F so that the UE can periodically perform the PAU procedure. That is, the UE can perform the PAU procedure described in FIGS. 3J, 3K, and 3L whenever the timer expires. Also, in FIGS. 3J, 3K, and 3L, if the RRC inactive mode (or light connection) is not supported in the system information, or if the UE is out of the currently configured TA even though the RRC inactive mode is supported in the system information, the UE may perform a CN-based area update procedure (tracking area update). If the UE moves out of the configured paging area and if the RRC inactive mode (or light connection) is supported in the system information, or if the timer expires, the UE can perform the PAU procedure.

In the next generation mobile communication system of the disclosure, if there is a need of requesting the transition to the RRC connected mode from the UE in RRC inactive mode for a certain reason, the network may transmit the paging message to the UE in RRC inactive mode. The above reason may be the case where there is downlink data to be transmitted to the UE in the network. In the disclosure, the subject sending the paging message to the UE in RRC inactive mode may be the anchor gNB, the MME, or any other network entity.

Figure 3M:
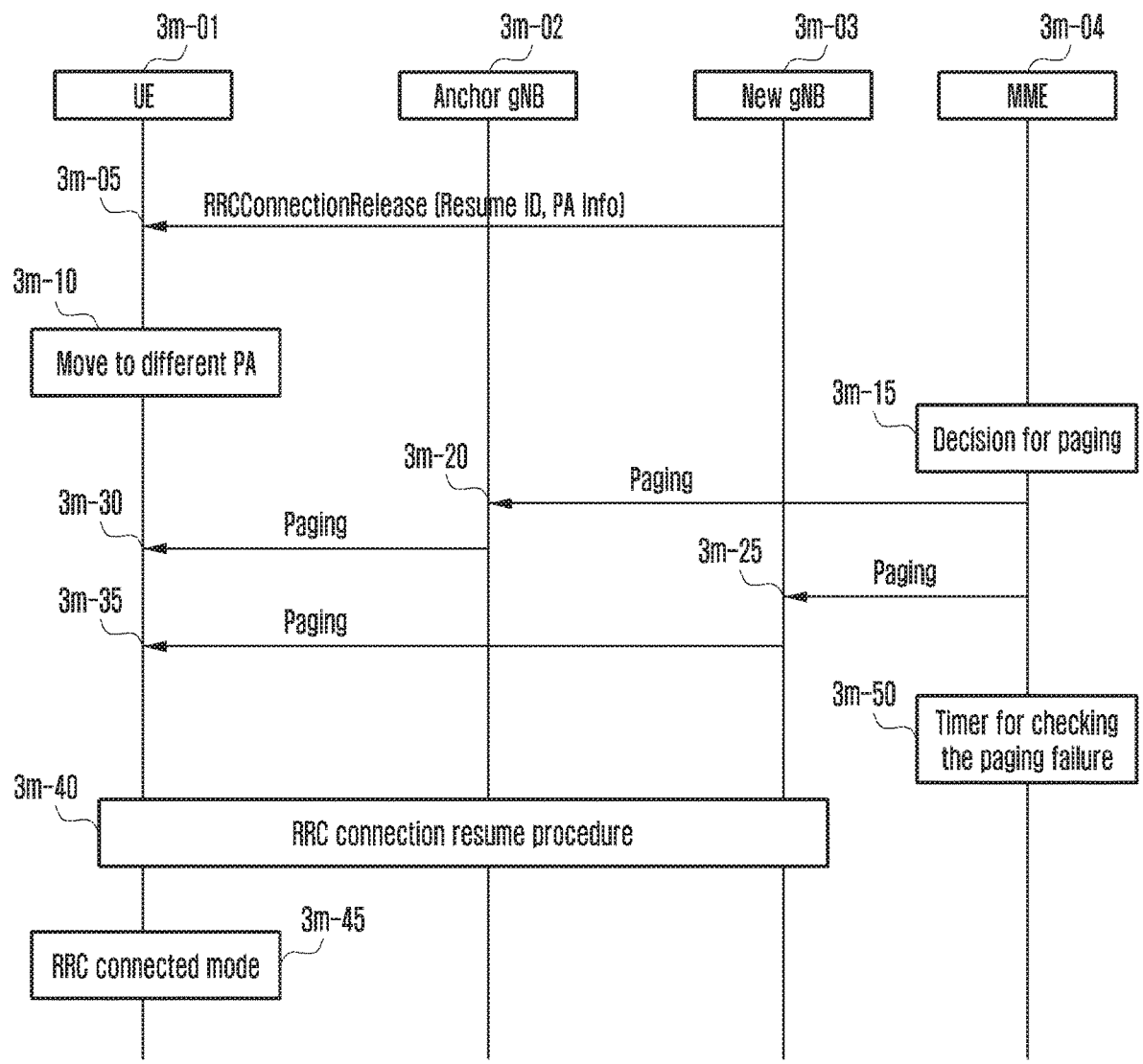
FIG. 3M is a diagram illustrating a procedure in which a mobility management entity (MME) or another network entity of a network transmits a paging message to a UE according to an embodiment of the disclosure.

FIG. 3M is a diagram illustrating a procedure in which an MME or another network entity of a network transmits a paging message to a UE according to an embodiment of the disclosure.

Referring to FIG. 3M, a procedure is illustrated in which the MME 3*m*-04, instead of the anchor gNB 3*m*-02, is responsible for transmitting the paging message in the network supporting the RRC inactive mode, as in the LTE system, and the MME 3*m*-04 transmits paging to the UE 3*m*-01 for a certain reason. Referring to FIG. 3M, the UE 3*m*-01 which is in the RRC connected mode performs data transmission and reception with the anchor gNB 3*m*-02. If the data transmission and reception are stopped, the anchor gNB 3*m*-02 triggers a certain timer. If the data transmission and reception are not resumed until the timer expires, the anchor gNB 3*m*-02 considers allowing the UE 3*m*-01 to be in the RRC inactive mode. After releasing the RRC connection of the UE 3*m*-01 according to a predetermined rule, the anchor gNB 3*m*-02 stores the UE context and transmits a control message that instructs the UE 3*m*-01 to release the RRC connection. Also, the anchor gNB 3*m*-02 allocates a resume ID (or a UE context identifier) and configures a PA in which the UE 3*m*-01 will report mobility during the RRC inactive mode. From the allocation of the resume ID, the UE 3*m*-01 can know that the UE 3*m*-01 needs to store the UE context. Alternatively, at operation 3*m*-05, the anchor gNB 3*m*-02 may transmit a separate context maintenance indication for instructing this. The above control message may contain a list of cells for which the UE 3*m*-01 can apply a procedure of using the stored context when desiring to reset the RRC connection within a valid period or a specific period for which the anchor gNB 3*m*-02 maintains the context. After the RRC connection of the UE 3*m*-01 is released, the anchor gNB 3*m*-02 maintains the UE context and the S1 bearer of the UE 3*m*-01.

Upon receiving the RRC connection release message at operation 3*m*-05, the UE 3*m*-01 switches to the RRC inactive mode at operation 3*m*-10. This RRC connection release message may be an RRConnectionRelease message or a newly defined RRC message. If the MME 3*m*-04 decides to send a paging message to the UE 3*m*-01 in RRC inactive mode for a certain reason at operation 3*m*-15, the MME 3*m*-04 transmits the paging message at operations 3*m*-20, 3*m*-25, 3*m*-30, and 3*m*-35 so that the UE 3*m*-01 switches to the RRC connected mode. Since the MME 3m-04 receives a report on a paging area (or a tracking area) of the UE whenever the UE 3m-01 moves and updates the paging area, the MME 3m-04 can know the paging area of the UE. The UE 3m-01 that receives the paging message performs at operation 3m-40 the RRC connection request procedure previously described in FIG. 3F by transmitting an RRC connection request message to a new gNB 3m-03 in order to request a connection, and then transitions to the RRC connected mode at operation 3m-45.

In this procedure, the MME 3m-04 or other network entity may trigger a timer at operation 3m-50 to check whether there is a failure in the paging message transmitted to the UE 3m-01 in RRC inactive mode. That is, if there is no response from the UE 3m-01 until the timer expires, if the UE 3m-01 does not attempt to resume the connection, or if the UE 3m-01 does not transition to the connected mode, the MME 3m-04 may determine that the paging message for the UE 3m-01 has failed.

If it is determined that the paging message has failed, the MME 3m-04 can repeat transmission a certain number of times until the paging succeeds.

Figure 3N:
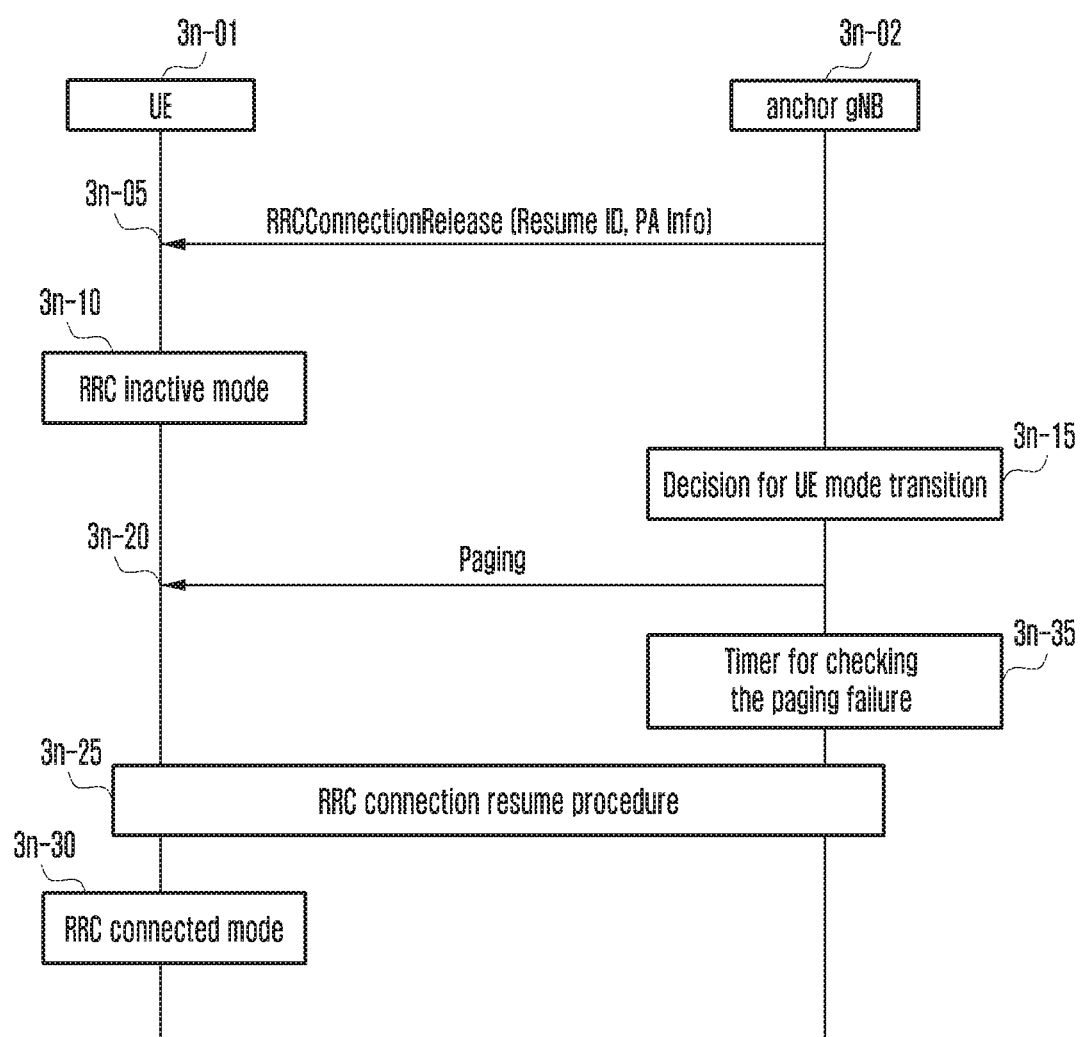
FIG. 3N is a diagram illustrating a procedure in which an anchor gNB transmits a paging message to a UE in an RRC inactive mode located in a cell coverage of the anchor gNB according to an embodiment of the disclosure.
Figure 30:
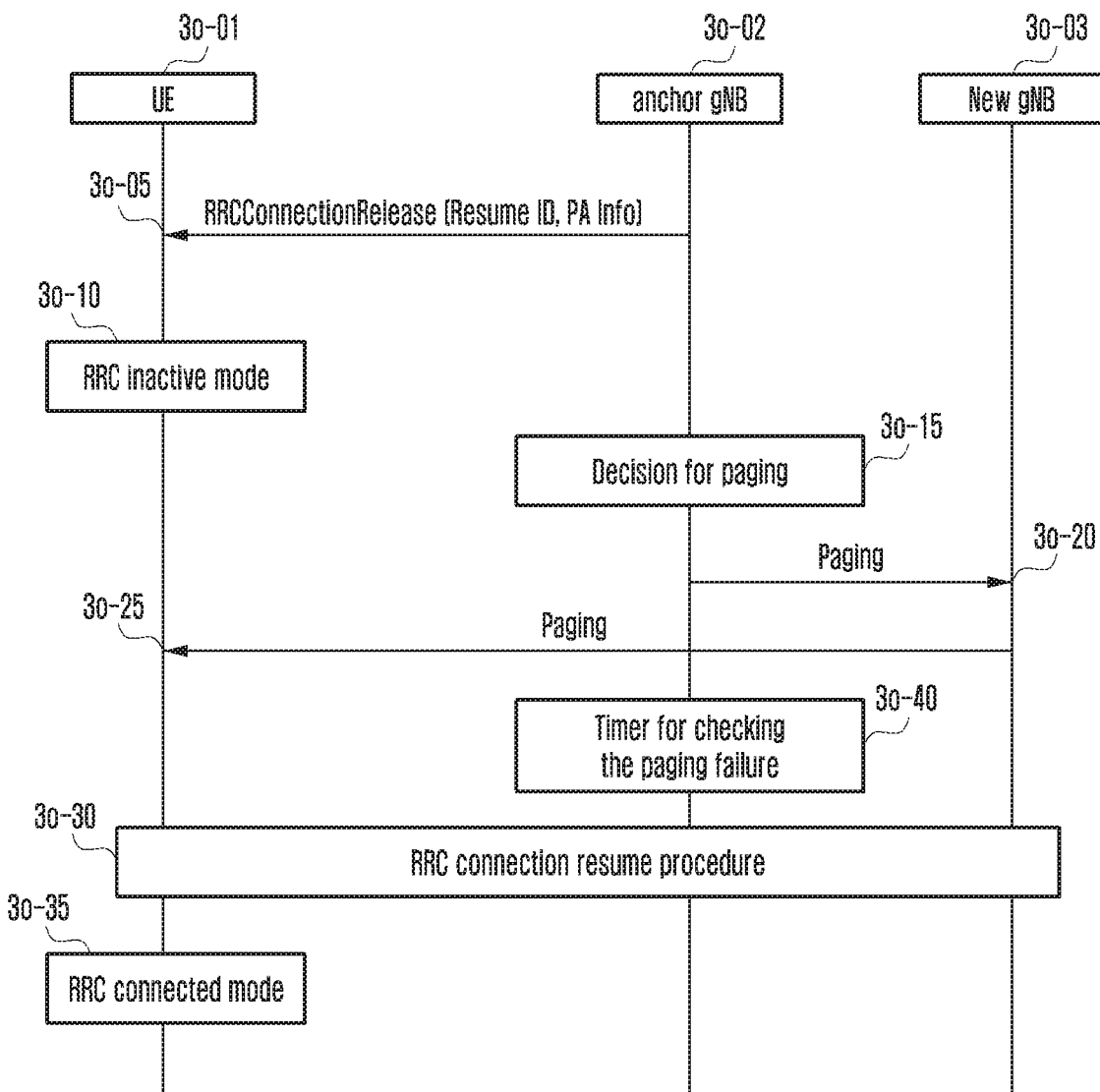

FIG. 3N is a diagram illustrating a procedure in which an anchor gNB transmits a paging message to a UE in an RRC inactive mode located in a cell coverage of the anchor gNB according to an embodiment of the disclosure.

Referring to FIG. 3N, the UE 3n-01 which is in the RRC connected mode performs data transmission and reception with the anchor gNB 3n-02. If the data transmission and reception are stopped, the anchor gNB 3n-02 triggers a certain timer. If the data transmission and reception are not resumed until the timer expires, the anchor gNB 3n-02 considers releasing the RRC connection of the UE 3n-01. After releasing the RRC connection of the UE 3n-01 according to a predetermined rule, the anchor gNB 3n-02 stores the UE context and transmits a control message that instructs the UE 3n-01 to release the RRC connection. Also, the anchor gNB 3n-02 allocates a resume ID (or a UE context identifier) and configures a PA in which the UE 3n-01 will report mobility during the RRC inactive mode. From the allocation of the resume ID, the UE 3n-01 can know that the UE 3n-01 needs to store the UE context. Alternatively, at operation 3n-05, the anchor gNB 3n-02 may transmit a separate context maintenance indication for instructing this. The above control message may contain a list of cells for which the UE 3n-01 can apply a procedure of using the stored context when desiring to reset the RRC connection within a valid period or a specific period for which the anchor gNB 3n-02 maintains the context. After the RRC connection of the UE 3n-01 is released, the anchor gNB 3n-02 maintains the UE context and the S1 bearer of the UE 3n-01.

Upon receiving the RRC connection release message at operation 3n-05, the UE 3n-01 switches to the RRC inactive mode at operation 3n-10. For a certain reason, the anchor gNB 3n-02 may transmit the paging message to the UE 3n-01 in RRC inactive mode. This reason may be the occurrence of downlink data to be transmitted to the UE 3n-01. The anchor gNB 3n-02 refers to a base station that maintains the UE context and the S1-U bearer. If the anchor gNB 3n-02 decides to transmit the paging message to the UE 3n-01 in RRC inactive mode at operation 3n-15, the anchor gNB 3n-02 may transmit the paging message to the UE 3n-01 at operation 3n-20 so that the UE 3n-01 transitions to the RRC connected mode. Since the anchor gNB 3n-02 receives a report on a paging area of the UE 3n-01 whenever the UE 3n-01 moves and updates the paging area, the anchor gNB 3n-02 can know the paging area of the UE 3n-01. The UE 3n-01 that receives the paging message performs at operation 3n-25 the RRC connection resumption procedure previously described in FIG. 3G by transmitting an RRC connection resume message to the anchor gNB 3n-02 in order to resume the connection, and then transitions to the RRC connected mode at operation 3n-30.

In this procedure, the anchor gNB 3n-02 may trigger a timer at operation 3n-35 to check whether there is a failure in the paging message transmitted to the UE 3n-01 in RRC inactive mode. That is, if there is no response from the UE 3n-01 until the timer expires, if the UE 3n-01 does not attempt to resume the connection, or if the UE 3n-01 does not transition to the connected mode, the anchor gNB 3n-02 may determine that the paging message for the UE 3n-01 has failed.

If it is determined that the paging message has failed, the anchor gNB 3n-02 may repeat transmission a certain number of times until the paging succeeds. Alternatively, the anchor gNB 3n-02 may request the CN based paging from the MME (or other network entity). The CN based paging represents the paging procedure performed by the MME as shown in FIG. 3M.

FIG. 3O is a diagram illustrating a procedure in which an anchor gNB transmits a paging message to a UE in an RRC inactive mode located out of a cell coverage of the anchor gNB according to an embodiment of the disclosure.

Referring to FIG. 3O, the UE 3o-01 which is in the RRC connected mode performs data transmission and reception with the anchor gNB 3o-02. If the data transmission and reception are stopped, the anchor gNB 3o-02 triggers a certain timer. If the data transmission and reception are not resumed until the timer expires, the anchor gNB 3o-02 considers releasing the RRC connection of the UE 3o-01. After releasing the RRC connection of the UE according to a predetermined rule, the anchor gNB 3o-02 stores the UE context and transmits a control message that instructs the UE 3o-01 to release the RRC connection. Also, the anchor gNB 3o-02 allocates a resume ID (or a UE context identifier) and configures a PA in which the UE 3o-01 will report mobility during the RRC inactive mode. From the allocation of the resume ID, the UE 3o-01 can know that the UE 3o-01 needs to store the UE context. Alternatively, at operation 3o-05, the anchor gNB 3o-02 may transmit a separate context maintenance indication for instructing this. The above control message may contain a list of cells for which the UE 3o-01 can apply a procedure of using the stored context when desiring to reset the RRC connection within a valid period or a specific period for which the anchor gNB 3o-02 maintains the context. After the RRC connection of the UE 3o-01 is released, the anchor gNB 3o-02 maintains the UE context and the S1 bearer of the UE 3o-01.

Upon receiving the RRC connection release message at operation 3o-05, the UE 3o-01 switches to the RRC inactive mode at operation 3o-10. For a certain reason, the anchor gNB 3o-02 may transmit the paging message to the UE 3o-01 in RRC inactive mode. This reason may be the occurrence of downlink data to be transmitted to the UE 3o-01. The anchor gNB 3o-02 refers to a base station that maintains the UE context and the S1-U bearer. If the anchor gNB 3o-02 decides to transmit the paging message to the UE 3o-01 in RRC inactive mode at operation 3o-15, the anchor gNB 3o-02 may transmit the paging message to the UE 3o-01 via new gNB at operations 3o-20 and 3o-25 so that the UE 3o-01 transitions to the RRC connected mode. At the above operation 3o-20, the anchor gNB 3o-02 may send the paging message to all gNBs belonging to the paging area. Since the anchor gNB 3o-02 receives a report on a paging area of the UE 3o-01 whenever the UE 3o-01 moves and updates the paging area, the anchor gNB 3o-02 can know the paging area of the UE. The UE 3o-01 that receives the paging message performs at operation 3o-30 the RRC connection resumption procedure previously described in FIG. 3G by transmitting an RRC connection resume message to the new gNB 3o-03 in order to resume the connection, and then transitions to the RRC connected mode at operation 3o-35.

In this procedure, the anchor gNB 3o-02 may trigger a timer at operation 3o-40 to check whether there is a failure in the paging message transmitted to the UE 3o-01 in RRC inactive mode. That is, if there is no response from the UE 3o-01 until the timer expires, if the UE 3o-01 does not attempt to resume the connection, or if the UE 3o-01 does not transition to the connected mode, the anchor gNB 3o-02 may determine that the paging message for the UE 3o-01 has failed.

If it is determined that the paging message has failed, the anchor gNB 3o-02 may repeat transmission a certain number of times until the paging succeeds. Alternatively, the anchor gNB 3o-01 may request the CN based paging from the MME (or other network entity). The CN based paging represents the paging procedure performed by the MME as shown in FIG. 3M.

Figure 3P:
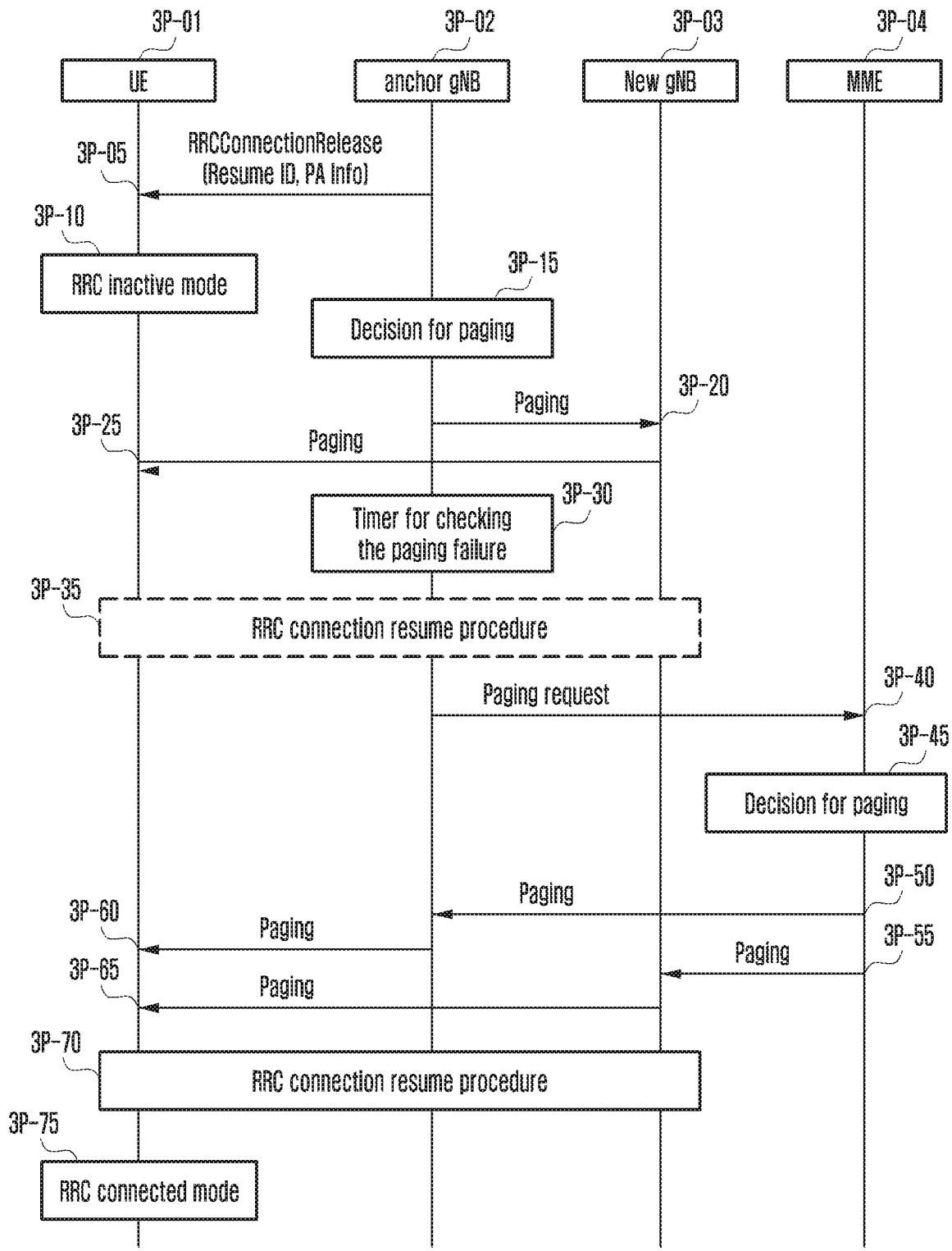
FIG. 3P is a diagram illustrating a procedure in which an anchor gNB transmits a paging message to a UE in an RRC inactive mode but there is failure in the paging message according to an embodiment of the disclosure.

FIG. 3P is a diagram illustrating a procedure in which an anchor gNB transmits a paging message to a UE in an RRC inactive mode but there is failure in the paging message according to an embodiment of the disclosure.

Referring to FIG. 3P, the UE 3p-01 which is in the RRC connected mode performs data transmission and reception with the anchor gNB 3p-02. If the data transmission and reception are stopped, the anchor gNB 3p-02 triggers a certain timer. If the data transmission and reception are not resumed until the timer expires, the anchor gNB 3p-02 considers releasing the RRC connection of the UE 3p-01. After releasing the RRC connection of the UE 3p-01 according to a predetermined rule, the anchor gNB 3p-02 stores the UE context and transmits a control message that instructs the UE to release the RRC connection. Also, the anchor gNB 3p-02 allocates a resume ID (or a UE context identifier) and configures a PA in which the UE 3p-01 will report mobility during the RRC inactive mode. From the allocation of the resume ID, the UE 3p-01 can know that the UE 3p-01 needs to store the UE context. Alternatively, at operation 3p-05, the anchor gNB 3p-02 may transmit a separate context maintenance indication for instructing this. The above control message may contain a list of cells for which the UE 3p-01 can apply a procedure of using the stored context when desiring to reset the RRC connection within a valid period or a specific period for which the anchor gNB 3p-02 maintains the context. After the RRC connection of the UE 3p-01 is released, the anchor gNB 3p-02 maintains the UE context and the S1 bearer of the UE 3p-01.

Upon receiving the RRC connection release message at operation 3p-05, the UE 3p-01 switches to the RRC inactive mode at operation 3p-10. For a certain reason, the anchor gNB 3p-02 may transmit the paging message to the UE 3p-01 in RRC inactive mode. This reason may be the occurrence of downlink data to be transmitted to the UE 3p-01. The anchor gNB 3p-02 refers to a base station that maintains the UE context and the S1-U bearer. If the anchor gNB 3p-02 decides to transmit the paging message to the UE 3p-01 in RRC inactive mode at operation 3p-15, the anchor gNB 3p-02 may transmit the paging message to the UE 3p-01 via new gNB at operations 3p-20 and 3p-25 so that the UE 3p-01 transitions to the RRC connected mode. At the above operation 3p-20, the anchor gNB 3p-02 may send the paging message to all gNBs belonging to the paging area. Since the anchor gNB 3p-02 receives a report on a paging area of the UE 3p-01 whenever the UE 3p-01 moves and updates the paging area, the anchor gNB 3p-02 can know the paging area of the UE 3p-01.

In this procedure, the anchor gNB 3p-02 may trigger a timer at operation 3p-30 to check whether there is a failure in the paging message transmitted to the UE 3p-01 in RRC inactive mode. That is, if there is no response from the UE 3p-01 until the timer expires, if the UE 3p-01 does not attempt to resume the connection, or if the UE 3p-01 does not transition to the connected mode, the anchor gNB 3p-02 may determine that the paging message for the UE 3p-01 has failed at operation 3p-35.

If it is determined that the paging message has failed, the anchor gNB 3p-02 may repeat transmission a certain number of times until the paging succeeds. Alternatively, at operation 3p-40, the anchor gNB 3p-02 may send a CN based paging request message to the MME 3p-04 (or other network entity). The CN based paging represents the paging procedure performed by the MME 3p-04 as shown in FIG. 3M. If the MME 3p-04 that receives the paging request message decides at operation 3p-45 to send the paging message to the UE 3p-01 in RRC inactive mode, the MME 3p-04 transmits the paging message at operations 3p-50, 3p-55, 3p-60, and 3p-65 so that the UE 3p-01 transitions to the RRC connected mode. Since the MME 3p-04 receives a report on a paging area of the UE 3p-01 whenever the UE 3p-01 moves and updates the paging area, the MME 3p-04 can know the paging area (or tracking area) of the UE 3p-01. In this case, the MME 3p-04 may request all gNBs belonging to the paging area (or tracking area) for the UE 3p-01 to transmit the paging message. The UE 3p-01 that receives the paging message performs at operation 3p-70 the RRC connection request procedure previously described in FIG. 3F by transmitting an RRC connection request message to a new gNB 3p-03 in order to request a connection, and then transitions to the RRC connected mode at operation 3p-75.

As shown in FIGS. 3M, 3N, and 3O, the UE may receive the paging message from the anchor gNB or the MME (or any other network entity). Upon receiving the paging message, the UE checks the resume ID or the CN-based ID (e.g., system architecture evolution (SAE) temporary mobile subscriber identity (S-TMSI), international mobile subscriber identity (IMSI), etc.) contained in the paging message. If there is the resume ID in the received paging message (i.e., in case where the paging message is received from the anchor gNB), the UE may perform the RRC connection resumption procedure shown in FIG. 3G as in FIG. 3N or FIG. 3O. On the other hand, if there is the CN-based ID in the received paging message (i.e., in case where the paging message is received from the MME), the UE may transition to the idle mode and perform the general RRC connection procedure shown in FIG. 3F, FIG. 3M, or FIG. 3P.

Figure 3Q:
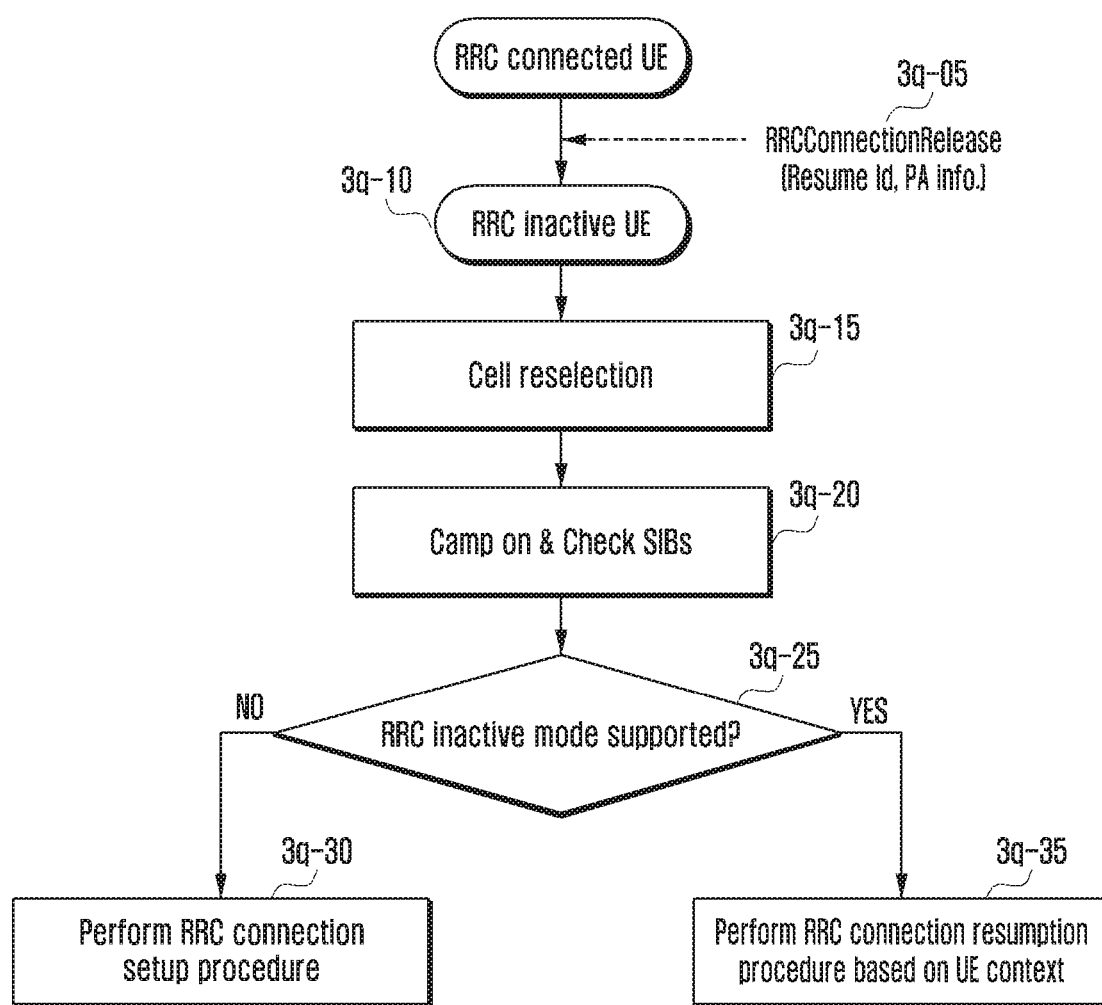
FIG. 3Q is a diagram illustrating an operation of UE in an RRC inactive mode that establishes an RRC connection with a network according to an embodiment of the disclosure.

FIG. 3Q is a diagram illustrating an operation of UE in an RRC inactive mode that establishes an RRC connection with a network according to an embodiment of the disclosure.

Referring to FIG. 3Q, the UE which is in a connected mode with the anchor gNB receives an RRCConnectionRelease message from the anchor gNB at operation 3q-05. The anchor gNB may set the UE to the RRC inactive mode if there is no data transmission/reception in the UE for a certain time. The UE that receives the message switches to the RRC inactive mode at operation 3q-10. In addition, the UE that receives the RRCConnectionRelease message may transition to an RRC idle state. Through the RRCConnectionRelease message at operation 3*q*-05, the UE receives a resume ID and paging area information.

The UE may move to another PA of the existing anchor gNB or another gNB. If it is necessary for the UE to establish an RRC connection to the network for a certain reason, the UE performs a cell reselection procedure while moving and finds a suitable cell at operation 3*q*-15. If a suitable cell is found in the cell reselection procedure, the UE camps on the cell and receives SI at operation 3*q*-20. From the system information, the UE checks at operation 3*q*-25 whether the paging area information or the camp-on cell supports the RRC inactive mode. If the cell does not support the RRC inactive mode, the UE performs at operation 3*q*-30 the RRC connection setup procedure previously described in FIG. 3F. If the cell supports the RRC inactive mode, the UE performs at operation 3*q*-35 the RRC connection resumption procedure based on the UE context as described in FIG. 3G.

Figure 3R:
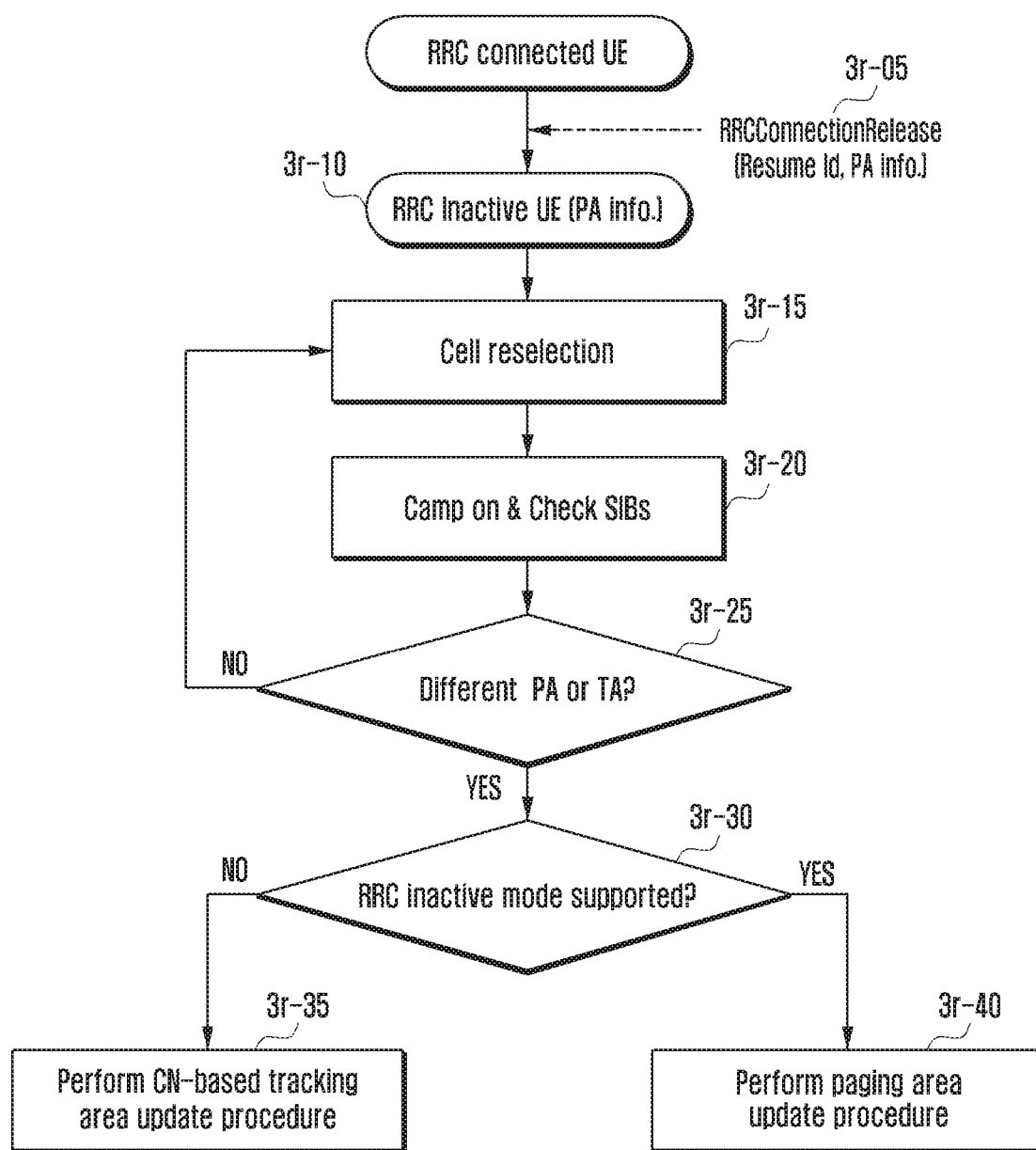
FIG. 3R is a diagram illustrating an operation of a UE in an RRC inactive mode that performs a PAU procedure according to an embodiment of the disclosure.

FIG. 3R is a diagram illustrating an operation of UE in an RRC inactive mode that performs a PAU procedure according to an embodiment of the disclosure.

Referring to FIG. 3R, the UE which is in a connected mode with the anchor gNB receives an RRCConnectionRelease message from the anchor gNB at operation 3*r*-05. The anchor gNB may set the UE to the RRC inactive mode if there is no data transmission/reception in the UE for a certain time. The UE that receives the message switches to the RRC inactive mode at operation 3*r*-10. In addition, the UE that receives the RRCConnectionRelease message may transition to an RRC idle state. Through the RRCConnectionRelease message at operation 3*r*-05, the UE receives a resume ID and paging area information.

The UE may move to another PA of the existing anchor gNB or another gNB. The UE performs a cell reselection procedure while moving and finds a suitable cell at operation 3*r*-15. If a suitable cell is found in the cell reselection procedure, the UE camps on the cell and receives SI at operation 3*r*-20. The UE checks the paging area information in the SI and compares it with the paging area information configured at operation 3*r*-05 to determine at operation 3*r*-20 whether both paging areas are equal to or different from each other. If the paging area information read from the SI is included in the paging area information configured at operation 3*r*-05, the UE determines that the UE is within the configured paging area, and continues to perform the cell reselection procedure at operation 3*r*-15 without performing the PAU procedure. The procedure for determining the paging area should include checking a CN based paging area (tracking area) configured for mobility in the RRC idle mode and also checking a paging area (RAN paging area) configured for mobility in the RRC inactive mode. That is, it is necessary to check whether the UE is out of the CN based tracking area and also check whether the UE is out of the RAN paging area.

If it is determined that the UE is out of the CN based tracking area or the RAN paging area, the UE checks at operation 3*r*-30 from the SI whether the current camp-on cell supports the RRC inactive mode. If the current camp-on cell does not support the RRC inactive mode, the UE performs at operation 3*r*-35 the CN-based tracking area update procedure described in FIG. 3I. If the current camp-on cell supports the RRC inactive mode, the UE performs at operation 3*r*-40 the PAU procedure described in FIGS. 3J, 3K and 3L.

Figure 3S:
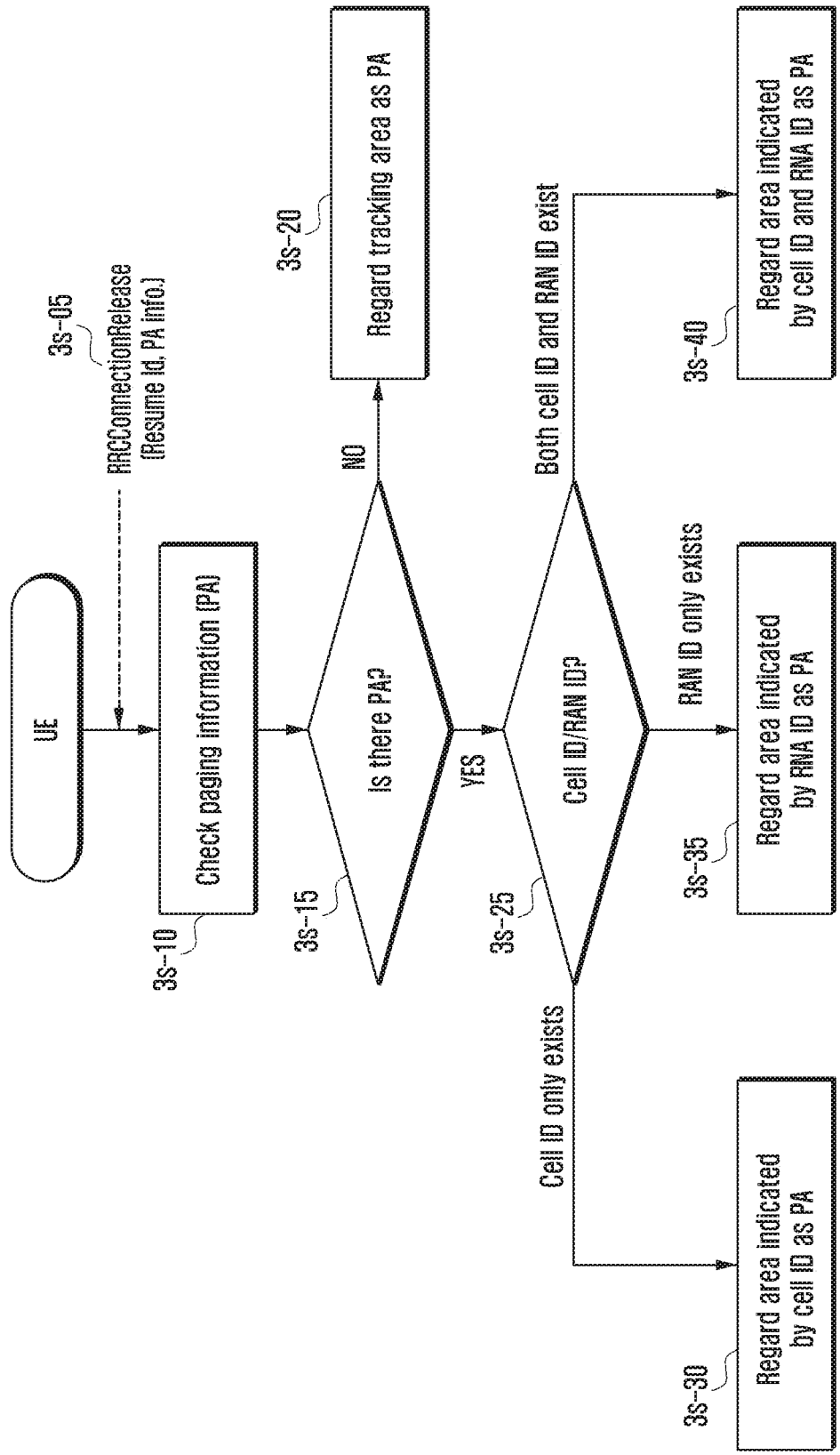
FIG. 3S is a diagram illustrating an operation of a UE for determining paging area setup information according to an embodiment of the disclosure.

FIG. 3S is a diagram illustrating an operation of a UE for determining paging area setup information according to an embodiment of the disclosure.

Referring to FIG. 3S, the UE may receive an RRC connection release message or a newly defined RRC message from the gNB and transitions to the RRC inactive mode at operation 3*s*-05. The RRC message may include a UE context ID and paging area setup information. The UE that receives the RRC message checks at operation 3*s*-10 whether there is paging area setup information. If there is no paging area setup information, the UE regards, as the paging area, the CN based paging area or tracking area configured for the UE in RRC idle mode at operation 3*s*-20. That is, the UE regards the paging area configured with CN-based paging area IDs for the RRC idle mode as the paging area setup information of the UE in RRC inactive mode. If there are only cell IDs in the paging area setup information at operations 3*s*-15 and 3*s*-25, the UE determines the area indicated by the cell IDs as the paging area for the RRC inactive mode at operation 3*s*-30. If only the RAN-based paging area (RAN notification area) IDs exist in the paging area setup information, the UE determines the area indicated by the RAN-based paging area IDs as the paging area for the RRC inactive mode at operation 3*s*-35. If there are RAN-based paging area IDs, cell IDs, and addition/subtraction indications of each ID in the paging area setup information, the UE determines the area indicated by the RAN-based paging area IDs, the cell IDs, and the addition/subtraction indications of each ID as the paging area for the RRC inactive mode at operation 3*s*-40. This area indicated by the RAN-based paging area IDs, the cell IDs, and the addition/subtraction indications of each ID refers to an area obtained by adding cells broadcasting the RAN-based paging area IDs and cells broadcasting the cell IDs having the addition indication and also subtracting cells broadcasting the cell IDs having the subtraction indication.

Figure 3T:
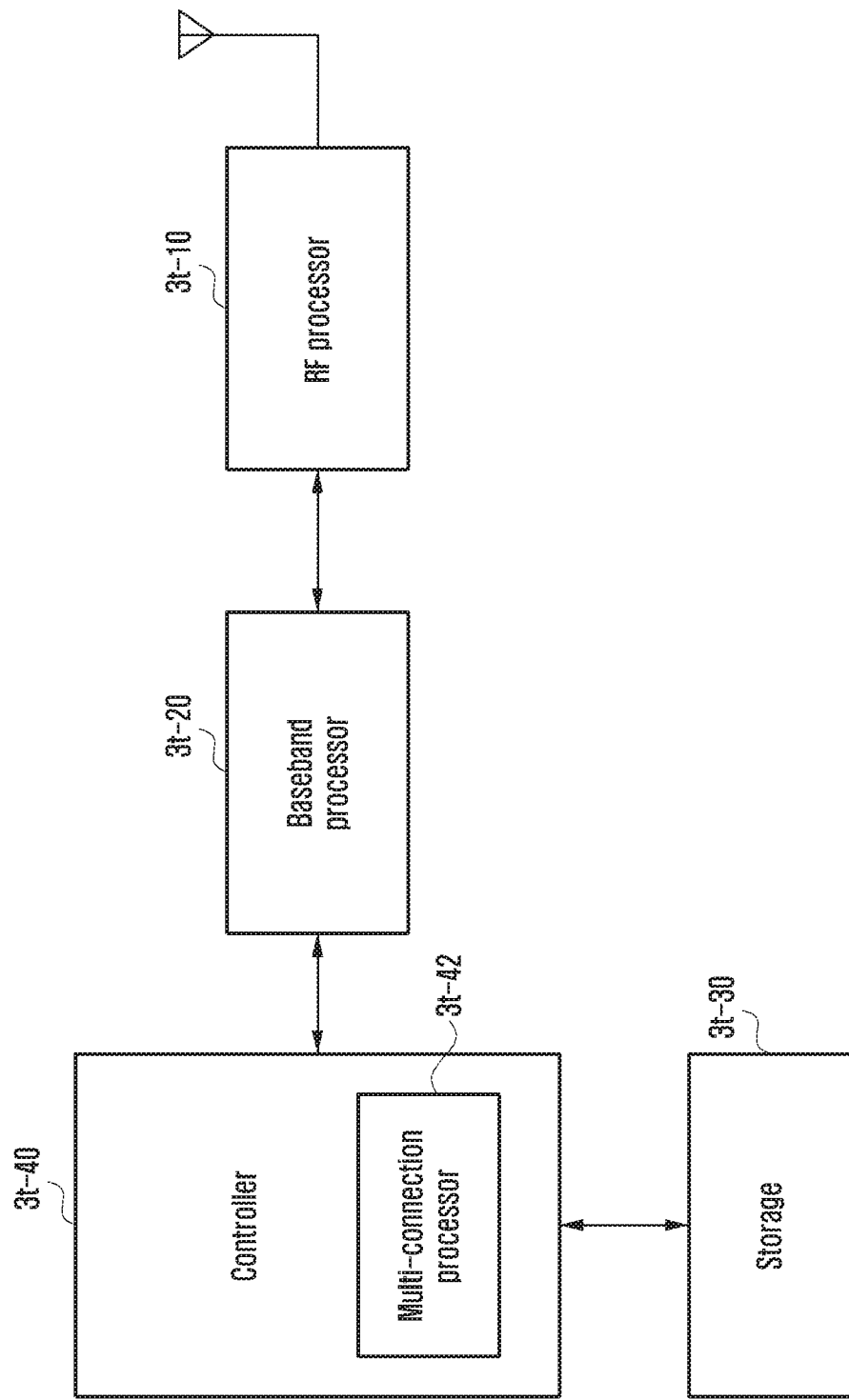
FIG. 3T is a block diagram illustrating a configuration of a UE according to an embodiment of the disclosure.

FIG. 3T is a block diagram illustrating a configuration of a UE according to an embodiment of the disclosure.

Referring to FIG. 3T, the UE includes a RF processor 3*t*-10, a baseband processor 3*t*-20, a storage 3*t*-30, and a controller 3*t*-40.

The RF processor 3*t*-10 performs a function, such as band conversion and amplification of a signal, for transmitting and receiving the signal through a radio channel. That is, the RF processor 3*t*-10 up-converts a baseband signal provided from the baseband processor 3*t*-20 into an RF band signal to transmit the RF band signal through an antenna, and also down-converts an RF band signal received through the antenna into a baseband signal. For example, the RF processor 3*t*-10 may include a transmitter filter, a receiver filter, an amplifier, a mixer, an oscillator, a DAC, an ADC, and the like. Although FIG. 3T shows only one antenna, the UE may have a plurality of antennas. In addition, the RF processor 3*t*-10 may include a plurality of RF chains. Further, the RF processor 3*t*-10 may perform beamforming. For the beamforming, the RF processor 3*t*-10 may adjust the phase and size of each signal transmitted and received through a plurality of antennas or antenna elements. Also, the RF processor 3*t*-10 may perform MIMO and receive several layers in the MIMO operation. The RF processor 3*t*-10 may perform reception beam sweeping by appropriately setting a plurality of antennas or antenna elements under the control of the controller, or may adjust the direction and width of the reception beam such that the reception beam is coordinated with the transmission beam.

The baseband processor 3*t*-20 performs a conversion function between a baseband signal and a bit stream in accordance with a physical layer standard of the system. For example, in data transmission, the baseband processor 3*t*-20 creates complex symbols by encoding and modulating transmission bit streams. Also, in data reception, the baseband processor 3t-20 restores reception bit streams by demodulating and decoding a baseband signal provided from the RF processor 3t-10. In case of complying with OFDM scheme, in data transmission, the baseband processor 3t-20 generates complex symbols by encoding and modulating transmission bit streams, maps the complex symbols to subcarriers, and constructs OFDM symbols through an IFFT operation and a CP insertion. In addition, in data reception, the baseband processor 3t-20 divides a baseband signal provided from the RF processor 3t-10 into OFDM symbol units, restores signals mapped to subcarriers through a FFT operation, and restores reception bit streams through demodulation and decoding.

The baseband processor 3t-20 and the RF processor 3t-10 transmits and receives a signal as described above. Accordingly, the baseband processor 3t-20 and the RF processor 3t-10 may be referred to as a transmitting unit, a receiving unit, a transceiver, or a communication unit. In addition, at least one of the baseband processor 3t-20 and the RF processor 3t-10 may include a plurality of communication modules to support a plurality of different radio access technologies. Also, at least one of the baseband processor 3t-20 and the RF processor 3t-10 may include different communication modules for processing signals of different frequency bands. For example, the different radio access technologies may include a wireless LAN (e.g., IEEE 802.11), a cellular network (e.g., LTE), and the like. In addition, the different frequency bands may include a super high frequency (SHF) band (e.g., 2.5 GHz, 5 GHz), and a millimeter wave (e.g., 60 GHz) band.

The storage 3t-30 stores a basic program for the operation of the UE, an application program, and data such as setting information. The storage 3t-30 provides the stored data in response to a request of the controller 3t-40.

The controller 3t-40 controls overall operations of the UE. For example, the controller 3t-40 transmits and receives a signal through the baseband processor 3t-20 and the RF processor 3t-10. Also, the controller 3t-40 writes and reads data to and from the storage 3t-30. For this, the controller 3t-40 may include at least one processor. For example, the controller 3t-40 may include a CP for performing the control for communication and an (AP for controlling an upper layer such as an application program. The controller may also include a multi-connection processor 3t-42 for processing multiple connections.

The controller 3t-40 may be configured to receive a paging message from a base station in an inactive mode of the terminal, to identify a paging identifier contained in the paging message, and to transmit a first message when the paging identifier is CN paging identifier, and transmit a second RRC message when the paging identifier is a RAN paging identifier. The CN paging identifier may include an S-TMSI or an IMSI, and the RAN paging identifier may include a resume identity. The first RRC message may include an RRC connection request message, and the second RRC message may include an RRC connection resume request message. When the CN paging identifier is contained in the paging message, the base station may not store a context for the terminal. When the RAN paging identifier is contained in the paging message and when the terminal stores a context, the controller 3t-40 may transmit the second RRC message.

Figure 3U:
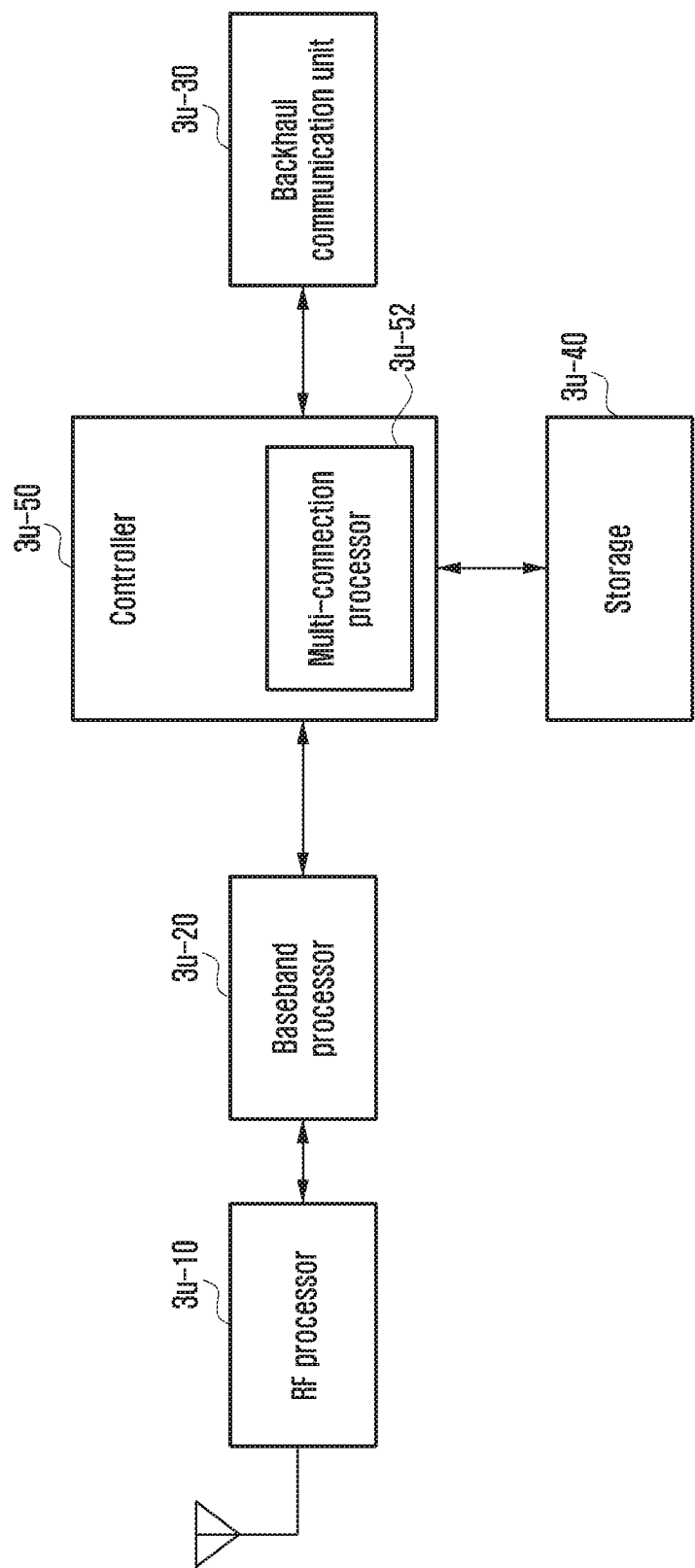
FIG. 3U is a block diagram illustrating a configuration of a gNB according to an embodiment of the disclosure.

FIG. 3U is a block diagram illustrating a configuration of a gNB according to an embodiment of the disclosure.

Referring to FIG. 3U, the gNB includes an RF processor 3u-10, a baseband processor 3u-20, a backhaul communication unit 3u-30, a storage 3u-40, and a controller 3u-50.

The RF processor 3u-10 performs a function, such as band conversion and amplification of a signal, for transmitting and receiving the signal through a radio channel. That is, the RF processor 3u-10 up-converts a baseband signal provided from the baseband processor 3u-20 into an RF band signal to transmit the RF band signal through an antenna, and also down-converts an RF band signal received through the antenna into a baseband signal. For example, the RF processor 3u-10 may include a transmitter filter, a receiver filter, an amplifier, a mixer, an oscillator, a DAC, an ADC, and the like. Although FIG. 3U shows only one antenna, the first access node may have a plurality of antennas. In addition, the RF processor 3u-10 may include a plurality of RF chains. Further, the RF processor 3u-10 may perform beamforming. For the beamforming, the RF processor 3u-10 may adjust the phase and size of each signal transmitted and received through a plurality of antennas or antenna elements. Also, the RF processor 3u-10 may perform MIMO and receive several layers in the MIMO operation.

The baseband processor 3u-20 performs a conversion function between a baseband signal and a bit stream in accordance with a physical layer standard of the first radio access technology. For example, in data transmission, the baseband processor 3u-20 creates complex symbols by encoding and modulating transmission bit streams. Also, in data reception, the baseband processor 3u-20 restores reception bit streams by demodulating and decoding a baseband signal provided from the RF processor 3u-10. In case of complying with OFDM scheme, in data transmission, the baseband processor 3u-20 generates complex symbols by encoding and modulating transmission bit streams, maps the complex symbols to subcarriers, and constructs OFDM symbols through an IFFT operation and a CP insertion. In addition, in data reception, the baseband processor 3u-20 divides a baseband signal provided from the RF processor 3u-10 into OFDM symbol units, restores signals mapped to subcarriers through an FFT operation, and restores reception bit streams through demodulation and decoding. The baseband processor 3u-20 and the RF processor 3u-10 transmits and receives a signal as described above. Thus, the baseband processor 3u-20 and the RF processor 3u-10 may be referred to as a transmitting unit, a receiving unit, a transceiver, a communication unit, or a wireless communication unit.

The backhaul communication unit 3u-30 provides an interface for performing communication with other nodes in a network. That is, the backhaul communication unit 3u-30 converts a bit stream transmitted from the main gNB to another node, e.g., a sub-gNB, a core network, etc., into a physical signal, and also converts a physical signal received from such other node into a bit stream.

The storage 3u-40 stores a basic program for the operation of the gNB, an application program, and data such as setting information. In particular, the storage 3u-40 may store information on a bearer allocated to the connected UE, a measurement result reported from the connected UE, and the like. In addition, the storage 3u-40 may store information for determining whether to provide or suspend multiple connections to or from the UE. Also, the storage 3u-40 provides the stored data in response to a request of the controller 3u-50.

The controller 3u-50 controls overall operations of the gNB. For example, the controller 3u-50 transmits and receives a signal through the baseband processor 3u-20 and the RF processor 3u-10 or through the backhaul communication unit 3u-30. Also, the controller 3u-50 writes and reads data to and from the storage 3u-40. For this, the controller 3u-50 may include at least one processor. The controller 3u-50 may include a multi-connection processor 3u-52 for processing multiple connections.

The controller 3u-50 may be configured to transmit a paging message to a terminal being in an inactive mode, to receive a connection request message corresponding to a paging identifier contained in the paging message from the terminal, and to transmit a first RRC message or a second RRC message to the terminal, based on the connection request message. When the paging message is initiated from a CN node, the paging message may include a SAE-temporary mobile subscriber identity (S-TMSI) or an international mobile subscriber identity (IMSI). When the paging message is initiated from the base station, the paging message may include a resume identity. When the base station does not store a context for the terminal, the paging message may contain a CN paging identifier. When the paging message contains a CN paging identifier, the connection request message may be an RRC connection request message, and the first RRC message may be an RRC connection setup message. When the paging message contains a RAN paging identifier, the connection request message may be an RRC connection resume request message, and the second RRC message may be an RRC connection resume message. The controller 3u-50 may be further configured to transmit a CN paging request to a CN node when the connection request message is not received from the terminal for a predetermined time after the paging message is transmitted.

Fourth Embodiment

Figure 4A:
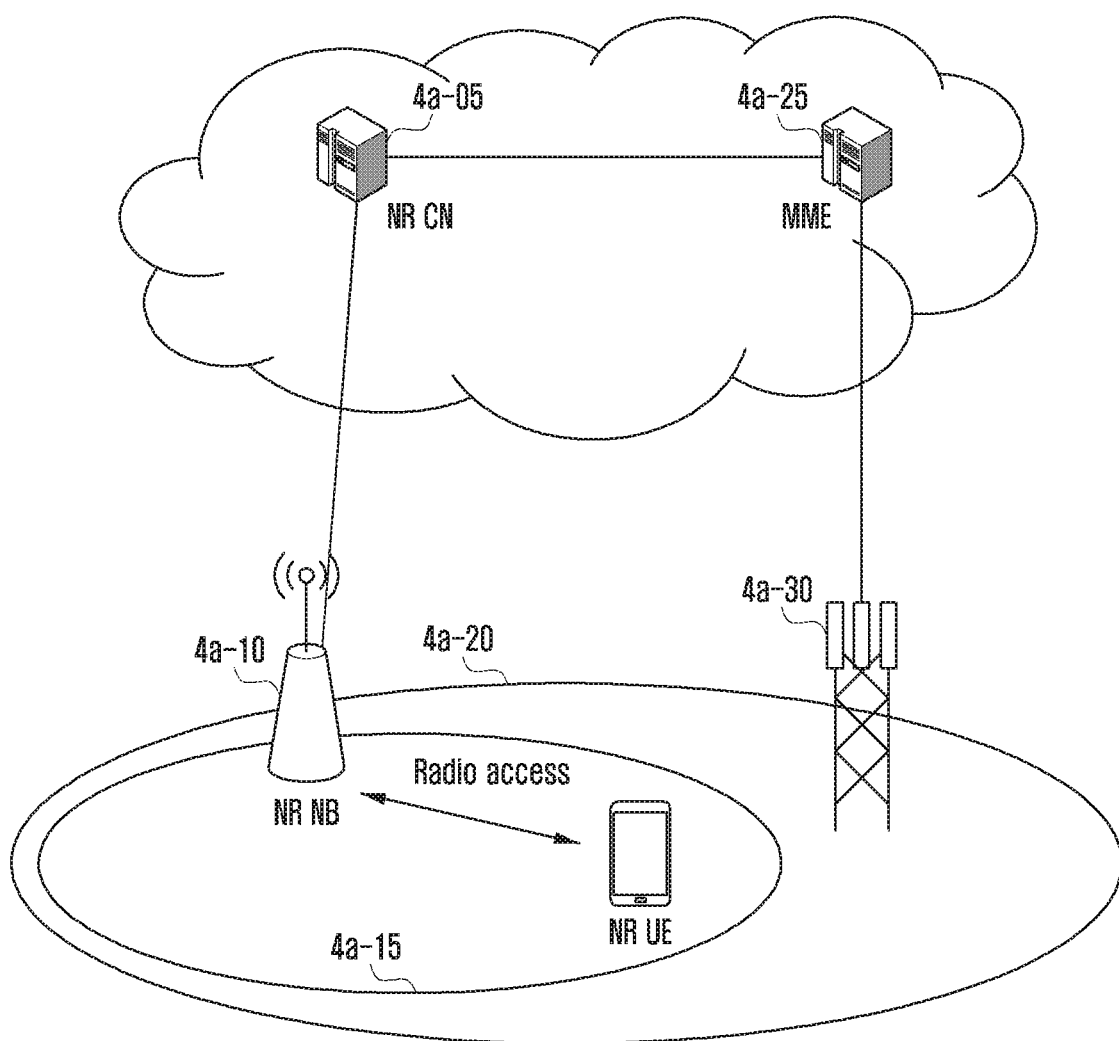
FIG. 4A is a diagram illustrating a structure of a next generation mobile communication system according to an embodiment of the disclosure.

FIG. 4A is a diagram illustrating a structure of a next generation mobile communication system according to an embodiment of the disclosure.

Referring to FIG. 4A, a RAN of the next generation mobile communication system (hereinafter, NR or 5G) includes a next generation base station (also referred to as a new radio node B, NR gNB, gNB, 5G NB, or an NR base station) 4a-10 and a NR CN 4a-05. A user terminal (also referred to as new radio user equipment, NR UE, UE, or terminal) 4a-15 accesses an external network through the NR gNB 4a-10 and the NR CN 4a-05.

In FIG. 4A, the NR gNB 4a-10 corresponds to the eNB of the existing LTE system. The NR gNB 4a-10 is connected to the NR UE 4a-15 through a radio channel and can provide a better service than the existing Node B. In the next generation mobile communication system, since all user traffic is provided through a shared channel, a device for collecting various kinds of state information, such as buffer states, available transmission power states, and channel states of NR UEs, and thereby performing scheduling is required. This is performed by the NR gNB 4a-10. Normally, one NR gNB 4a-10 controls a plurality of cells and includes a CU for performing control and signaling and a DU for performing transmission and reception of signals. In order to realize high-speed data transfer compared to the existing LTE, more than the existing maximum bandwidth may be applied, and also a beamforming technique may be used with OFDM as a radio access technology. In addition, an AMC scheme is used to determine a modulation scheme and a channel coding rate according to a channel state of the NR UE. The NR CN 4a-05 performs functions such as mobility support, bearer setup, and QoS setup. The NR CN 4a-05 is a device for performing various control functions as well as a mobility management function for the NR UE, and is connected to a plurality of NR gNB. Also, the next generation mobile communication system may be linked to the existing LTE system, and the NR CN 4a-05 is connected to the MME 4a-25 through a network interface. The MME 4a-25 is connected to the eNB 4a-30 which is the existing base station that serves and area 4a-20.

Figure 4B:
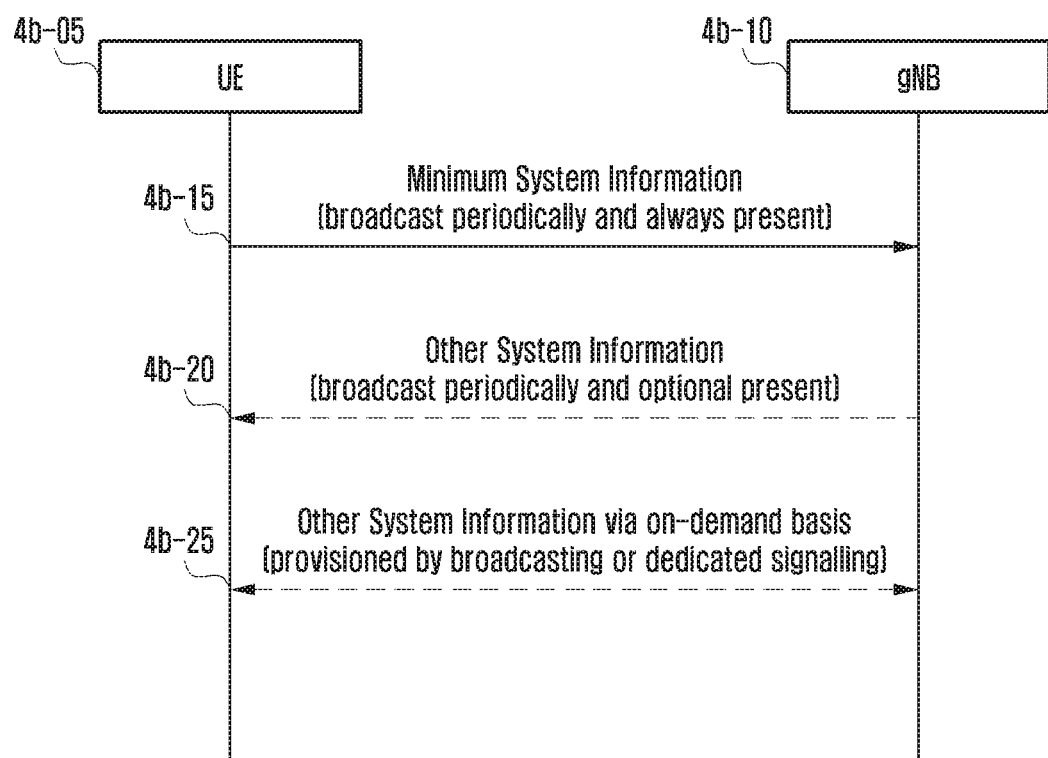
FIG. 4B is a diagram illustrating a method for providing system information (SI) in a next generation mobile communication system according to an embodiment of the disclosure.

FIG. 4B is a diagram illustrating a method for providing SI in a next generation mobile communication system according to an embodiment of the disclosure.

In the next generation mobile communication system, SI broadcasted by the gNB 4b-10 includes minimum SI and another SI. The minimum SI is broadcasted periodically at operation 4b-15, and includes SI setup information required for initial access and SI scheduling information required for receiving the other SI broadcasted periodically or via on-demand basis. Basically, the other SI includes all setup information not included in the minimum SI. The other SI is periodically broadcasted at operation 4b-20, or broadcasted at the request of the UE or provided to the UE by dedicated signaling at operation 4b-25. When the UE 4b-05 requests and receives the other SI, the UE 4b-05 needs to check, before performing the request, whether the other SI is valid in the cell or whether the other SI is currently being broadcast (at the request of another UE). This check is possible through specific information provided by the minimum SI. The UE 4b-05 which is in the RRC_IDLE mode or the RRC_INACTIVE mode may request the other SI without changing the current RRC state. The UE 4b-05 which is in the RRC_CONNECTED mode may request and receive the other SI through dedicated RRC signaling. The other SI is broadcasted every configured cycle for a given period. Public warning system (PWS) information is provided as the other SI. Whether to broadcast the other SI or provide it to the UE through dedicated RRC signaling depends on network implementation.

Figure 4C:
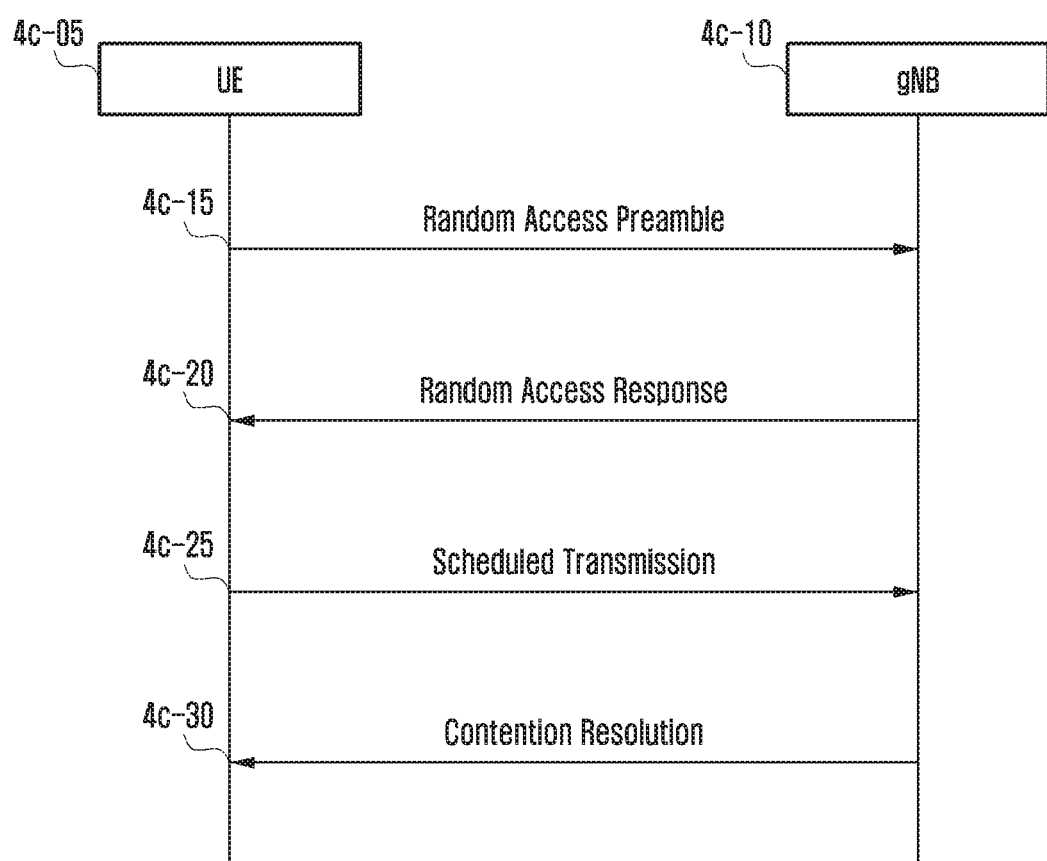
FIG. 4C is a diagram illustrating a random access procedure in an LTE system according to an embodiment of the disclosure.

FIG. 4C is a diagram illustrating a random access procedure in an LTE system according to an embodiment of the disclosure.

Referring to FIG. 4C, the random access is performed when uplink synchronization is performed or data is transmitted to the network. Specifically, the random access may be performed when the idle mode transitions to the connected mode, when RRC re-establishment is performed, when handover is performed, or when downlink data starts. The UE 4c-05 receives a dedicated preamble from the gNB 4c-10 and transmits a preamble by applying the received preamble. Otherwise, the UE selects one of two preamble groups and selects a preamble belonging to the selected group. These groups are referred to as group A and group B. If the channel quality state is better than a certain threshold value, and if the size of the message 3 is greater than a certain threshold value, the UE selects the preamble belonging to the group A. Otherwise, the UE selects the preamble belonging to the group B. The UE 4c-05 transmits the preamble in the n-th subframe at operation 4c-15. Then the UE 4c-05 starts a random access response (RAR) window from the (n+3)-th subframe and monitors at operation 4c-20 whether RAR is transmitted within the window time interval. Scheduling information of the RAR is indicated by a random access-radio network temporary identifier (RA-RNTI) of PDCCH. The RA-RNTI is derived using the time used for transmitting the preamble and the radio resource position in the frequency axis. The RAR includes a timing advance command, an UL grant, and a temporary C-RNTI. If the RAR is successfully received in the RAR window, the UE transmits the message 3 by using the UL grant included in the RAR at operation 4c-25. The message 3 includes different information depending on the purpose of the random access. The following table is an example of information contained in the message 3.

TABLE 1

Examples of information included in the message 3

| CASE | Message 3 Contents |
| --- | --- |
| RRC CONNECTION SETUP | CCCH SDU |
| RRC RE-ESTABLISHMENT | CCCH SDU, BSR (if grant is enough), PHR (if triggered & grant is enough) |
| Handover (random preamble) | C-RNTI CE, BSR, PHR, (part of) DCCH SDU |
| Handover (dedicate preamble) | BSR, PHR, (part of) DCCH SDU |
| UL resume | C-RNTI CE, BSR, PHR, (part of) DCCH/DTCH SDU |
| PDCCH order (random preamble) | C-RNTI CE, BSR, PHR, (part of) DCCH/DTCH SDU |
| PDCCH order (dedicate preamble) | BSR, PHR, (part of) DCCH/DTCH SDU |

If the RAR is received in the n-th subframe, the message 3 is transmitted in the (n+6)-th subframe. From the message 3, HARQ is applied. After transmission of the message 3, the UE triggers a specific timer and monitors a contention resolution (CR) message at operation 4c-30 until the timer expires. The CR message includes, in addition to CR MAC CE, an RRC connection setup message or an RRC connection reestablishment message depending on a random access purpose.

Figure 4D:
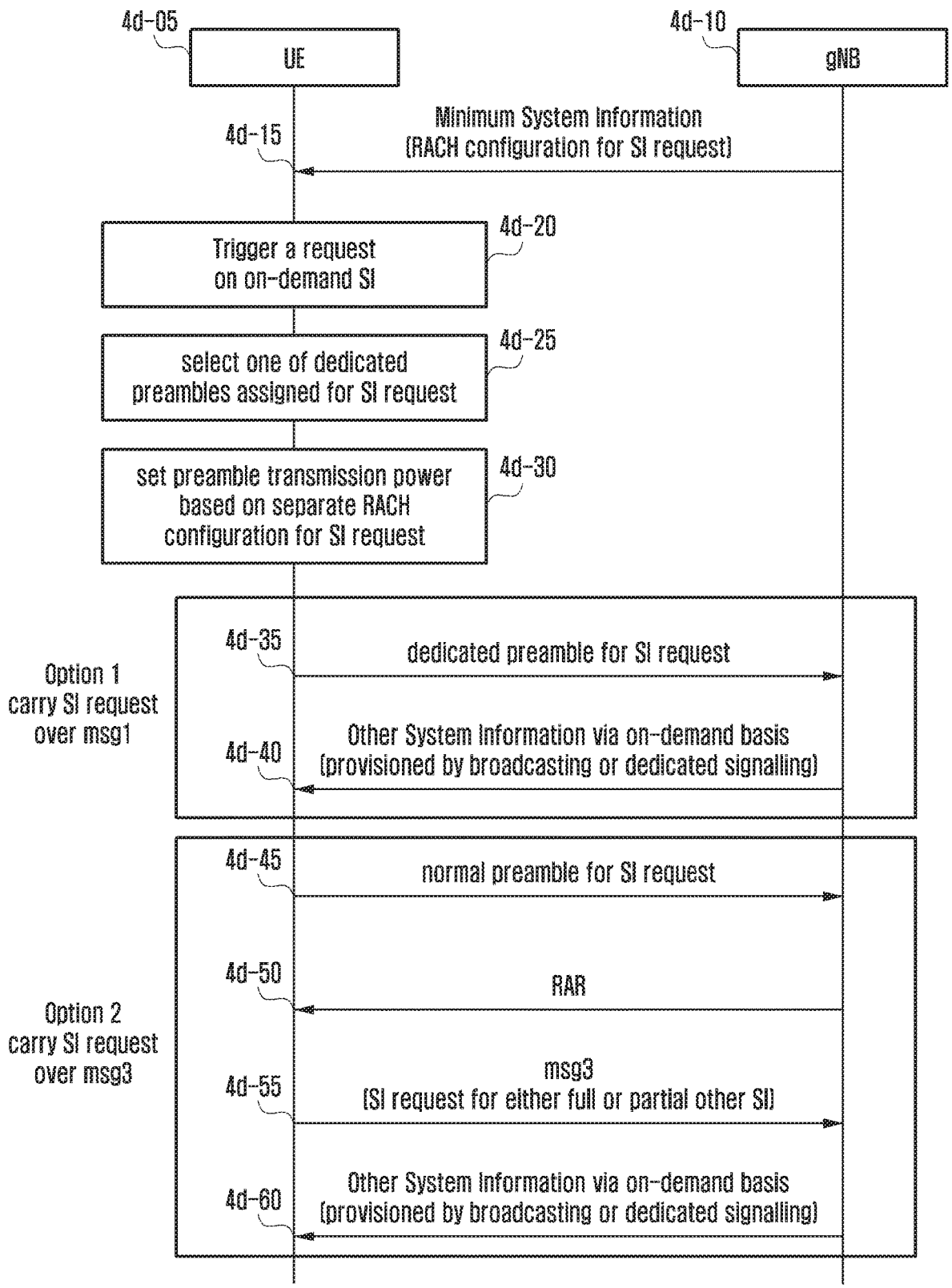
FIG. 4D is a diagram illustrating a signaling flow of performing an SI request according to an embodiment of the disclosure.

FIG. 4D is a diagram illustrating a signaling flow of performing an SI request according to an embodiment of the disclosure.

Referring to FIG. 4D, the request for the other SI is performed through a random access process. At operation 4d-15, the gNB 4d-10 provides random access configuration information necessary for the SI request to the UE 4d-05 through the broadcasted minimum SI. The minimum SI includes random access configuration information for general access and random access configuration information for SI request. Depending on the access purpose, the UE 4d-05 applies one of two kinds of configuration information. The random access configuration information for the SI request includes at least one of the following parameters.

power-ramping factor powerRampingStep2
maximum number of preamble transmission preambleTransMax2
initial preamble power preambleInitialReceivedTargetPower2
preamble format based offset DELTA_PREAMBLE2

The above parameters are used for determining preamble transmission power in the random access procedure. The preamble transmission power, PREAMBLE_RECEIVED_TARGET_POWER, is expressed as follows.

preambleInitialReceivedTargetPower2+DELTA_PREAMBLE2+(PREAMBLE TRANSMISSION COUNTER−1)*powerRampingStep2;

PREAMBLE_TRANSMISSION_COUNTER is the number of preamble retransmissions. If the preamble transmission fails, the UE 4d-05 retransmits the preamble and increases the parameter by one. The reason for providing separate transmission power for the preamble dedicated to the SI request is to increase the reception success rate as compared with the general access since the other SI is necessary information for the UE 4d-05. Typically, the above parameters have a higher value than the corresponding parameters applied to the general access.

preamble information assigned for SI request
This parameter is used to indicate the preamble allocated for the SI request. When the UE 4d-05 performs a random access for the SI request, the UE 4d-05 should transmit the above SI request dedicated preamble. Based on the received preamble, the gNB 4d-10 may identify whether it is a general access or an SI request.

The UE 4d-05 triggers an operation of requesting other SI to the gNB 4d-10 at a specific time at operation 4d-20. The UE 4d-05 selects one of the SI request dedicated preambles indicated by the minimum SI at operation 4d-25. The UE 4d-05 determines preamble transmission power, based on configuration information indicated by the minimum SI at operation 4d-30.

Although the UE 4d-05 uses the preamble dedicated to the SI request, the other SI may be limited to all or part of the SI. Therefore, a method is required to indicate this.

Method 1 (2-step method): Use the preamble to indicate whether all or part is requested in the other SI. For this, the preamble group is subdivided. That is, when the UE 4d-05 requests all the other SI, the UE 4d-05 selects and transmits a preamble belonging to the first preamble group. If the entire other SI is divided into several SI groups according to their purposes, and if one of them is requested, the UE 4d-05 selects and transmits a preamble belonging to a preamble group corresponding to the divided group at operation 4d-35. To do this, one or more preamble groups should be effectively mapped to several SI groups, and the mapping information is included in the minimum SI. The gNB 4d-10 that receives the preamble dedicated to the SI request provides the other SI corresponding to the preamble to the UE 4d-05 at operation 4d-40.

Method 2 (4-step method): Include other SI information requested in the message 3. While Method 1 requests SI according to a predefined preamble group, Method 2 may request more flexibly a necessary part of the other SI. Instead, the UE 4d-50 further requires a RAR reception operation 4d-50 and a message 3 transmission operation 4d-55 after the preamble transmission operation 4d-45. The preamble transmitted at operation 4d-45 by the UE 4d-05 may be a normal preamble. The gNB 4d-10 provides the other SI indicated by the message 3 to the UE 4d-05 at operation 4d-60.

Figure 4E:
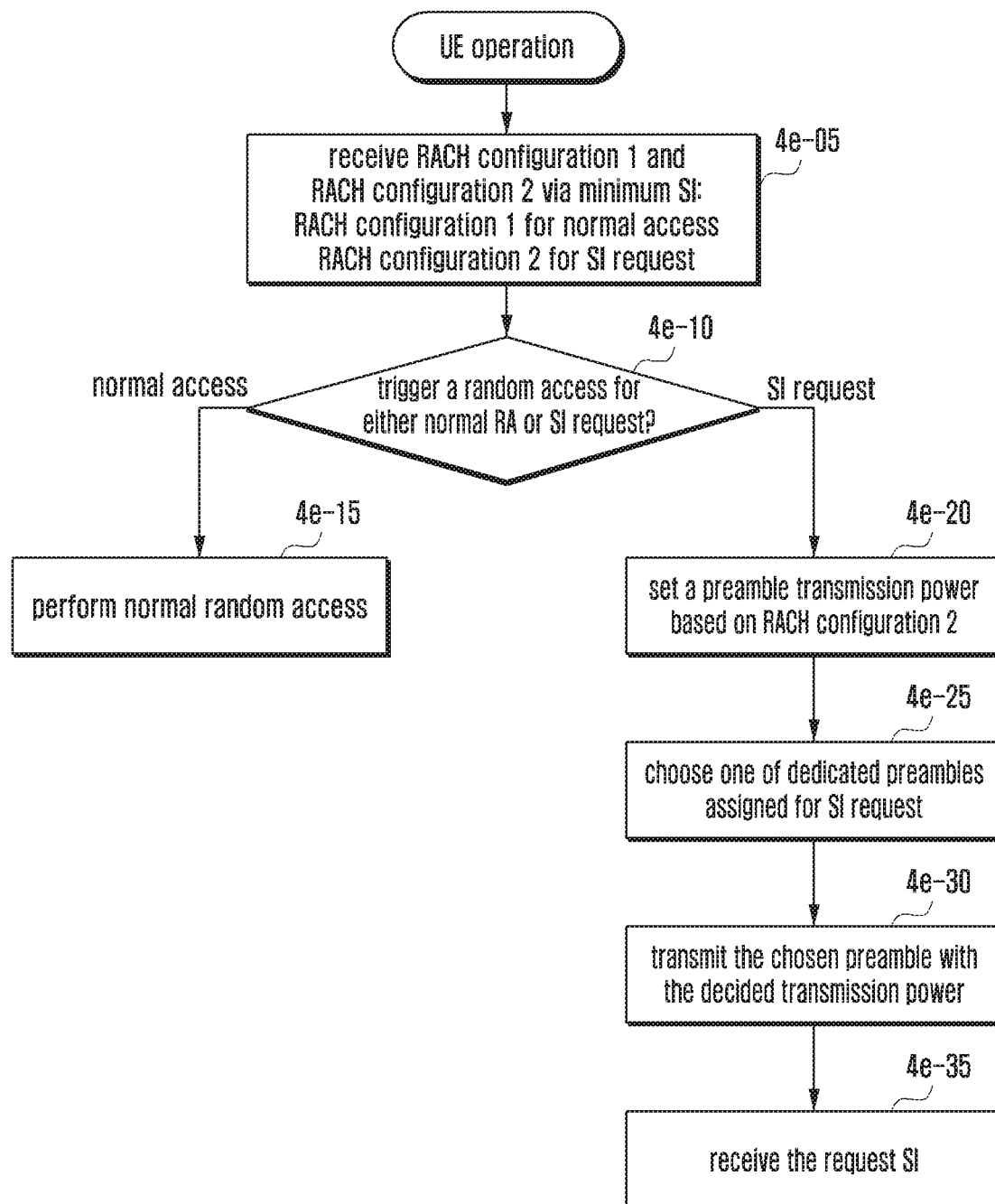
FIG. 4E is a diagram illustrating a UE operation according to an embodiment of the disclosure.

FIG. 4E is a diagram illustrating a UE operation according to an embodiment of the disclosure.

Referring to FIG. 4E, at operation 4e-05, the UE receives first random access configuration information and second random access configuration information from the gNB. Both of the configuration information are broadcasted through the minimum SI. The first random access configuration information is for normal access, and the second random access configuration information is for an SI request. The second random access configuration information includes parameters necessary for deriving the transmission power of a preamble and preamble information dedicated to the SI request. At operation 4e-10, the UE selects one of normal random access (RA) or RA for the SI request. In case of the normal RA, the UE performs the existing operation at operation 4e-15.

In case of RA for the SI request, the UE determines the preamble transmission power by using the second random access configuration information at operation 4e-20. At operation 4e-25, the UE selects one preamble in the preamble group dedicated to the SI request. At operation 4e-30, the UE transmits the selected preamble with the determined transmission power to the gNB. At operation 4e-35, the UE receives the requested SI. The requested SI is broadcasted or delivered to the UE using dedicated signaling. FIG. 4E shows the above-discussed Method 1. In case of Method 2, after the preamble transmission, the RAR reception and the message 3 transmission operations are followed and the requested SI is received.

Figure 4F:
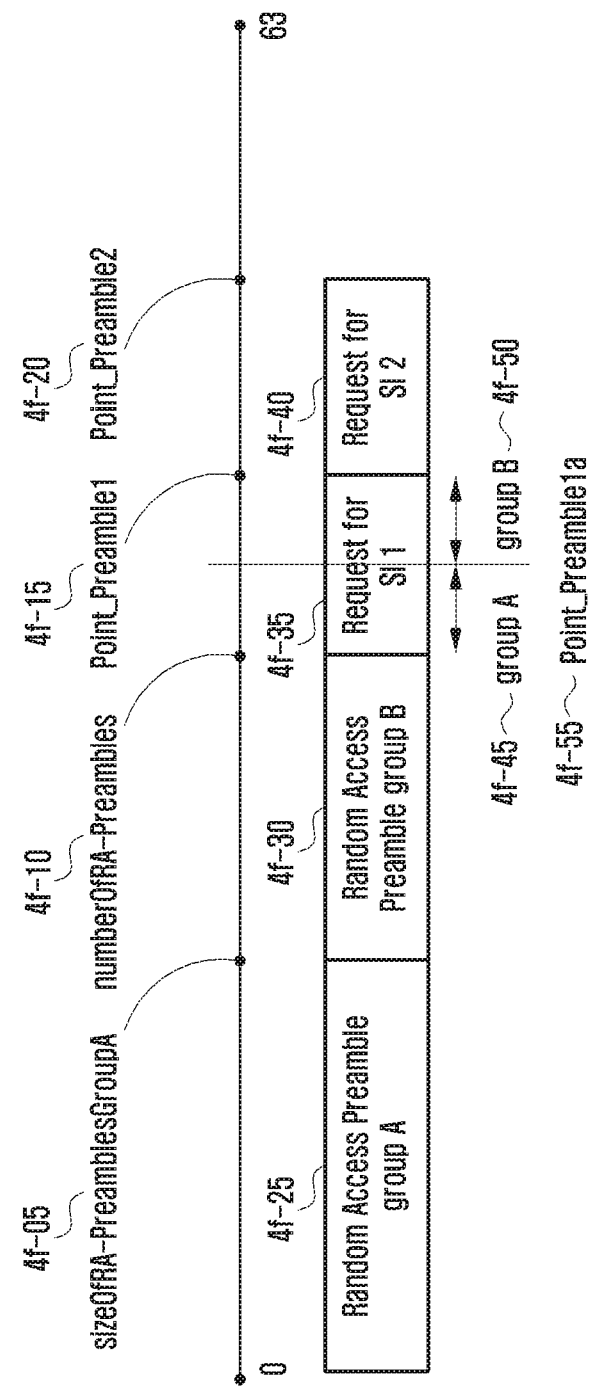
FIG. 4F is a diagram illustrating a first method for indicating a preamble dedicated to an SI request according to an embodiment of the disclosure.

FIG. 4F is a diagram illustrating a first method for indicating a preamble dedicated to an SI request according to an embodiment of the disclosure.

Referring to FIG. 4F, a part of the other SI other than the minimum SI may still be broadcasted periodically to the UE. In addition, the other SI provided based on a UE request may be requested partially only, not wholly, to the UE. Thus, preambles dedicated to the SI request may be divided into groups. For example, the other SI group 1 may correspond to the preamble group 1 dedicated to the SI request, and the other SI group 2 may correspond to the preamble group 2 dedicated to the SI request. If the UE desires to receive the other SI belonging to the other SI group 1, the UE should select and transmit the preamble belonging to the preamble group 1 dedicated to the SI request. Thus, for this purpose, a finite preamble should be divided into one or more preamble groups. In LTE, there are a total of 64 preambles. Considering the signal strength and the size of message 3, two groups, group A 4f-25 and group B 4f-30, are indicated using two parameters, sizeOfRA-PreambleGroupA 4f-05 and numberOfRA-Preambles 4f-10. The group A contains preambles from the preamble number 0 to the preamble number indicated by sizeOfRA-PreambleGroupA. The group B contains preambles from the preamble number indicated by sizeOfRA-PreambleGroupA+1 to the preamble number indicated by numberOfRA-Preambles. Further, additional parameters are needed to define one or more SI request dedicated preamble groups. For example, the SI request dedicated preamble group 1 4f-35 contains preambles from the preamble number indicated by numberOfRA-Preambles+1 to the preamble number indicated by Point_Preamble1 4f-15. The SI request dedicated preamble group 2 4f-40 contains preambles from the preamble number indicated by Point_Preamble1+1 to the preamble number indicated by Point_Preamble2 4f-30. The method of grouping the SI request based preambles is suitable for the Method 1 (2-step method).

However, if preamble groups further classified according to signal strength and other SI size are desired such as the existing groups A and B, additional indicators are needed. For example, Point_Preamble1a 4f-55 indicates a specific preamble between numberOfRA-Preambles and Point_Preamble1. If the signal strength is smaller than the specific signal strength of downlink synchronization signal or reference signal, or if the requested other SI has a specific size or more, the UE selects any one 4f-45 from the preamble indicated by numberOfRA-Preambles+1 to the preamble indicated by Point_Preamble1a. On the other hand, if the signal strength is greater than the specific signal strength of downlink synchronization signal or reference signal, or if the requested other SI has a specific size or less, the UE selects any one 4f-50 from the preamble indicated by Point_Preamble1a+1 to the preamble indicated by Point_Preamble2.

FIG. 4G is a diagram illustrating a second method for indicating a preamble dedicated to an SI request according to an embodiment of the disclosure.

Referring to FIG. 4G, if any other SI, other than the minimum SI and periodically broadcasted other SI, is requested, or if the requested SI is specified in the message 3 (4-step method), the preamble transmission operation is enough to inform the gNB that a random access is for the SI request. In addition, it may be further considered to divide the preamble group dedicated to the SI request into group A and group B according to the signal strength or the size of message 3 like LTE. That is, using sizeOfRA-PreambleGroupA 4g-05 and numberOfRA-Preambles 4g-10, a preamble group A 4g-35 and a preamble group B 4g-40 for normal are indicated. The major difference from LTE is that the additionally defined firstPreamble 4g-15 and lastPreamble 4g-20 indicators are used to indicate the SI request dedicated preamble group in the groups A and B. Therefore, among preambles belonging to the preamble groups A and B for the normal access, preambles between the firstPreamble and the lastPreamble are used only for the SI request. If a preamble indicated by sizeOfRA-PreambleGroupA is configured between preambles indicated by firstPreamble and lastPreamble, a preamble 4g-25 existing between the preamble indicated by firstPreamble and the preamble indicated by sizeOfRA-PreambleGroupA is used when the signal strength is smaller than the specific signal strength of downlink synchronization signal or reference signal or when the requested other SI has a specific size or more. On the other hand, a preamble 4g-30 between the preamble indicated by sizeOfRA-PreambleGroupA to the preamble indicated by lastPreamble is used when the signal strength is greater than the specific signal strength of the downlink synchronization signal or reference signal or when the requested other SI has a specific size or less.

Figure 4H:
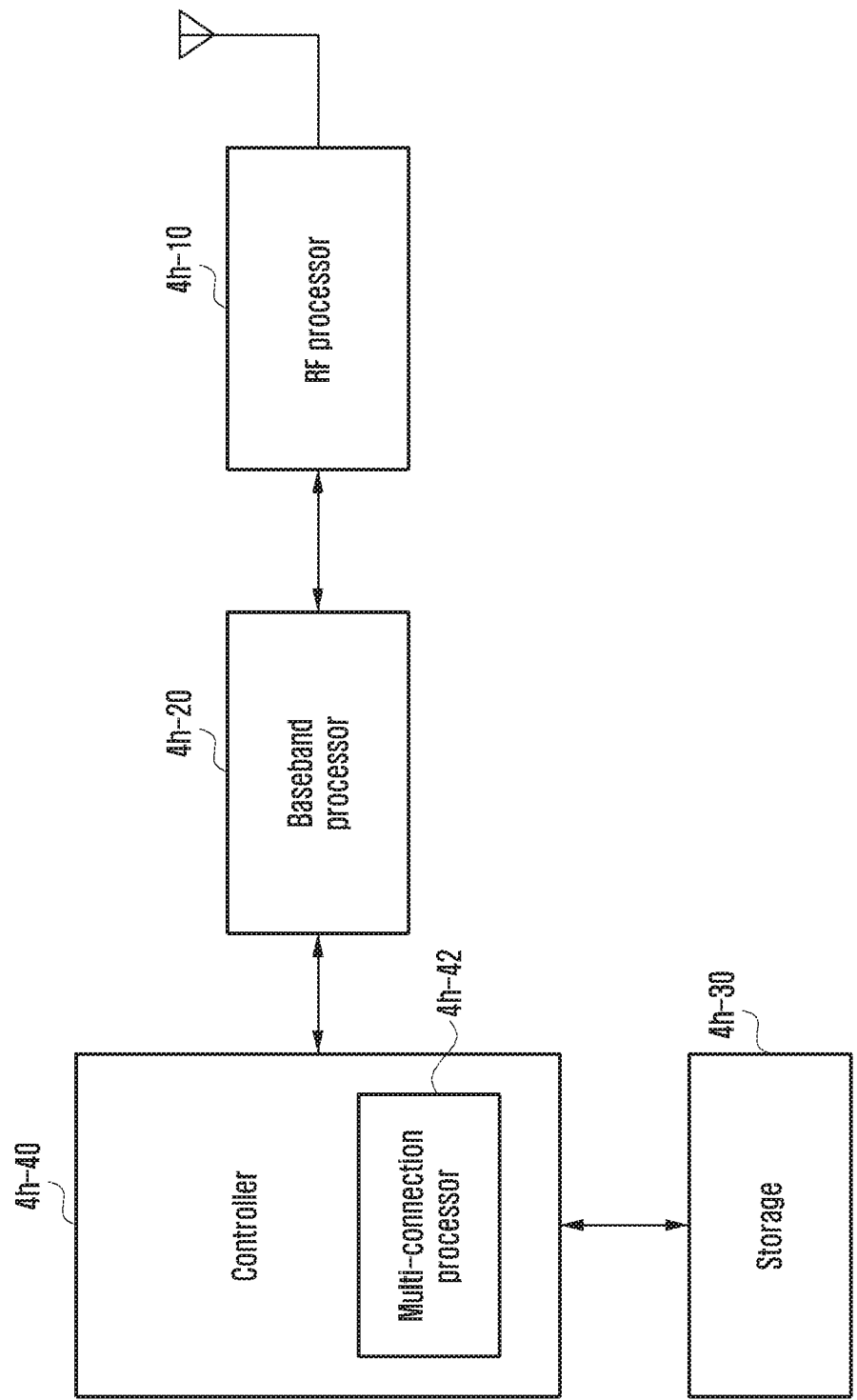
FIG. 4H is a block diagram illustrating a configuration of a UE according to an embodiment of the disclosure.
Figure 41:
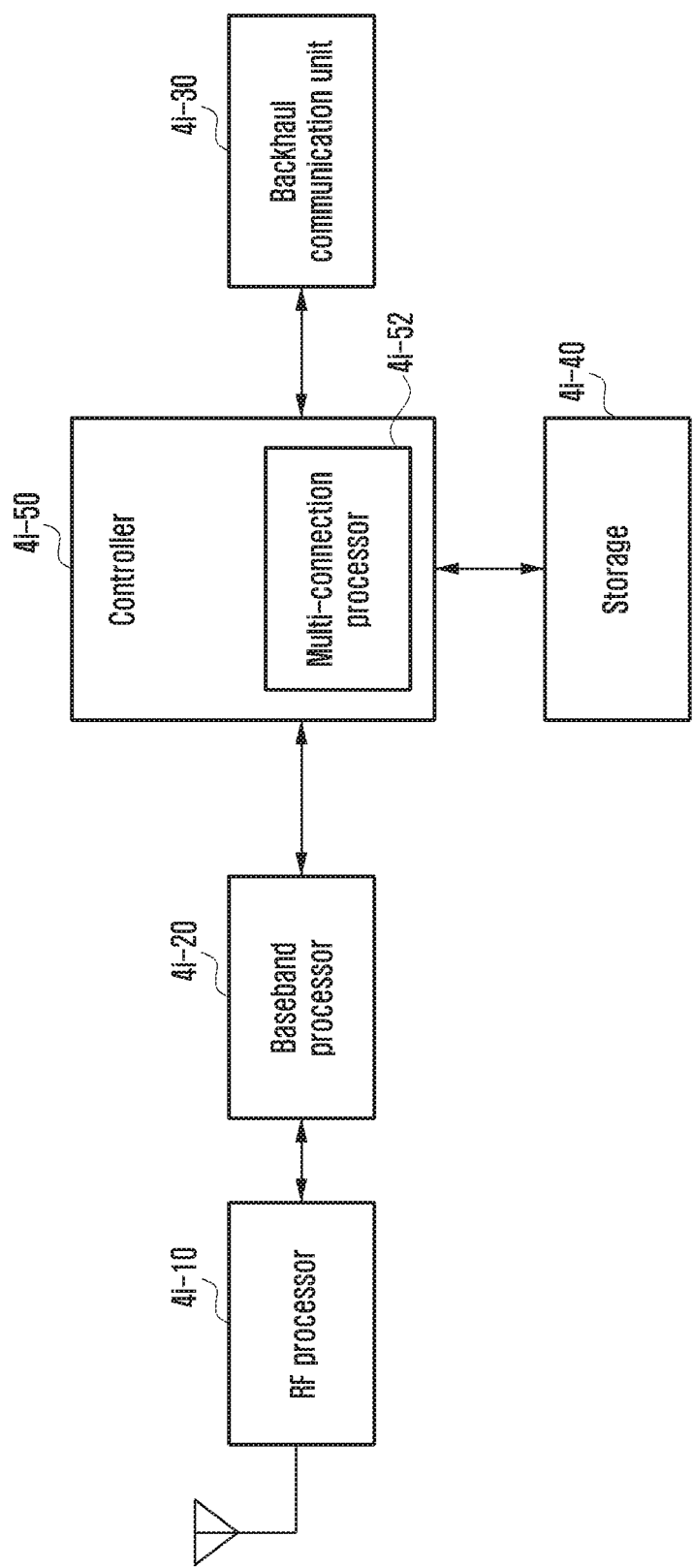

FIG. 4H is a block diagram illustrating a configuration of a UE according to an embodiment of the disclosure.

Referring to FIG. 4H, the UE includes a RF processor 4h-10, a baseband processor 4h-20, a storage 4h-30, and a controller 4h-40.

The RF processor 4h-10 performs a function, such as band conversion and amplification of a signal, for transmitting and receiving the signal through a radio channel. That is, the RF processor 4h-10 up-converts a baseband signal provided from the baseband processor 4h-20 into an RF band signal to transmit the RF band signal through an antenna, and also down-converts an RF band signal received through the antenna into a baseband signal. For example, the RF processor 4h-10 may include a transmitter filter, a receiver filter, an amplifier, a mixer, an oscillator, a (DAC, an ADC, and the like. Although FIG. 4H shows only one antenna, the UE may have a plurality of antennas. In addition, the RF processor 4h-10 may include a plurality of RF chains. Further, the RF processor 4h-10 may perform beamforming. For the beamforming, the RF processor 4h-10 may adjust the phase and size of each signal transmitted and received through a plurality of antennas or antenna elements. Also, the RF processor 4h-10 may perform MIMO and receive several layers in the MIMO operation using a multi-connection processor 4h-42.

The baseband processor 4h-20 performs a conversion function between a baseband signal and a bit stream in accordance with a physical layer standard of the system. For example, in data transmission, the baseband processor 4h-20 creates complex symbols by encoding and modulating transmission bit streams. Also, in data reception, the baseband processor 4h-20 restores reception bit streams by demodulating and decoding a baseband signal provided from the RF processor 4h-10. In case of complying with OFDM scheme, in data transmission, the baseband processor 4h-20 generates complex symbols by encoding and modulating transmission bit streams, maps the complex symbols to subcarriers, and constructs OFDM symbols through an IFFT operation and a CP insertion. In addition, in data reception, the baseband processor 4h-20 divides a baseband signal provided from the RF processor 4h-10 into OFDM symbol units, restores signals mapped to subcarriers through a FFT operation, and restores reception bit streams through demodulation and decoding.

The baseband processor 4h-20 and the RF processor 4h-10 transmits and receives a signal as described above. Accordingly, the baseband processor 4h-20 and the RF processor 4h-10 may be referred to as a transmitting unit, a receiving unit, a transceiver, or a communication unit. In addition, at least one of the baseband processor 4h-20 and the RF processor 4h-10 may include a plurality of communication modules to support a plurality of different radio access technologies. Also, at least one of the baseband processor 4h-20 and the RF processor 4h-10 may include different communication modules for processing signals of different frequency bands. For example, the different radio access technologies may include a wireless LAN (e.g., IEEE 802.11), a cellular network (e.g., LTE), and the like. In addition, the different frequency bands may include a super high frequency (SHF) band (e.g., 2.5 GHz, 5 GHz), and a millimeter wave (e.g., 60 GHz) band.

The storage 4h-30 stores a basic program for the operation of the UE, an application program, and data such as setting information. In particular, the storage 4h-30 may store information associated with a second access node that performs wireless communication by using a second radio access technology. Also, the storage 4h-30 provides the stored data in response to a request of the controller 4h-40.

The controller 4h-40 controls overall operations of the UE. For example, the controller 4h-40 transmits and receives a signal through the baseband processor 4h-20 and the RF processor 4h-10. Also, the controller 4h-40 writes and reads data to and from the storage 4h-30. For this, the controller 4h-40 may include at least one processor. For example, the controller 4h-40 may include a CP for performing the control for communication and an (AP for controlling an upper layer such as an application program.

FIG. 4I is a block diagram illustrating a configuration of a gNB according to an embodiment of the disclosure.

Referring to FIG. 4I, the gNB includes an RF processor 4i-10, a baseband processor 4i-20, a backhaul communication unit 4i-30, a storage 4i-40, and a controller 4i-50.

The RF processor 4i-10 performs a function, such as band conversion and amplification of a signal, for transmitting and receiving the signal through a radio channel. That is, the RF processor 4i-10 up-converts a baseband signal provided from the baseband processor 4i-20 into an RF band signal to transmit the RF band signal through an antenna, and also down-converts an RF band signal received through the antenna into a baseband signal. For example, the RF processor 4i-10 may include a transmitter filter, a receiver filter, an amplifier, a mixer, an oscillator, a DAC, an ADC, and the like. Although FIG. 4I shows only one antenna, the first access node may have a plurality of antennas. In addition, the RF processor 4i-10 may include a plurality of RF chains. Further, the RF processor 4i-10 may perform beamforming. For the beamforming, the RF processor 4i-10 may adjust the phase and size of each signal transmitted and received through a plurality of antennas or antenna elements. Also, the RF processor 4i-10 may perform MIMO and receive several layers in the MIMO operation using a multi-connection processor 4i-52.

The baseband processor 4i-20 performs a conversion function between a baseband signal and a bit stream in accordance with a physical layer standard of the first radio access technology. For example, in data transmission, the baseband processor 4i-20 creates complex symbols by encoding and modulating transmission bit streams. Also, in data reception, the baseband processor 4i-20 restores reception bit streams by demodulating and decoding a baseband signal provided from the RF processor 4i-10. In case of complying with OFDM scheme, in data transmission, the baseband processor 4i-20 generates complex symbols by encoding and modulating transmission bit streams, maps the complex symbols to subcarriers, and constructs OFDM symbols through an IFFT operation and a CP insertion. In addition, in data reception, the baseband processor 4i-20 divides a baseband signal provided from the RF processor 4i-10 into OFDM symbol units, restores signals mapped to subcarriers through an FFT operation, and restores reception bit streams through demodulation and decoding. The baseband processor 4i-20 and the RF processor 4i-10 transmits and receives a signal as described above. Thus, the baseband processor 4i-20 and the RF processor 4i-10 may be referred to as a transmitting unit, a receiving unit, a transceiver, a communication unit, or a wireless communication unit.

The backhaul communication unit 4i-30 provides an interface for performing communication with other nodes in a network. That is, the backhaul communication unit 4i-30 converts a bit stream transmitted from the gNB to another node, e.g., a sub-gNB, a core network, etc., into a physical signal, and also converts a physical signal received from such other node into a bit stream.

The storage 4i-40 stores a basic program for the operation of the gNB, an application program, and data such as setting information. In particular, the storage 4i-40 may store information on a bearer allocated to the connected UE, a measurement result reported from the connected UE, and the like. In addition, the storage 4i-40 may store information for determining whether to provide or suspend multiple connections to or from the UE. Also, the storage 4i-40 provides the stored data in response to a request of the controller 4i-50.

The controller 4i-50 controls overall operations of the gNB. For example, the controller 4i-50 transmits and receives a signal through the baseband processor 4i-20 and the RF processor 4i-10 or through the backhaul communication unit 4i-30. Also, the controller 4i-50 writes and reads data to and from the storage 4i-40. For this, the controller 4i-50 may include at least one processor.

The methods disclosed herein may be implemented in hardware, software, or a combination of hardware and software.

In case of implementation in software, a computer-readable storage medium that stores one or more programs (or software modules) may be provided. Such programs stored in the computer-readable storage medium are configured for execution by one or more processors equipped in an electronic device. In addition, such programs include instructions that cause the electronic device to perform the methods according to the disclosed embodiments of the disclosure.

Such programs (or software modules) may be stored in a memory such as a random access memory, a non-volatile memory including a flash memory, a read only memory (ROM), an electrically erasable programmable ROM (EEPROM), a magnetic disc storage device, a compact disc-ROM (CD-ROM), a digital versatile disc (DVDs), other type optical storage device, a magnetic cassette, or any combination thereof. In addition, each of such memories may be included as plural components.

In addition, the program may be stored in an attachable storage device that is accessible through a communication network such as the Internet, an Intranet, a LAN, a wide LAN (WLAN), or a storage area network (SAN), or any combination thereof. Such a storage device may access an apparatus that performs an embodiment of the disclosure via an external port. Further, a separate storage device on the communication network may access an apparatus that performs an embodiment of the disclosure.

In the above-discussed embodiments of the disclosure, the elements included in the disclosure are expressed singular or plural in accordance with the specific embodiment shown. However, it is to be understood that the singular or plural representations are selected appropriately for the sake of convenience of description, and the disclosure is not limited to the singular or plural constituent elements. Even expressed as a singular element, it may be composed of plural elements, and vice versa. Although embodiments are described herein individually, two or more of such embodiments may be combined.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method performed by a user equipment (UE) in a wireless communication system, the method comprising:
   receiving, from a first base station, a first radio resource control (RRC) release message including paging area information and information associated with a resume identity;
   transmitting, to a second base station, an RRC resume request message including the information associated with the resume identity, information associated with message authentication code-integrity (MAC-I), and a resume cause set to an update of paging area in case that the UE is in an RRC inactive state and the update of paging area is required based on the paging area information and system information broadcast from the second base station, wherein the update of paging area is required in case that the UE enters an area not belonging to a paging area configured by the paging area information;
   receiving, from the second base station, a second RRC release message including new paging area information; and
   applying the new paging area information,
   wherein, in case that the paging area information includes a cell identity, a paging area for an inactive mode is a cell corresponding to the cell identity, and
   wherein, in case that the paging area information includes information associated with a radio access network (RAN) area, a paging area for the inactive mode is the RAN area corresponding to the information associated with the RAN area.

2. The method of claim 1, further comprising:
   receiving a paging message including a paging identifier;
   performing actions upon going to an RRC idle in case that the paging identifier corresponds to a core network (CN) paging identifier; and
   transmitting an RRC connection resume request message for an RRC connection resume procedure in case that the paging identifier corresponds to a RAN paging identifier.

3. The method of claim 2,
   wherein, in case that the paging identifier corresponds to the CN paging identifier, the paging identifier includes a system architecture evolution (SAE)-temporary mobile subscriber identity (S-TMSI) or an international mobile subscriber identity (IMSI), and
   wherein, in case that the paging identifier corresponds to the RAN paging identifier, the paging identifier includes a resume identity.

4. The method of claim 2,
   wherein the CN paging identifier is included in the paging message, in case that the second base station does not obtain a context for the UE, and
   wherein the RAN paging identifier is included in the paging message, in case that the second base station obtains the context for the UE.

5. A user equipment (UE) in a wireless communication system, the UE comprising:
   a transceiver; and
   a controller configured to:
      receive, from a first base station via the transceiver, a first radio resource control (RRC) release message including paging area information and information associated with a resume identity,
      transmit, to a second base station via the transceiver, an RRC resume request message including the information associated with the resume identity, information associated with message authentication code-integrity (MAC-I), and a resume cause set to an update of paging area in case that the UE is in an RRC inactive state and the update of paging area is required based on the paging area information and system information broadcast from the second base station, wherein the update of paging area is required in case that the UE enters an area not belonging to a paging area configured by the paging area information,
      receive, from the second base station via the transceiver, a second RRC release message including new paging area information, and
      apply the new paging area information,
   wherein, in case that the paging area information includes a cell identity, a paging area for an inactive mode is a cell corresponding to the cell identity, and
   wherein, in case that the paging area information includes information associated with a radio access network (RAN) area, a paging area for the inactive mode is the RAN area corresponding to the information associated with the RAN area.

6. The UE of claim 5, wherein the controller is further configured to:
   receive, via the transceiver, a paging message including a paging identifier,
   perform actions upon going to an RRC idle in case that the paging identifier corresponds to a core network (CN) paging identifier, and
   transmit, via the transceiver, an RRC connection resume request message for an RRC connection resume procedure in case that the paging identifier corresponds to a RAN paging identifier.

7. The UE of claim 6,
   wherein, in case that the paging identifier corresponds to the CN paging identifier, the paging identifier includes a system architecture evolution (SAE)-temporary mobile subscriber identity (S-TMSI) or an international mobile subscriber identity (IMSI), and
   wherein, in case that the paging identifier corresponds to the RAN paging identifier, the paging identifier includes a resume identity.

8. The UE of claim 6,
wherein the CN paging identifier is included in the paging message, in case that the second base station does not obtain a context for the UE, and
wherein the RAN paging identifier is included in the paging message, in case that the second base station obtains the context for the UE.

9. A method performed by a second base station in a wireless communication system, the method comprising:
receiving, from a user equipment (UE), an RRC resume request message including information associated with a resume identity, information associated with message authentication code-integrity (MAC-I), and a resume cause set to an update of paging area in case that the UE is in an RRC inactive state and the update of paging area is required based on paging area information included in a first radio resource control (RRC) release message and system information broadcast from the second base station, wherein the update of paging area is required in case that the UE enters an area not belonging to a paging area configured by the paging area information;
transmitting, to a first base station, a retrieve UE context request message based on the information associated with the resume identity;
receiving, from the first base station, a retrieve UE context response message including a context of the UE; and
transmitting, to the UE, a second RRC release message including new paging area information for applying updated paging area,
wherein, in case that the paging area information includes a cell identity, a paging area for an inactive mode is a cell corresponding to the cell identity, and
wherein, in case that the paging area information includes information associated with a radio access network (RAN) area, a paging area for the inactive mode is the RAN area corresponding to the information associated with the RAN area.

10. The method of claim 9, further comprising:
transmitting, to the UE, a paging message including a paging identifier; and
receiving, from the UE, an RRC connection resume request message for an RRC connection resume procedure in case that the paging identifier corresponds to a RAN paging identifier,
wherein actions upon going to an RRC idle are performed in case that the paging identifier corresponds to a core network (CN) paging identifier.

11. The method of claim 10,
wherein, in case that the paging identifier corresponds to the CN paging identifier, the paging identifier includes a system architecture evolution (SAE)-temporary mobile subscriber identity (S-TMSI) or an international mobile subscriber identity (IMSI), and
wherein, in case that the paging identifier corresponds to the RAN paging identifier, the paging identifier includes a resume identity.

12. The method of claim 10,
wherein the CN paging identifier is included in the paging message, in case that the second base station does not obtain a context for the UE, and
wherein the RAN paging identifier is included in the paging message, in case that the second base station obtains the context for the UE.

13. A second base station in a wireless communication system, the second base station comprising:
a transceiver; and
a controller configured to:
receive, from a user equipment (UE) via the transceiver, an RRC resume request message including information associated with a resume identity, information associated with message authentication code-integrity (MAC-I), and a resume cause set to an update of paging area in case that the UE is in an RRC inactive state and the update of paging area is required based on paging area information included in a first radio resource control (RRC) release message and system information broadcast from the second base station, wherein the update of paging area is required in case that the UE enters an area not belonging to a paging area configured by the paging area information,
transmit, to a first base station via the transceiver, a retrieve UE context request message based on the information associated with the resume identity,
receive, from the first base station via the transceiver, a retrieve UE context response message including a context of the UE, and
transmit, to the UE via the transceiver, a second RRC release message including new paging area information for applying updated paging area,
wherein, in case that the paging area information includes a cell identity, a paging area for an inactive mode is a cell corresponding to the cell identity, and
wherein, in case that the paging area information includes information associated with a radio access network (RAN) area, a paging area for the inactive mode is the RAN area corresponding to the information associated with the RAN area.

14. The second base station of claim 13,
wherein the controller is further configured to:
transmit, to the UE via the transceiver, paging message including a paging identifier, and
receive, from the UE via the transceiver, an RRC connection resume request message for an RRC connection resume procedure in case that the paging identifier corresponds to a RAN paging identifier, and
wherein actions upon going to an RRC idle are performed in case that the paging identifier corresponds to a core network (CN) paging identifier.

15. The second base station of claim 14,
wherein, in case that the paging identifier corresponds to the CN paging identifier, the paging identifier includes a system architecture evolution (SAE)-temporary mobile subscriber identity (S-TMSI) or an international mobile subscriber identity (IMSI), and
wherein, in case that the paging identifier corresponds to the RAN paging identifier, the paging identifier includes a resume identity.

16. The second base station of claim 14,
wherein the CN paging identifier is included in the paging message, in case that the second base station does not obtain a context for the UE, and
wherein the RAN paging identifier is included in the paging message, in case that the second base station obtains the context for the UE.

17. A method performed by a first base station in a wireless communication system, the method comprising:
transmitting, to a user equipment (UE), a first radio resource control (RRC) release message including paging area information and information associated with a resume identity;

receiving, from a second base station, a retrieve UE context request message based on information associated with a resume identity, wherein the second base station received, from the UE, an RRC resume request message including the information associated with the resume identity, information associated with message authentication code-integrity (MAC-I), and a resume cause set to an update of paging area before the first base station receives the retrieve UE context request message; and transmitting, to the second base station, a retrieve UE context response message including a context of the UE, wherein the RRC resume request message is transmitted from the UE in case that the UE is in an RRC inactive state and the update of paging area is required based on paging area information included in a first radio resource control (RRC) release message and system information broadcast from the second base station, wherein the update of paging area is required in case that the UE enters an area not belonging to a paging area configured by the paging area information, wherein, in case that the paging area information includes a cell identity, a paging area for an inactive mode is a cell corresponding to the cell identity, and wherein, in case that the paging area information includes information associated with a radio access network (RAN) area, a paging area for the inactive mode is the RAN area corresponding to the information associated with the RAN area.

18. The method of claim 17, further comprising:
retrieving the context of the UE based on the information associated with the resume identity.

19. A first base station in a wireless communication system, the first base station comprising:
a transceiver; and
a controller configured to:
transmit, to a user equipment (UE) via the transceiver, a first radio resource control (RRC) release message including paging area information and information associated with a resume identity, receive, via the transceiver from a second base station, a retrieve UE context request message based on information associated with a resume identity, wherein the second base station received, from the UE, an RRC resume request message including the information associated with the resume identity, information associated with message authentication code-integrity (MAC-I), and a resume cause set to an update of paging area before the first base station receives the retrieve UE context request message, and transmit, to the second base station, a retrieve UE context response message including a context of the UE, wherein the RRC resume request message is transmitted from the UE in case that the UE is in an RRC inactive state and the update of paging area is required based on paging area information included in a first radio resource control (RRC) release message and system information broadcast from the second base station, wherein the update of paging area is required in case that the UE enters an area not belonging to a paging area configured by the paging area information, wherein, in case that the paging area information includes a cell identity, a paging area for an inactive mode is a cell corresponding to the cell identity, and wherein, in case that the paging area information includes information associated with a radio access network (RAN) area, a paging area for the inactive mode is the RAN area corresponding to the information associated with the RAN area.

20. The first base station of claim 19, wherein the controller is further configured to retrieve the context of the UE based on the information associated with the resume identity.

* * * * *